(12) United States Patent
Snyder et al.

(10) Patent No.: US 11,077,607 B2
(45) Date of Patent: *Aug. 3, 2021

(54) MANUFACTURING IN MICROGRAVITY AND VARYING EXTERNAL FORCE ENVIRONMENTS

(71) Applicant: Made In Space, Inc., Moffett Field, CA (US)

(72) Inventors: Michael Snyder, Mountain View, CA (US); Jason Dunn, Mountain View, CA (US); Michael Chen, Mountain View, CA (US); Aaron Kemmer, Mountain View, CA (US); Noah Paul-Gin, San Francisco, CA (US); Matthew Napoli, Sunnyvale, CA (US); Eddie Gonzalez, San Francisco, CA (US); Michael Pless, Lodi, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 561 days.

This patent is subject to a terminal disclaimer.

(21) Appl. No.: 14/331,729

(22) Filed: Jul. 15, 2014

(65) Prior Publication Data

US 2015/0108687 A1    Apr. 23, 2015

Related U.S. Application Data

(60) Provisional application No. 61/893,286, filed on Oct. 21, 2013.

(51) Int. Cl.
*B29C 64/118* (2017.01)
*B29C 64/259* (2017.01)
(Continued)

(52) U.S. Cl.
CPC .......... *B29C 64/118* (2017.08); *B29C 64/209* (2017.08); *B29C 64/259* (2017.08);
(Continued)

(58) Field of Classification Search
CPC .. B01D 45/14; B01D 46/0032; B01D 46/442; B01D 46/444; B01D 46/448;
(Continued)

(56) References Cited

U.S. PATENT DOCUMENTS 3,534,926 A    10/1970    Wuenscher
3,583,467 A     6/1971    Bennett et al.
(Continued)

FOREIGN PATENT DOCUMENTS

DE    10335735    2/2005
EP     2727709    5/2017
(Continued)

OTHER PUBLICATIONS

Crockett, Fused Deposition Modeling in Microgravity, 1999, NASA, http://sffsymposium.engr.utexas.edu/Manuscripts/1999/1999-078-Crockett.pdf (Year: 1999).*

(Continued)

*Primary Examiner* — Matthew J Daniels
*Assistant Examiner* — Andrew L Swanson
(74) *Attorney, Agent, or Firm* — Terry M. Sanks, Esq.; Beusse Sanks, PLLC

(57) ABSTRACT

Additive manufacturing devices operable in various external force environments are disclosed. In an aspect, an additive manufacturing device operable in microgravity is disclosed. In other aspects, devices which are operable in high-vibration environments or varying external force environments are disclosed. Additive manufacturing devices herein may produce parts from metal, polymer, or other feedstocks.

43 Claims, 42 Drawing Sheets

(51) Int. Cl.
*B29C 64/209* (2017.01)
*B29C 64/321* (2017.01)
*B33Y 10/00* (2015.01)
*B33Y 30/00* (2015.01)
*B33Y 50/02* (2015.01)
*B29C 64/25* (2017.01)
*B33Y 40/00* (2020.01)

(52) U.S. Cl.
CPC ............ *B29C 64/321* (2017.08); *B29C 64/25* (2017.08); *B33Y 10/00* (2014.12); *B33Y 30/00* (2014.12); *B33Y 40/00* (2014.12); *B33Y 50/02* (2014.12)

(58) Field of Classification Search
CPC ...... B01D 50/002; B22D 11/01; B22D 11/10; B22D 11/16; B29C 67/0055
See application file for complete search history.

(56) References Cited

U.S. PATENT DOCUMENTS

| | | | |
|---|---|---|---|
| 4,093,019 A | 6/1978 | Seybold et al. | |
| 4,439,979 A * | 4/1984 | Winkelmann | D01H 1/108 242/128 |
| 4,614,630 A | 9/1986 | Pluim, Jr. | |
| 4,729,780 A | 3/1988 | Shimizu | |
| 4,753,730 A | 6/1988 | Maurer | |
| 5,259,436 A | 11/1993 | Yun et al. | |
| 5,303,141 A * | 4/1994 | Batchelder | B29C 41/36 156/244.11 |
| 5,541,802 A * | 7/1996 | Bodahl-Johnsen | H02H 9/004 361/111 |
| 5,562,150 A | 10/1996 | Shimmell | |
| 5,775,402 A | 7/1998 | Sachs et al. | |
| 5,920,483 A * | 7/1999 | Greenwood | G05B 19/401 409/132 |
| 6,004,124 A * | 12/1999 | Swanson | B29C 47/12 264/308 |
| 6,135,880 A * | 10/2000 | Ho | F24F 13/075 454/325 |
| 6,143,378 A | 11/2000 | Harwell et al. | |
| 6,367,765 B1 | 4/2002 | Wieder | |
| 6,431,975 B1 | 8/2002 | Ryan | |
| 6,575,548 B1 | 6/2003 | Corrigan et al. | |
| 6,758,876 B2 | 7/2004 | Suzuki et al. | |
| 6,772,026 B2 | 8/2004 | Bradbury et al. | |
| 6,989,115 B2 * | 1/2006 | Russell | B33Y 10/00 264/39 |
| 7,045,738 B1 | 5/2006 | Kovacevic et al. | |
| 7,168,935 B1 * | 1/2007 | Taminger | B23K 15/0073 219/121.12 |
| 7,777,155 B2 | 8/2010 | Twelves, Jr. et al. | |
| 8,342,229 B1 | 1/2013 | Ziani et al. | |
| 8,794,263 B2 | 8/2014 | Scott et al. | |
| 8,983,957 B2 | 3/2015 | Rathod | |
| 2001/0030383 A1 * | 10/2001 | Swanson | B29C 41/36 264/308 |
| 2003/0230393 A1 | 12/2003 | Kimura et al. | |
| 2003/0235635 A1 * | 12/2003 | Fong | B08B 15/02 425/73 |
| 2004/0003738 A1 * | 1/2004 | Imiolek | B22F 3/1055 101/480 |
| 2004/0035542 A1 * | 2/2004 | Ederer | B22C 7/00 164/45 |
| 2004/0145629 A1 | 7/2004 | Silverbrook | |
| 2005/0023710 A1 | 2/2005 | Brodkin et al. | |
| 2005/0133653 A1 * | 6/2005 | Heaney | B65H 49/02 242/410 |
| 2005/0194401 A1 | 9/2005 | Khoshnevis | |
| 2005/0271414 A1 | 12/2005 | Katayama et al. | |
| 2006/0156978 A1 * | 7/2006 | Lipson | B29C 67/0055 118/708 |
| 2006/0192322 A1 * | 8/2006 | Abe | B22F 3/1055 264/497 |
| 2007/0267165 A1 | 11/2007 | Monteiro et al. | |
| 2008/0136066 A1 * | 6/2008 | Taylor | H05B 6/107 264/486 |
| 2008/0150192 A1 * | 6/2008 | Perret | B22F 3/1055 264/308 |
| 2009/0011066 A1 | 1/2009 | Davidson et al. | |
| 2009/0050289 A1 | 2/2009 | Lismont | |
| 2009/0076643 A1 | 3/2009 | Silverbrook | |
| 2009/0177309 A1 | 7/2009 | Kozlak | |
| 2009/0208577 A1 | 8/2009 | Xu et al. | |
| 2009/0252925 A1 | 10/2009 | Provoost et al. | |
| 2009/0267269 A1 * | 10/2009 | Lim | B29C 67/0059 264/401 |
| 2011/0030557 A1 | 2/2011 | Brownstein et al. | |
| 2012/0113473 A1 | 5/2012 | Pettis | |
| 2013/0209600 A1 * | 8/2013 | Tow | B29C 67/0074 425/375 |
| 2014/0020192 A1 | 1/2014 | Jones et al. | |
| 2014/0050921 A1 | 2/2014 | Lyons et al. | |
| 2014/0085620 A1 * | 3/2014 | Lobovsky | G03F 7/70775 355/72 |
| 2014/0252668 A1 | 9/2014 | Austin et al. | |
| 2014/0268604 A1 | 9/2014 | Wicker et al. | |
| 2014/0277659 A1 | 9/2014 | Kumar et al. | |
| 2014/0316546 A1 | 10/2014 | Walsh et al. | |
| 2015/0096713 A1 | 4/2015 | Marcin | |
| 2015/0104802 A1 | 4/2015 | Reep et al. | |
| 2015/0108687 A1 | 4/2015 | Snyder et al. | |
| 2015/0165693 A1 | 6/2015 | Sagoo et al. | |
| 2015/0209978 A1 | 7/2015 | Snyder et al. | |
| 2016/0001364 A1 | 1/2016 | Mironets et al. | |
| 2016/0067919 A1 | 3/2016 | Hoyt et al. | |
| 2016/0068793 A1 * | 3/2016 | Maggiore | C12M 21/08 435/289.1 |
| 2016/0082652 A1 | 3/2016 | Snyder et al. | |
| 2016/0167254 A1 | 6/2016 | Cushing et al. | |
| 2016/0184893 A1 | 6/2016 | Dave et al. | |
| 2016/0207262 A1 | 7/2016 | Trowbridge | |
| 2016/0214175 A1 | 7/2016 | Nordstrom | |
| 2016/0243759 A1 | 8/2016 | Snyder et al. | |
| 2017/0038342 A1 | 2/2017 | Clavette et al. | |

FOREIGN PATENT DOCUMENTS

| | | |
|---|---|---|
| GB | 2399049 | 1/2006 |
| JP | 2009013395 | 1/2009 |
| JP | 2009013395 | 4/2009 |
| WO | 2014070007 | 5/2014 |
| WO | 2014/144098 | 9/2014 |
| WO | 2015066607 | 5/2015 |

OTHER PUBLICATIONS

Cooper, Microgravity Manufacturing Via Fused Deposition, Jul. 2003, NASA, https://ntrs.nasa.gov/archive/nasa/casi.ntrs.nasa.gov/20030067856.pdf (Year: 2003).*

Dunn et al., "3D Printing in Space: Enabling New Markets and Accelerating the Growth of Orbital Infrastructure," Space Studies Institute, Oct. 29-31, 2010.

Gaerisl, "Fume Chamber (Negative-Pressure, Activated Carbon Filtering)," https://www.thingiverse.com/thing:13851, Nov. 23, 2011.

O'Connell, Frank, "A Machine that Gives Shape to Your Ideas," https://archive.nyhmes.com/www.nytimes.com/interactive/2011/06/15/technology/personaltech/20110915-BASICS.html?_r=0, Sep. 14, 2011.

LeftAngle, "Injection Printing—Injection Molding on Your 3D Printer," Thingiverse, https://www.thingiverse.com/thing:82666, May 1, 2013.

LeftAngle, "Extreme High Definition Parts on Your 3D Printer," https://www.thingiverse.com/thing:83805, May 4, 2013.

* cited by examiner

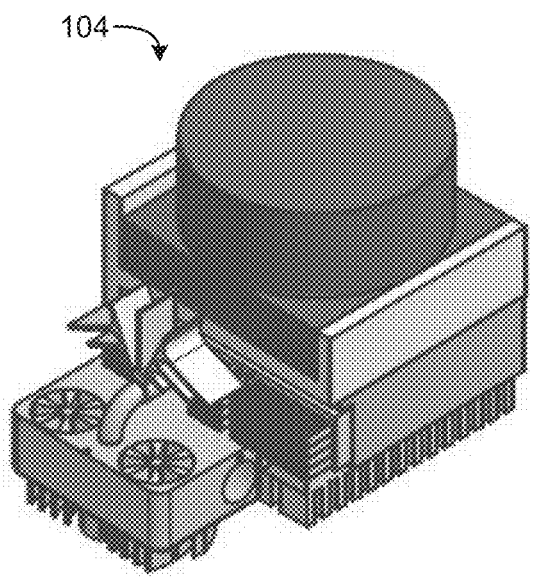
FIG. 48
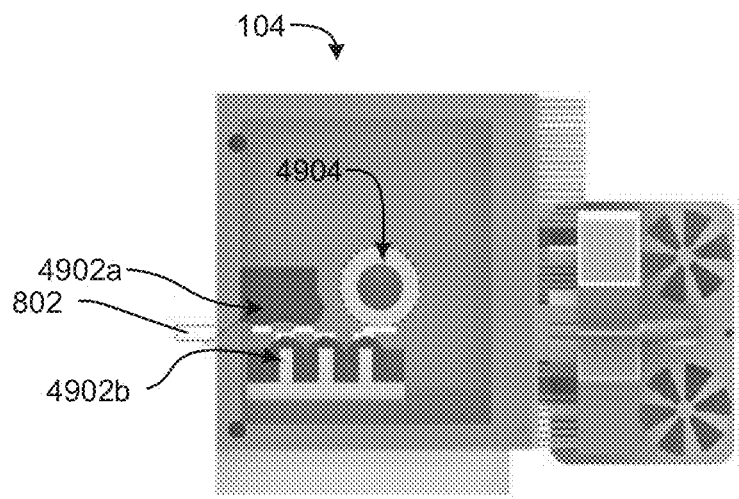
FIG. 49
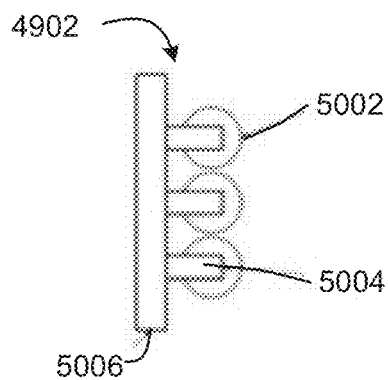 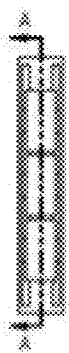 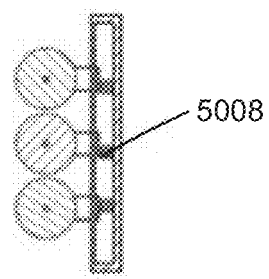
FIG. 50A    FIG. 50B    FIG. 50C

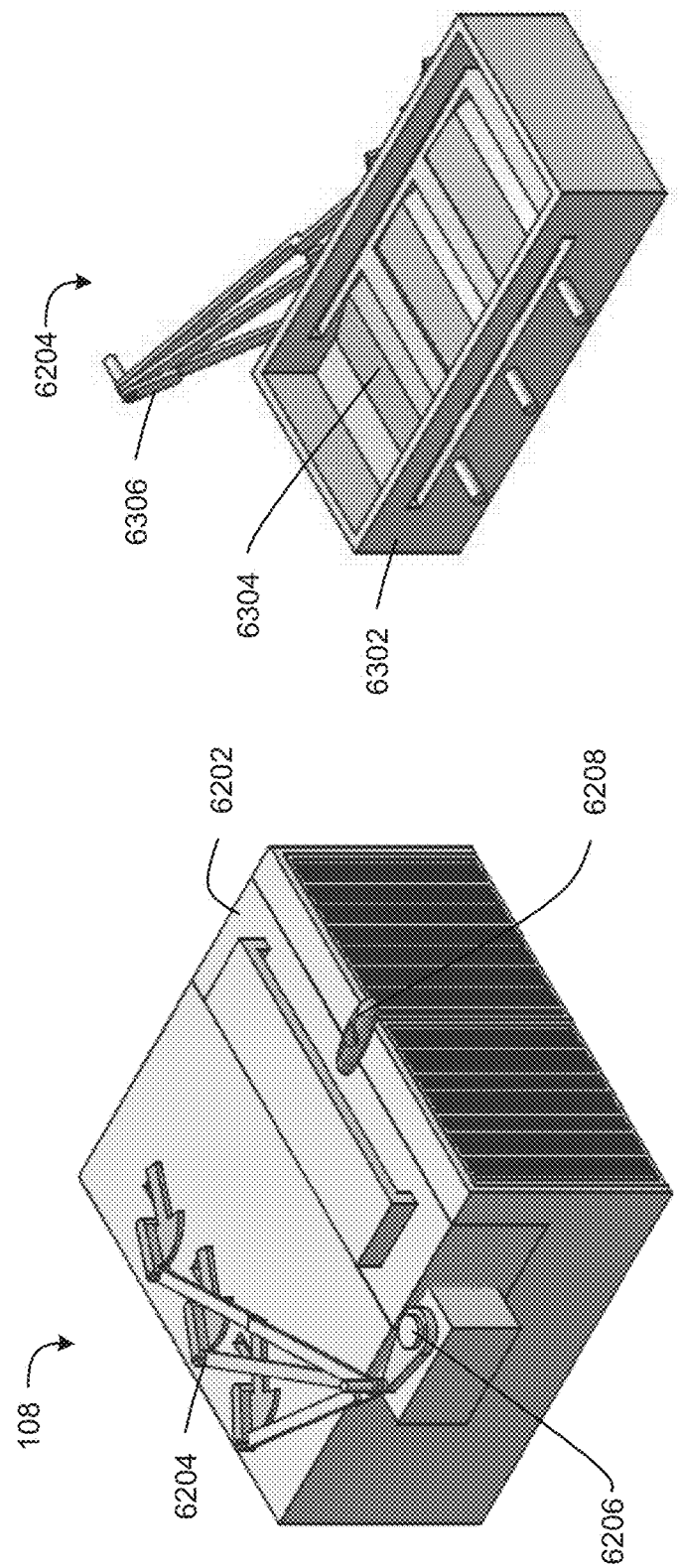

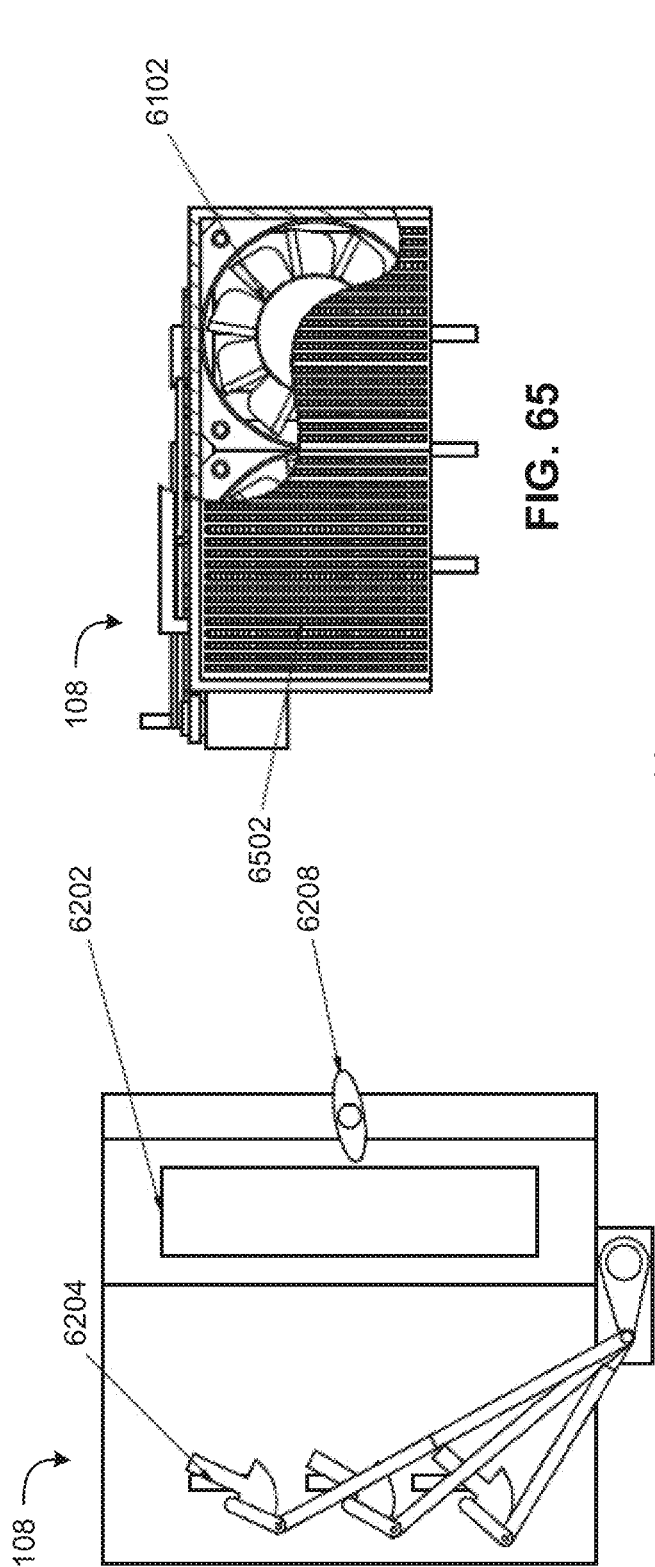
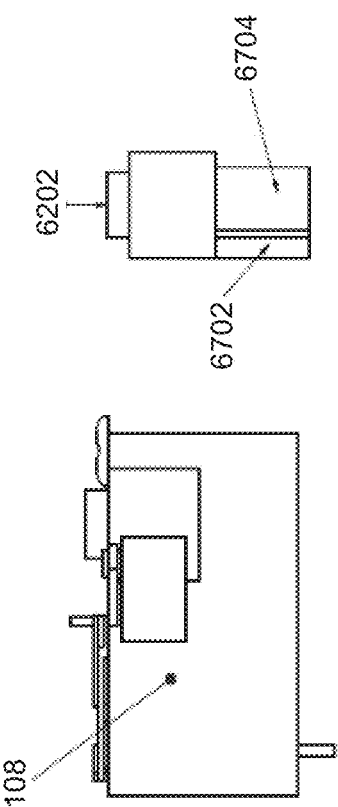

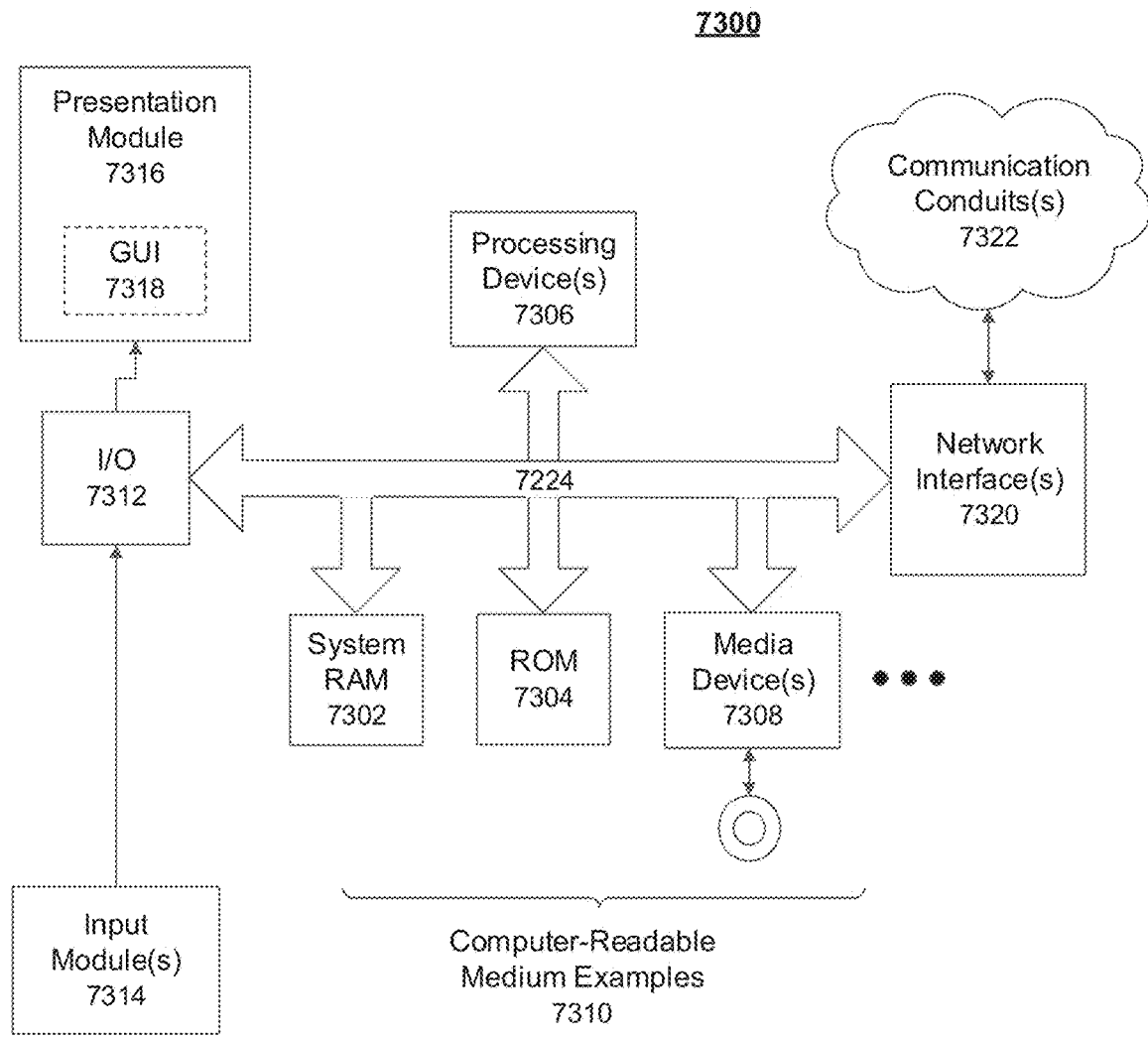
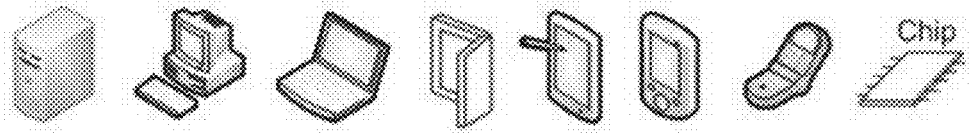
FIG. 73

MANUFACTURING IN MICROGRAVITY AND VARYING EXTERNAL FORCE ENVIRONMENTS

CROSS REFERENCE TO RELATED APPLICATION

This application claims the benefit of U.S. Provisional Patent Application No. 61/893,286, filed Oct. 21, 2013, and entitled "Additive Manufacturing Devices Configured For Various Environments," the entire contents of which is incorporated herein by reference.

STATEMENT REGARDING FEDERALLY-SPONSORED RESEARCH OR DEVELOPMENT

This invention was made with government support under contract numbers NNX12CE77P, NNX13CMO1C and NNM13AAO2C awarded by the National Aeronautics and Space Administration. The government has certain rights in the invention.

FIELD OF THE DISCLOSURE

The present disclosure generally relates to manufacturing, and more particularly to products for additive manufacturing in extreme environments, microgravity environments, terrestrial environments, free fall environments, nautical environments, variable force environments and other controlled environments.

BACKGROUND

Additive manufacturing techniques enable the rapid creation of objects, structures, portions thereof, prototypes, replacement parts, experimental parts, and make-shift items. Such items may be useful in inhospitable environments such as outer space, on a celestial body, aboard a marine vessel, underwater and remote environments. However, current additive manufacturing devices cannot function in such inhospitable environments due to, among other things, lack of gravity (e.g., in orbit, aboard a space station), low and high frequency vibration (e.g., aboard a marine vessel, on a submarine), unpredictable shocks (e.g., rocking and jostling of a marine vessel due to rough seas), and pitching or other alteration of the gravitational force relative to the build axis (e.g., during parabolic aircraft flight, a submarine rising or diving).

Current additive manufacturing devices generally require a flat, stable, gravitationally-uniform environment throughout a build in order to successfully produce a part. Such conditions do not exist in outer space, on or around other planets and celestial bodies, aboard spacecraft, aboard aircraft, on marine vessels (including submarines) or in other extreme environments.

Terrestrial manufacturing devices may produce parts via additive processes. That is, material is sequentially bonded or otherwise mechanically or chemically joined together in order to form the desired object. One class of additive manufacturing devices, fused deposition modeling (FDM) devices utilized a source of thermoplastics to produce parts. FDM devices often comprise a horizontally-oriented build table positionable in the z-axis and an extrusion nozzle which may be positioned where desired in an X/Y-plane. Positioning is controlled by worm gears, belt drives and the like. Such devices facilitate positioning portions of the additive manufacturing device but are susceptible to slippage and movement in microgravity or high-vibration environments. The extrusion nozzle is positioned and heated to a temperature which will melt supplied thermoplastic. Thermoplastic is fed through the nozzle, thereby depositing a desired amount of molten plastic at a location in order to form a portion of a part. In microgravity environments, FDM devices are unable to adequately position the extrusion nozzle relative to the build table, causing part construction failure. Maintaining a consistent flow of material through the extrusion nozzle may also be complicated. There is also risk that molten thermoplastic or feedstock may migrate or otherwise float away before adhering to in the desired location due to the lack of net external force to hold the material down. Similarly, in high-vibration environments, terrestrial additive manufacturing devices are unable to stabilize the position of the extrusion nozzle or other material deposition means relative to the build area, nor is a consistent flow of molten material achieved, preventing consistent creation of a part.

Given the foregoing, additive manufacturing devices which function in inhospitable environments such as outer space, aboard a marine vessel, underwater and remote environments are needed.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Aspects of the present disclosure meet the above-identified needs by providing apparatus, systems, and methods which enable additive manufacturing in inhospitable environments such as outer space, on a celestial body (e.g., Earth, the Moon, an asteroid), aboard a marine vessel, underwater and remote environments.

In an aspect, an additive manufacturing device operable in non-traditional environments such as space, aboard a marine vessel, underwater and/or other remote environments is disclosed. The additive manufacturing device comprises an extruder, a feedstock source providing filament to the extruder, a traverse system, an environmental control unit, an enclosed build environment, control electronics, and a build platform assembly. The position of the build platform is precisely controlled and maintained relative to the position of the extruder during operation. In some aspects, the extruder includes a sensor which detects the position of the part being constructed and/or the build platform assembly. This data is relayed to the control electronics which actively adjust the position of the extruder and/or the build platform during part creation to ensure that the proper location of the material being added to the part is correct and consistent. Maintaining precise positioning of the extruder relative to the part being created and/or the build platform without assistance from a large, constant external force (e.g., gravity) is essential in order to ensure that the material added is placed and solidifies in the proper position. In some aspects, if the distance between the part being created and the extruder is too great, molten feedstock may float away, become poorly positioned, or otherwise escape the build volume. Thus, devices in accordance with portions of the present disclosure maintain a defined distance between the part being created and the extruder during operations and regulate the flow of material based on the location of the extruder.

In some aspects, the traverse system controls the relative positions of the extruder and the build platform. The traverse system may comprise three linear actuators capable of sub-millimeter positioning of an attached carriage. Such linear actuators rigidly hold the position of the carriage in microgravity environments, thereby maintaining the desired relative positions of the extruder and the build platforms and enabling creation of parts on, for example, spacecraft, space stations, satellites, and the like. In some aspects the linear actuators are vibration resistant. In such aspects, the additive manufacturing device may be operated in high-vibration environments such as on a marine vessel, submarine, or the like.

Production of parts in such environments is advantageous because specific parts need not be shipped to the remote or inaccessible location or stocked at launch. Rather, only feedstock needs to be supplied and additive manufacturing devices in accordance with the present disclosure may create desired parts such as objects, structures, expendable parts, replacement parts, experimental objects, make-shift repairs, portions of any of the foregoing, and the like.

Among other features and advantages, devices in accordance with the present disclosure enable creation of parts from plastic, metal, organic material, inorganic materials or combinations of such materials. Such parts may be created in microgravity environments such as in orbit or elsewhere in space. This production facilitates on-demand part production, eliminating the need to wait for parts to be delivered from terrestrial manufacturing facilities or other locations. Such devices may be used to produce custom emergency devices and enable rapid repair of malfunctioning equipment. Devices in space may also be more easily upgraded via creation of new parts.

Additive manufacturing devices operating in space also have many terrestrial uses due to the ability to produce precision parts (e.g., ball bearings, fuel cell parts and the like) without the force of gravity.

Re-supply missions make extended stay on orbit possible but are not always a success in bringing payloads to orbiting space stations. An additive manufacturing device in accordance with the present disclosure located on such stations reduces mass delivered, thereby potentially reducing the number of resupply missions needed, and may increase redundancy due to the ability to produce parts and equipment when needed.

In an aspect, an additive manufacturing device in accordance with the present disclosure is used in conjunction with a centrifuge or similar device with provides an external force.

The ability to have less dependency on Earth will allow for future spacecraft to utilize similar systems to enable travel to the Moon, Mars, and beyond. Aspects of the present disclosure may facilitate creation and assembly of spacecraft in-space, resulting in significant cost and time savings.

Further features and advantages of the present disclosure, as well as the structure and operation of various aspects of the present disclosure, are described in detail below with reference to the accompanying drawings.

BRIEF DESCRIPTION OF THE DRAWINGS

The features and advantages of the present disclosure will become more apparent from the Detailed Description set forth below when taken in conjunction with the drawings in which like reference numbers indicate identical or functionally similar elements.

FIG. 48 is a perspective view of an additive manufacturing device extruder, according to various aspects of the present disclosure.

FIG. 49 is a top view of the extruder of FIG. 48, having the motor and motor mount removed and showing the filament drive mechanism, according to various aspects of the present disclosure.

FIGS. 50A-C are views of a filament retaining device useful for guiding and tensioning filament within an additive manufacturing device extruder, according to various aspects of the present disclosure.

FIG. 62 is a perspective view of an environmental control unit configured to facilitate operation of an additive manufacturing device in an enclosed or controlled environment, the environmental control unit having a shutter assembly, according to various aspects of the present disclosure.

FIG. 63 is a perspective view of shutter assembly of the environmental control unit of FIG. 62.

FIG. 64 is a top view of the environmental control unit of FIG. 62.

FIG. 65 is a front view of the environmental control unit of FIG. 62, having a partial cutaway view exposing two fans.

FIG. 66 is a side view of the environmental control unit of FIG. 62.

FIG. 67 is a side view of a removable filter for the environmental control unit of FIG. 62.

FIG. 73 is a block diagram of an exemplary computing system useful for implementing various aspects of the present disclosure.

DETAILED DESCRIPTION

Figure 1:
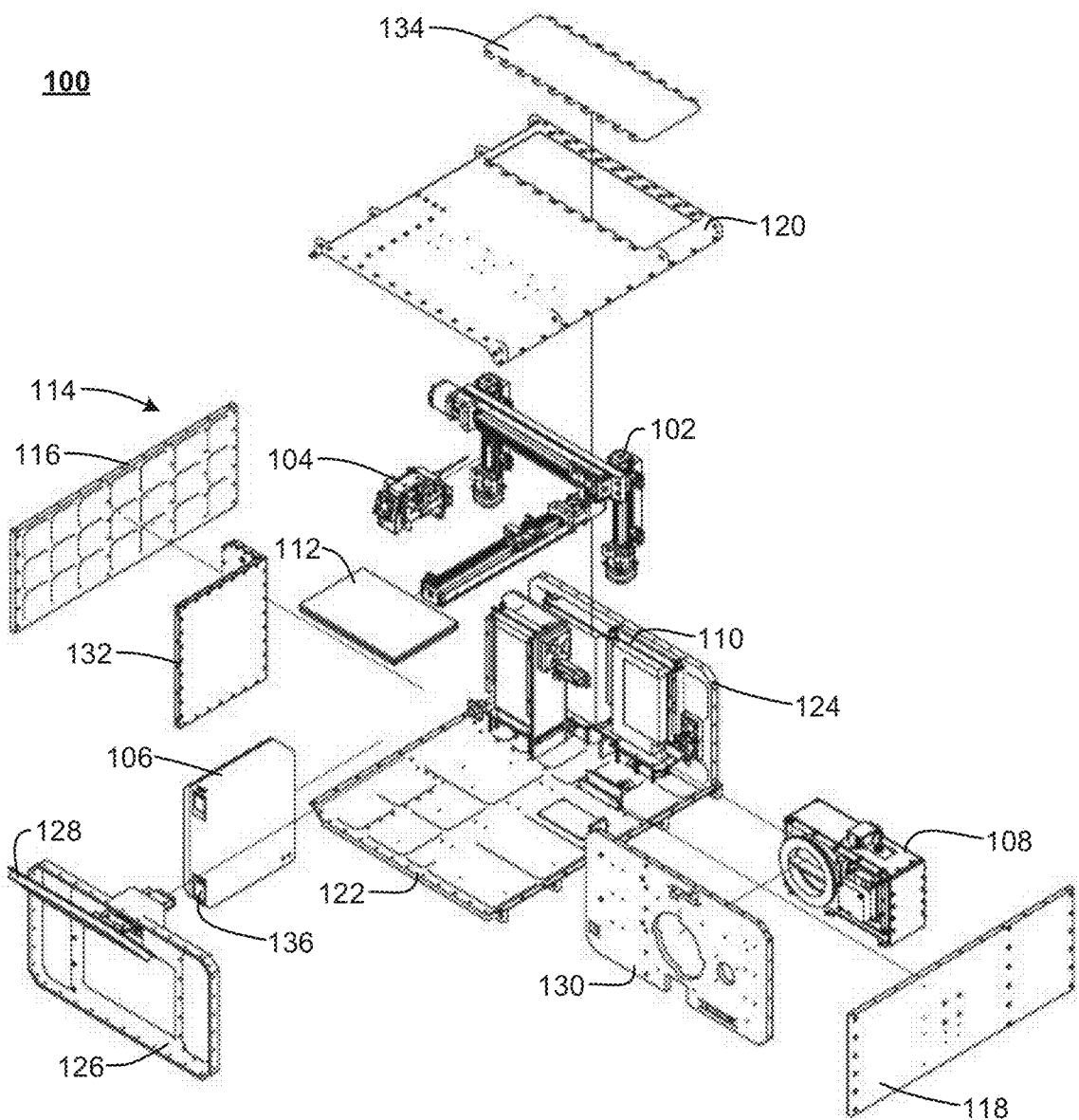
FIG. 1 is an exploded perspective view of an additive manufacturing device operable in a variety of force and gravitational environments, including microgravity, according to aspects of the present disclosure.

The present disclosure is directed apparatus, systems, and methods which enable additive manufacturing in a variety of environments including but not limited to extreme environments, microgravity environments, terrestrial environments, free fall environments, nautical environments, variable force environments, other controlled environments, and the like. Additive manufacturing in accordance with the present disclosure may create desired parts as objects, structures, expendable parts, replacement parts, experimental objects, make-shift repairs, portions of any of the foregoing, and the like. Instructions for the production of such parts may be pre-programmed within the device, provided by a local computing device (e.g., a computing device on a space station containing the additive manufacturing device), transmitted from a remote location (e.g., received from a remote server, received from a computing device on another celestial body or spacecraft), or received or generated at another location apparent to those skilled in the relevant art(s) after reading the description herein.

Apparatus and methods disclosed herein may be adapted for use in terrestrial environments, on other celestial bodies, or in high acceleration and vibration environments such as those found aboard a marine vessel or submarine.

In an aspect, an additive manufacturing device comprising an extruder, a feedstock source providing filament to the extruder, a traverse system, an environmental control unit, an enclosed build environment, control electronics and a build platform assembly is disclosed. The position of the build platform is controlled and maintained relative to the position of the extruder during operation.

Various devices in accordance with the present disclosure may function in a pressurized environment (e.g., within a spacecraft), in a space environment, on a celestial body, while being exposed solar radiation, large thermal extremes and gradients, atomic oxygen and the like.

In some aspects, the build platform includes automatic leveling components.

In some aspects, the extruder includes a sensor which detects the position of the part being constructed and/or the build platform assembly. This data is relayed to the control electronics which actively adjust the position of the extruder and/or the build platform during part creation to ensure that the proper location of the material being added to the part is correct and consistent. Precise positioning of the extruder relative to the part being created and/or the build platform is essential in order to ensure that the material added is placed and solidifies in the proper position.

In an aspect, an additive manufacturing device in accordance with the present disclosure is used in conjunction with a centrifuge or similar device with provides an external force.

In some aspects, if the distance between the part being created and the extruder is too great, molten feedstock may float away, become poorly positioned, or otherwise escape the build volume. Thus, devices in accordance with portions of the present disclosure maintain a defined distance between the part being created and the extruder during operations and regulate the flow of material based on the location of the extruder.

Figure 2:
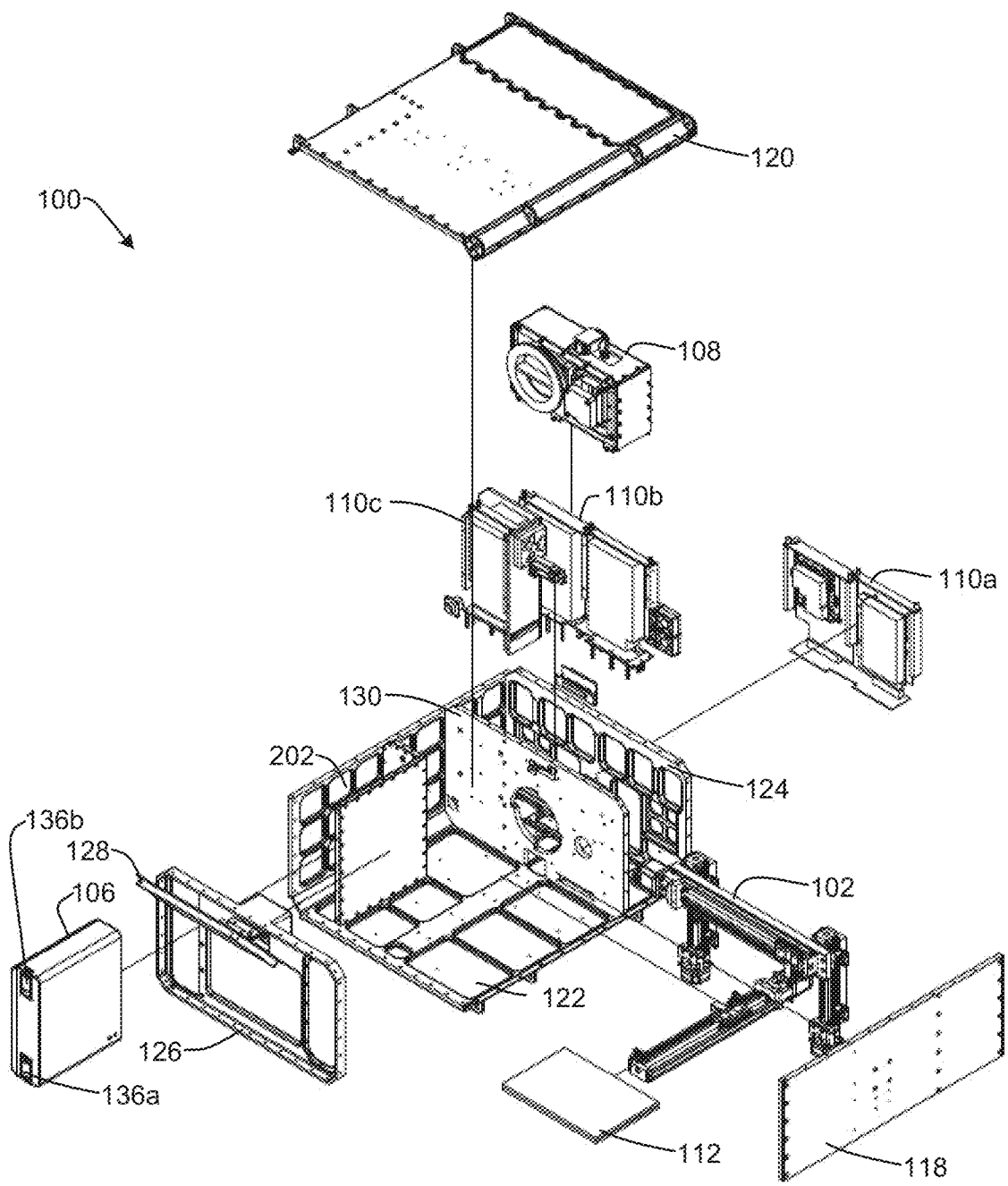
FIG. 2 is an exploded perspective view of the additive manufacturing device shown in FIG. 1.
Figure 3:
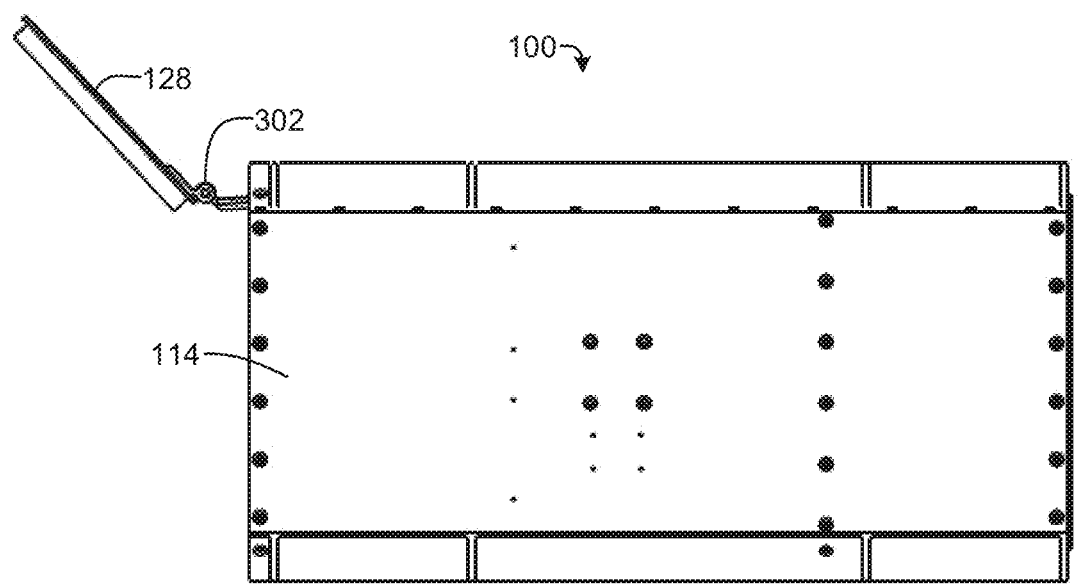
FIG. 3 is a side view of the additive manufacturing device of FIG. 1.
Figure 4:
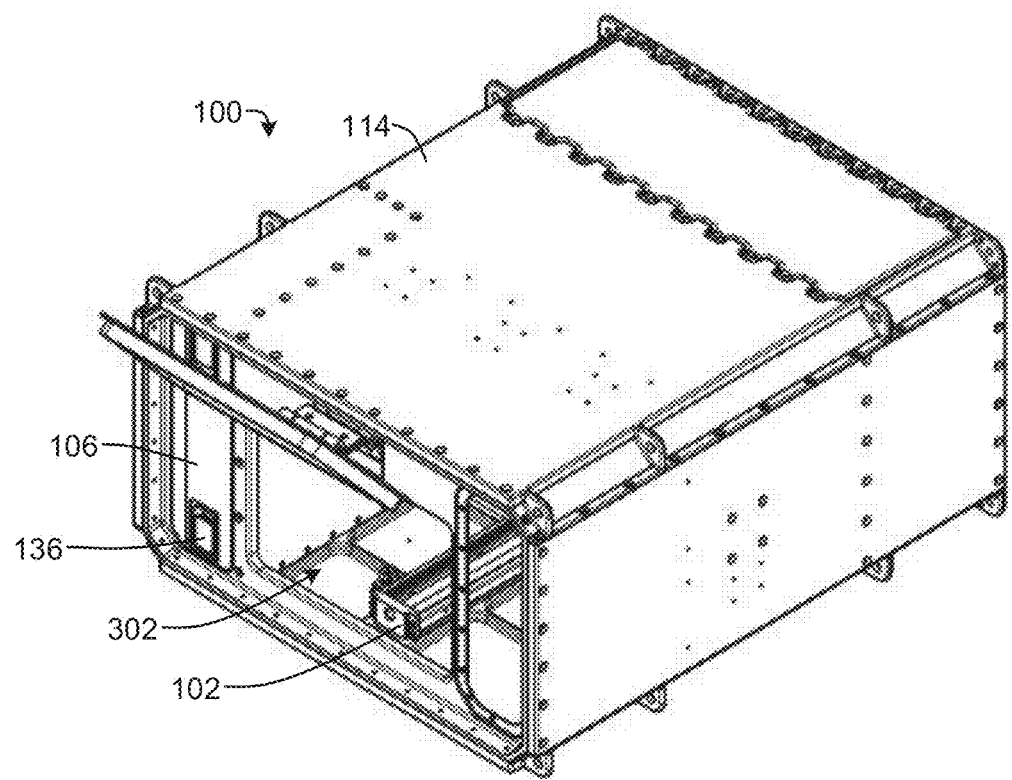
FIG. 4 is a perspective view of the additive manufacturing device of FIG. 1.

Referring now to FIGS. 1-4, various views of an additive manufacturing device 100 operable in a variety of force and gravitational environments, including microgravity, according to aspects of the present disclosure, are shown. FIGS. 1 and 2 show exploded views of device 100. FIGS. 3 and 4 show side views and perspective views, respectively, of an assembled device 100.

In an aspect, additive manufacturing device 100 is configured to produce parts using filament or other feedstock source, including feedstock made from the materials mentioned above. In various aspects, additive manufacturing device 100 is configured to produce parts in outer space, aboard a marine vessel, underwater and remote environments. Device 100 is operable on a spacecraft, on a satellite, on a suborbital vehicle and the like.

Additive manufacturing device 100 comprises a traverse system 102, an extruder 104, a feedstock source 106, an environmental control unit (ECU) 108, control electronics and power supply 110 (labeled as control electronics 110a-c in FIG. 1), a build platform assembly 112 and frame 114. In some aspects, one or more components is omitted. For example, internal control electronics 110 may be omitted in favor of control signals being provided by an on-site or off-site computing device. Device 100 may comprise a data connection such as a wireless communications module, an Ethernet connection, a USB connection, or the like which is communicatively connected to other portions of device 100 in order to facilitate communication with off-site or on-site computing devices. In some aspects, off-site or on-site computing devices provide some instructions and control (e.g., part creation plans), thereby augmenting the operations carried out by control electronics 110.

In some aspects, device 100 includes one or more sensors which monitor the functionality of device 100 and/or portions of device 100, monitor device 100 surroundings, and/or monitor other aspects apparent to those skilled in the relevant art(s) after reading the description herein. Sensors may include, but are not limited to: collision sensors, absolute position sensors, relative position sensors, range finders, light meters, Geiger counters, particle detectors, air flow meters, vibration sensors, accelerometers, humidity sensors, gas sensors, barometers, level sensors, load cells, temperature sensors, and any other sensor or measuring device apparent to those skilled in the relevant art(s) after reading the description herein.

In some aspects, additive manufacturing device 100 includes a feedstock source, a material bonding component which places and/or bonds portions of feedstock from the feed stock source according to part creation instructions and a material bonding component positioning system which positions the material bonding component according to part creation instructions. In other aspects, the material bonding component positioning system may control the relative position of the material bonding component and the part being created (e.g., where the part is attached to a build plate and feedstock is bonded to it from a bed of ferrous feedstock or from a resin or the like). Parts, or portions of parts, may be created within a build volume according to part creation instructions. Additive manufacturing device 100 creates a desired part via feedstock. Feedstock may include any material or combination of materials which device 100 may be adapted to produce parts from in an iterative fashion. Additive manufacturing creates parts from feedstock by bonding or otherwise connecting small portions of feedstock together, the features of the created part being significantly smaller than the overall volume of feedstock used.

Feedstock is any material or combination of materials suitable for the material bonding component to utilize in the production of a part. Feedstock may be plastic, metal, organic material, inorganic materials or combinations of such materials. As will be apparent to those skilled in the relevant art(s) after reading the description herein, materials such as acrylonitrile butadiene styrene (ABS), polycarbonate (PC), polylactic acid (PLA), high density polyethylene (HDPE), polyphenylsulfone (PPSU), soldering wire, polymer matrix composites, polyether ether keytone (PEEK), bismuth, aluminum, titanium, tin, and the like may be used to produce desired parts via additive manufacturing. In some aspects, feedstock is in the appropriate state, shape, size, and/or other physical characteristic suitable for utilization by the material bonding component. Feedstock may be produced from asteroid regolith, regolith of other celestial bodies, from space debris, from trash, from obsolete parts, and the like. In some aspects, feedstock is a polymer filament containing metal powder. In another aspect, feedstock is a polymer containing carbon nanotubes, fibers, or the like. In yet another aspect, feedstock is a resin, a resin containing a filler, binder, and/or powder, or the like. Feedstock may be a liquid or a combination of materials having different physical states (e.g., a solid and a liquid).

ECU 108 may be omitted in some aspects. Where device 100 does not comprise ECU 108, other environmental control systems (e.g., the environmental control systems of the container housing device 100, the spacecraft module containing device 100, the ship compartment containing device 100, and the like) may be adapted to filter, regulate and control the environment in and/or around device 100.

Traverse system 102 includes multiple screw driven linear actuators or other precision linear motion devices. An extruder group of linear actuators is connected to extruder 104, positioning extruder 104 in two axes. A build platform assembly actuator controls the position of the build platform assembly 112 is a third axis. The third axis may be parallel to an axis extruder 104 moves in or it may be orthogonal to extruder 104 movement axes. Traverse system 102 may be mounted to plate 130, providing a common anchor point. Each linear actuator or other motion device of traverse system 102 is rigidly and precisely connected to portions of frame 114, thereby providing reference points for movement and placement of extruder 104 and build platform assembly 112 in microgravity, aquatic, and other environments. Traverse system 102 is one form of a material deposition position system useful for implementing aspects of the present disclosure.

Filament extruder 104 is adapted to create a desired part on build platform assembly 112 via deposition of a polymer or other material. Extruder 104 is connected to portions of traverse system 102 and movable in, for example, two axes (e.g., x- and y-axes). Deposition may be done in an additive manner, such as a layer-wise or raster pattern. The positions of filament extruder 104 and build platform assembly 112 during construction may be controlled by control electronics 110, electrically connected to portions of traverse system 102. Control electronics 110 are also electrically connected to extruder 104, thereby controlling the flow and deposition of filament. Control electronics 110 may be software, hardware, or a combination of software and hardware. Control electronics 110 are configured to cause the desired part (e.g., a support structure) to be produced by additive manufacturing device 100. Control electronics 110 may include a power supply 110c housed within enclosure 114, thereby creating a modular device 100. In other aspects, the power supply is omitted and device 100 draws power from an external source, such as station power, grid power, ships mains, and the like. In yet other aspects, an external power supply is provided. Extruder 104 is one form of a material deposition component useful for implementing aspects of the present disclosure.

Control electronics 110 may include redundant systems. Redundancy may be desired when deploying device 100 in a space environment due to the negative effects of radiation on sensitive electronics. Redundancy allows high-speed, non-radiation hardened electronics to be used, rather than radiation hardened equipment. Such high-speed electronics enable faster computations and greater functionality compared to radiation-hardened equipment. Redundant systems are also useful in aquatic environments, high-vibration environments and the like. Redundant systems may run computations in parallel and "check each other." Such systems may also provide fail-over support. That is, if the primary system fails, secondary and other backup systems take over.

Extruder 104 is connected to a feedstock source 106. Feedstock source 106 houses and supplies material necessary to produce one or more parts via additive manufacturing device 100. In an aspect, feedstock source 106 is a removable assembly containing a spool of polymer filament threaded into filament extruder 106 at a front portion of extruder 106 thereby reducing the area occupied by filament within enclosure 114 and increasing the available build volume. Extruder 104 is configured to heat the polymer filament to its melting point and deposit the melted polymer in order to form the desired part. In another aspect, a spool of filament or other feedstock source 106 is integrated into device 100. Feedstock source 106 may include a motor or other device configured to actively feed out or otherwise supply filament.

Environmental control unit 108 is configured to regulate the environment of additive manufacturing device 100. In an aspect, environmental control unit 108 comprises at least one fan, a temperature regulation device (e.g., a heater, an air conditioning unit), and a filter. Environmental control unit 108 regulates one or more of: temperature, humidity, air circulation and air quality within additive manufacturing device 100, thereby preventing outgassing and contamination of the environment in which additive manufacturing device 300 is located during operation. Environmental control unit 108 may also include sensors which measure concentrations of harmful gases or other materials or environmental factors which would be dangerous to release from within enclosure 114. In this manner, ECU 108 may monitor and protect individuals and equipment in tight quarters with device 100 (e.g., on a space station, on a marine vessel, in a laboratory) from potentially harmful outgassing if enclosure 114 is opened before ECU 108 eliminates or captures such gases or materials. ECU 108 is connected with control electronics 110. Control electronics 110 operates ECU 108, facilitating regulation of temperature, humidity, air quality, air circulation and the like. In some aspects enclosure 114 includes a door 128 controllable by control electronics 110. Door 128 may not be opened until ECU 108 determines that, utilizing sensors and/or operating parameters (e.g., run time, wait time, contaminant concentration level thresholds, and the like) the enclosed environment will not contaminate the outside environment.

Build platform assembly 112 may be one or more components configured to hold and position a part being constructed by device 100. A build surface of build platform assembly 112 is positionable relative to extruder 104. For example build platform assembly 112 may be positionable in a third axis (e.g., the z-axis) via a portion of traverse system 102. In other aspects, build platform assembly 112 remains static and extruder 104 moves during creation of the part. In another aspect, build platform assembly 112 is omitted. In various aspects, build platform assembly 112 comprises a self-leveling print tray (not shown in FIG. 1), designed to save time and automate initialization of device 100. In some aspects, device 100 includes an optical sensor or other sensing device which measures the print tray and small piezoelectric motors connected to the print tray adjust the leveling accordingly. Adjustment may occur before, during and after part creation.

Enclosure 114 provides a closed environment for the build volume of device 100. In some aspects, device 100 is self-contained and enclosure 114 contains all portions of device. Enclosure 114 may have a metal construction and be configured to be electromagnetically isolated from the surrounding environment. In this manner, device 100 will not produce potentially harmful interference with communications equipment, laboratory instruments, other computing devices and the like. In other aspects, portions of enclosure 114 are constructed of plastic or other materials and/or may be produced by device 100 from feedstock provided. Via enclosure 114, device 100 may be mounted or otherwise connected to other objects such as an experiment bay, the deck or wall of a compartment and the like. The exterior of enclosure 114 may be formed by a baseplate 122, a back plate 124, a first side plate 116, a second side plate 118, a top plate 120 having an access panel and a front plate 126 having a door 128. The interior of enclosure 114 may include a partition 130 which separates the build volume, traverse assembly 102, build platform assembly 112 and extruder 104 from a rear section containing control electronics 110 and ECU 108. Partition 130 contains an opening which the filter access of ECU interlocks with, allowing access to ECU 108 filters from within the build volume. In this manner, a user may easily service ECU 108 without removing device 100 from its mounting location. Traverse system 102 is also mounted to partition 130, providing a stabilizing common surface. The interior of enclosure 114 may also include wall 132. Wall 132 is positioned at a front corner portion of enclosure and forms a feedstock cartridge receptacle 202. Receptacle 202 receives feedstock cartridge 106 via an opening in front plate 126. Receptacle 202 may include latches, catches or other retaining means for retaining cartridge 106. Door 128 allows the user to access the build area in order to remove completed parts, perform maintenance and the like. Door 128 may have a window. In some aspects, the window is an EMI shielded window. Door 128 may be connected to front plate 126 via a hinge 302. Hinge 302 may be motorized and/or controlled by control electronics 110.

Enclosure 114 may be configured to withstand and insulate internal components from shocks and other external forces (e.g., launch forces, forces encountered at sea, high g-forces, and the like). Enclosure 114 may be configured to electromagnetically isolate device 100 from the surrounding environment, thereby ensuring that EMI produced by the surrounding environment does not affect device 100 and vice versa.

In some aspects, device 100 does not include enclosure 114. For example device 100 may be attached to an end of a robotic arm and used to produce parts at various locations on the exterior of a spacecraft, space station, satellites, or the like. As will be apparent to those skilling in the relevant art(s) after reading the description herein, the robotic arm or other material bonding positioning system may or may not be a part of the object where the part is being created, thereby enabling repair, construction or the like of other devices.

In some aspects, device 100 includes one or more cameras to monitor part production, component functioning or the like. Device 100 may include multiple temperature sensors within enclosure 114.

Figure 5:
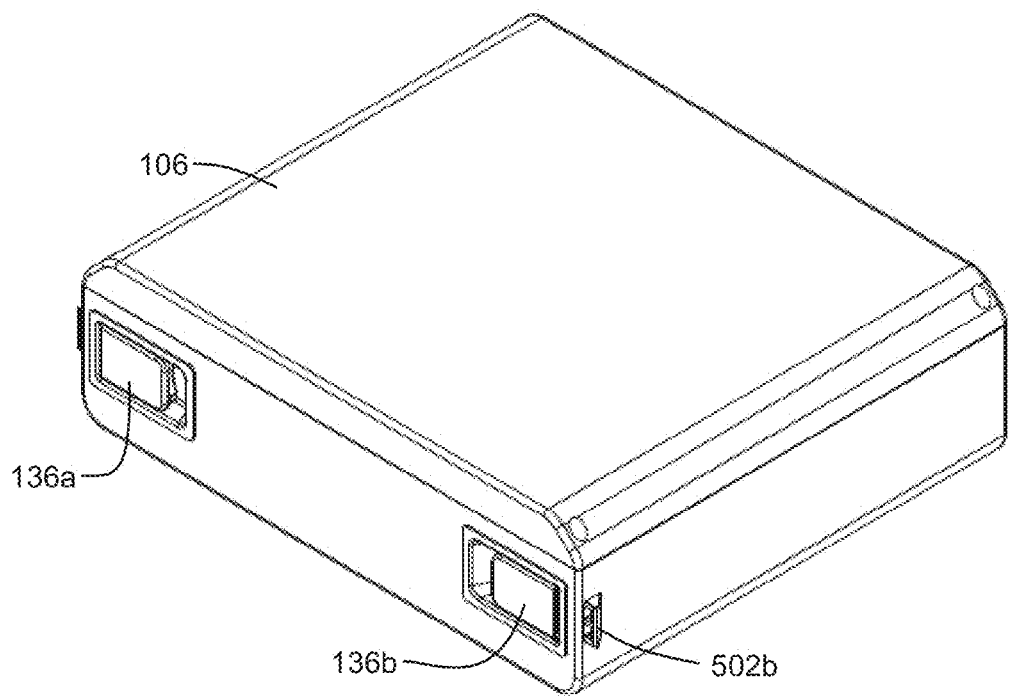
FIG. 5 is a perspective view of a feedstock cartridge utilized by an additive manufacturing device, according to aspects of the present disclosure.
Figure 6:
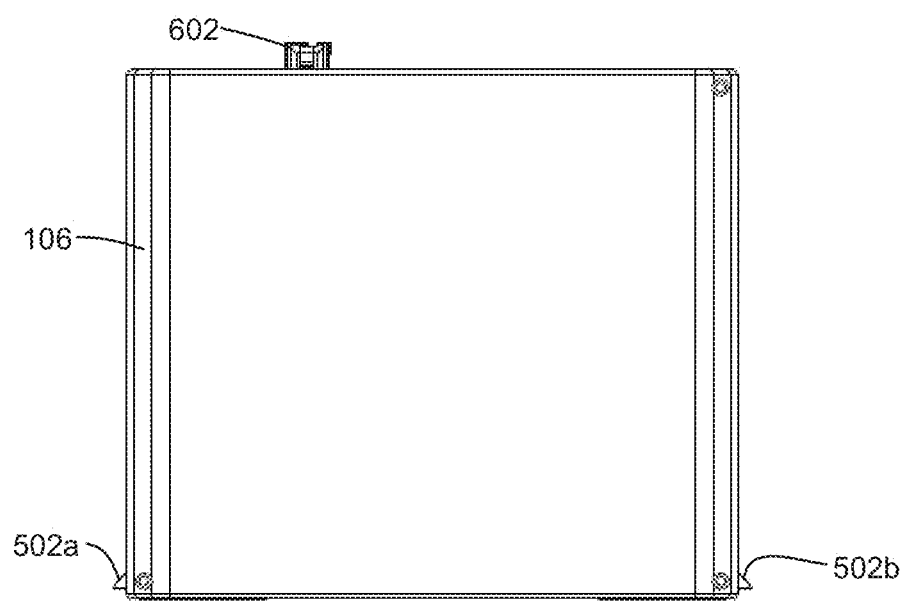
FIG. 6 is a top view of the feedstock cartridge of FIG. 5.
Figure 7:
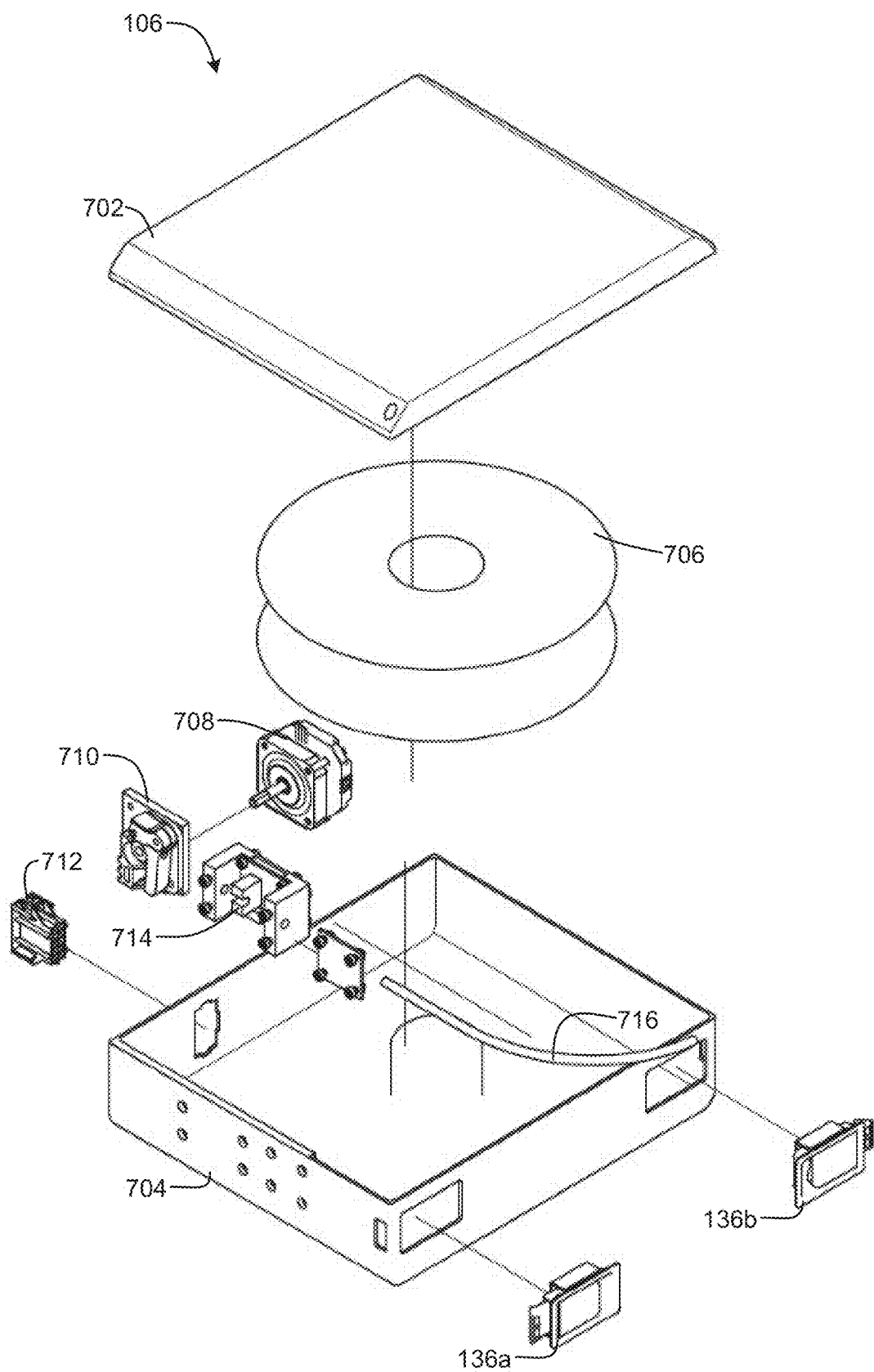
FIG. 7 is an exploded perspective view of the feedstock cartridge of FIG. 5.

Referring now to FIGS. 5-7, various views of a feedstock source, namely, a feedstock cartridge 106, utilized by additive manufacturing device 100, according to aspects of the present disclosure, are shown.

Feedstock cartridge 106 is removable and houses a spool of filament. The filament is fed through extruder 104, heated and deposited in order to create the desired part. Cartridge 106 comprises connection mechanisms 136 (labeled as connection mechanisms 136a-b) which engage a portion of device 100 and allow easy, tool-free removal of empty cartridges 106. In an aspect, connection mechanism 136 is a catch and latch system, the catch 502 engaging a portion of front plate 126 in order to retain cartridge 106 within device 100.

Cartridge 106 may comprise a cartridge frame 704, a cartridge cover 702, connection mechanisms 136, and a filament feeding mechanism comprising a spool 706, a filament guide tube 716, a stabilizer 714, a feeder 710 driven by a motor 708 and an interface port 712. Frame 704 and cover 702 enclose the filament feeding mechanism. The feeding mechanism may feed filament out of cartridge 106 from a location that minimized bends in the filament line, minimizes the length of exposed filament between cartridge 106 and extruder and/or be adapted for other purposes apparent to those skilled in the relevant art(s) after reading the description herein.

Within cartridge 106, filament may be fed through tube 716 into feeder 710. Tube is stabilized by stabilizer 714. Feeder 710 is driven by motor 708 which may be activated by control electronics 110, by onboard electronics (e.g., in response to changes in tension on filament), or the like. Filament exits cartridge 106 at port 712. Port 712 may connect or align with other portions of device 100, facilitating a smooth path for filament. Port 712 may also include electrical connections.

In some aspects, tube 716 begins inside cartridge 106 at stabilizer 714 and extends to a location near extruder 104, providing a protective flexible housing for filament until it reaches extruder 104. Tube 716 also stabilizes the filament as extruder moves about during part creation.

Feedstock cartridge 106 or other feedstock source may also include a memory storage device, an ambient temperature sensor, and/or a tube sensor. Other sensors may be included such as humidity sensors, pressure sensors, radiological sensors, gas detectors, and the like. Sensors and storage devices may be communicatively coupled to electronic control unit 100 via a push connector, wireless communications or the like. The memory storage device may store the serial number of feedstock cartridge 106, the feedstock type, the length of feedstock used (in the case of filament), the amount of feedstock remaining, and the like. The tube sensor may monitor tube 716 in order to ensure that filament 802 is travelling inside tube. If the tube sensor detects that there is no filament within tube 716, a stop command may be issued, preventing filament 802 from becoming stuck in tube 716 or extruder 104, thereby avoiding jams or other slowdowns in changing filament 802.

Device 100 may include multiple feedstock sources of different types, colors, and the like and may include multiple cartridge receptacles 202.

In some aspects, the feedstock source is a feedstock production source such as a recycling device. The feedstock source may be a spool, a wire, a rod, a block, or the like. The feedstock source may contain or receive byproducts from atmospheric processing, hydrocarbon processing, or the like. Feedstock source may be a bed of ferrous powder located on a magnetized build tray.

Figure 8:
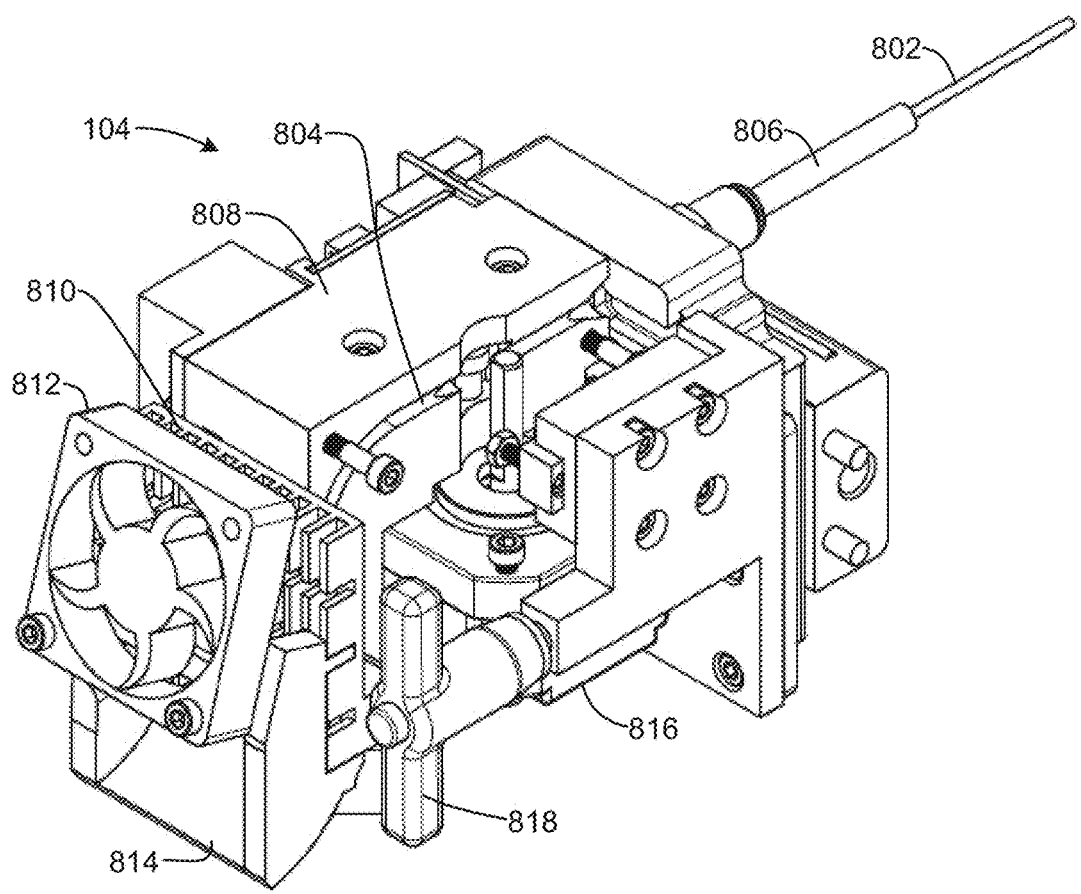
FIG. 8 is a perspective view of an additive manufacturing device extruder, according to aspects of the present disclosure.
Figure 9:
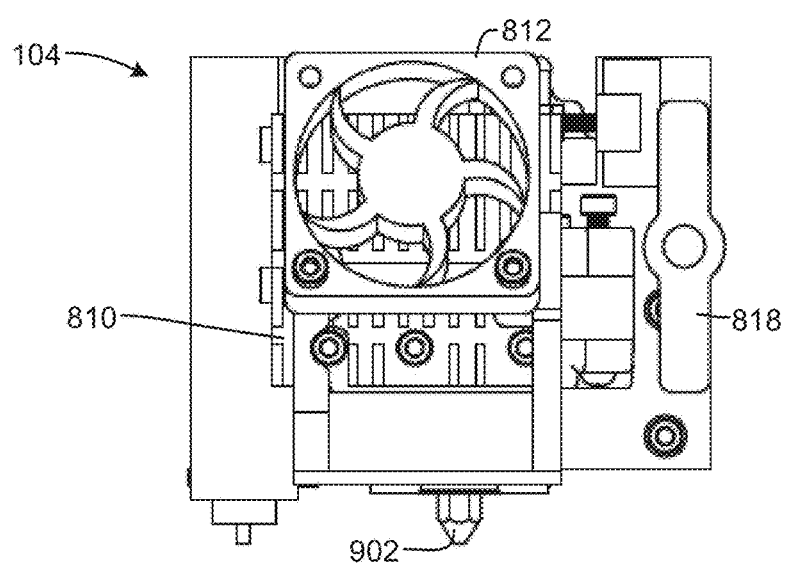
FIG. 9 is a top view of the extruder of FIG. 8.
Figure 10:
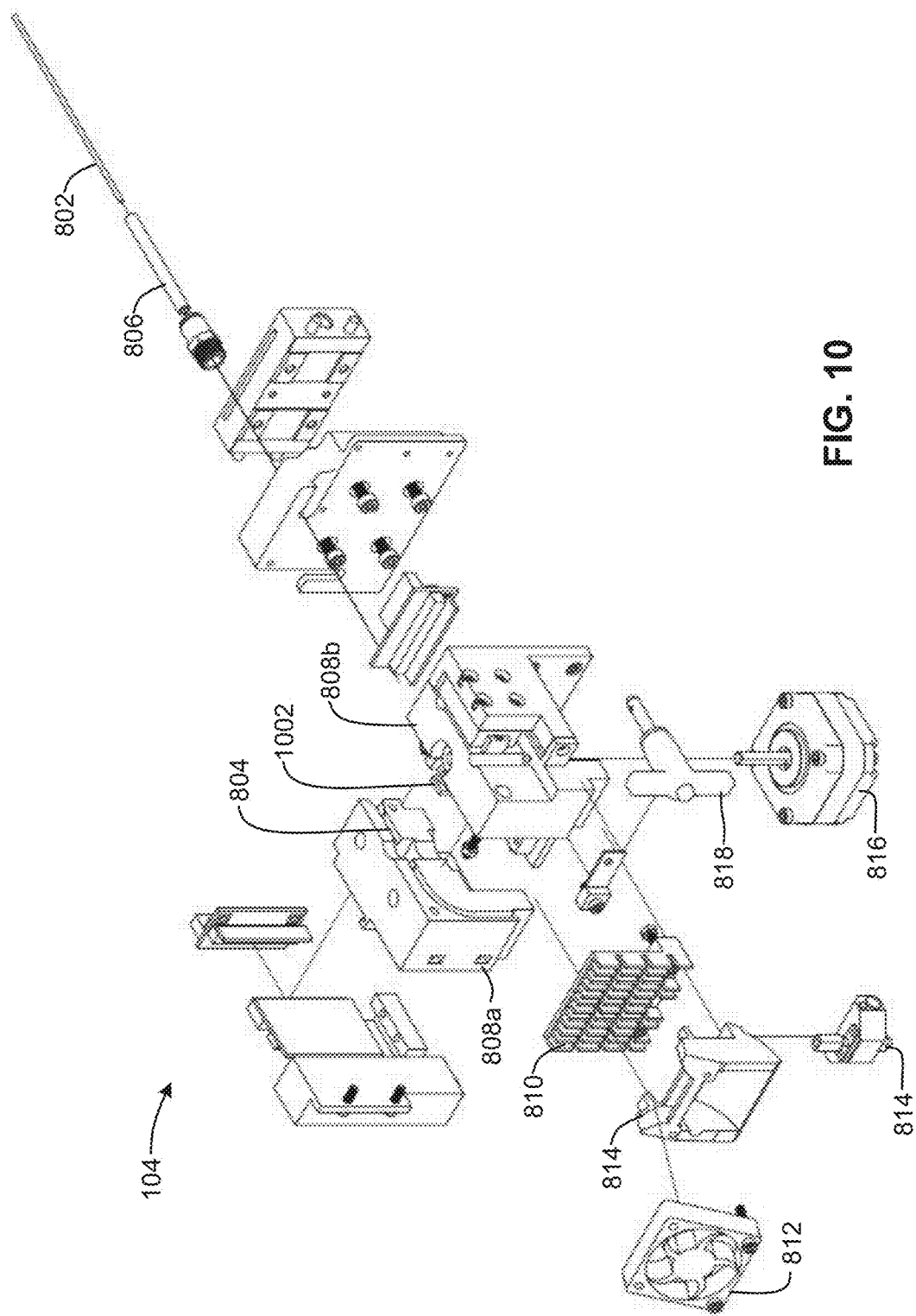
FIG. 10 is an exploded perspective view of the extruder of FIG. 8.
Figure 11:
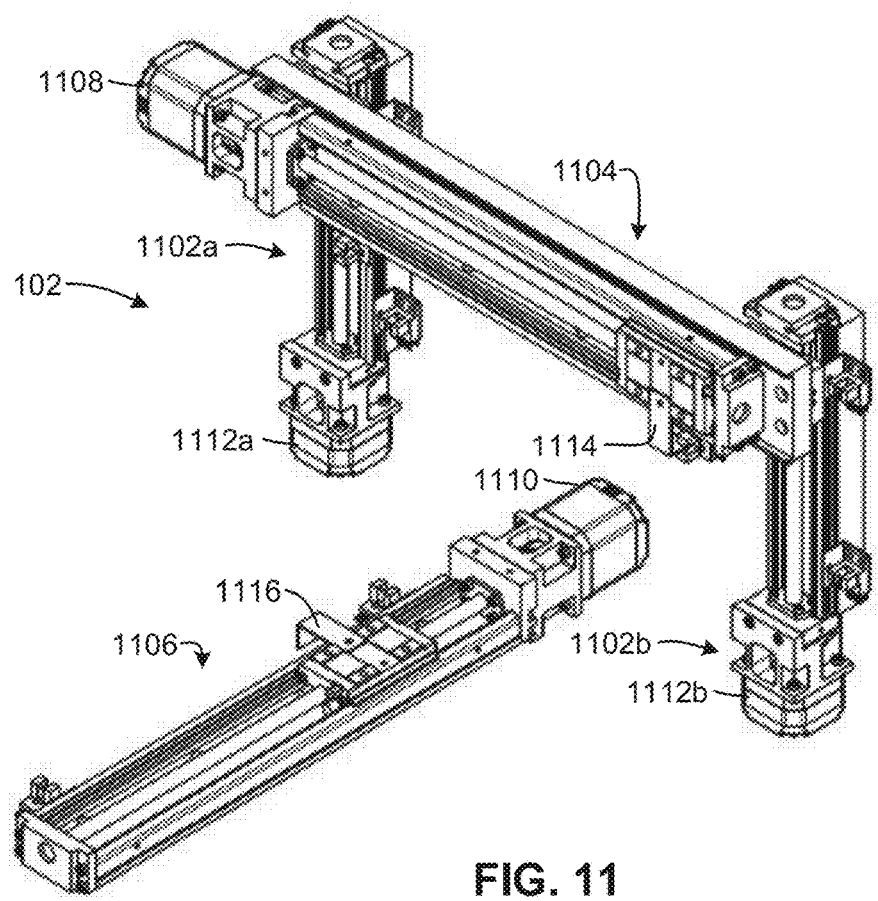
FIG. 11 is a perspective view of an additive manufacturing device traverse system, according to various aspects of the present disclosure.
Figure 12:
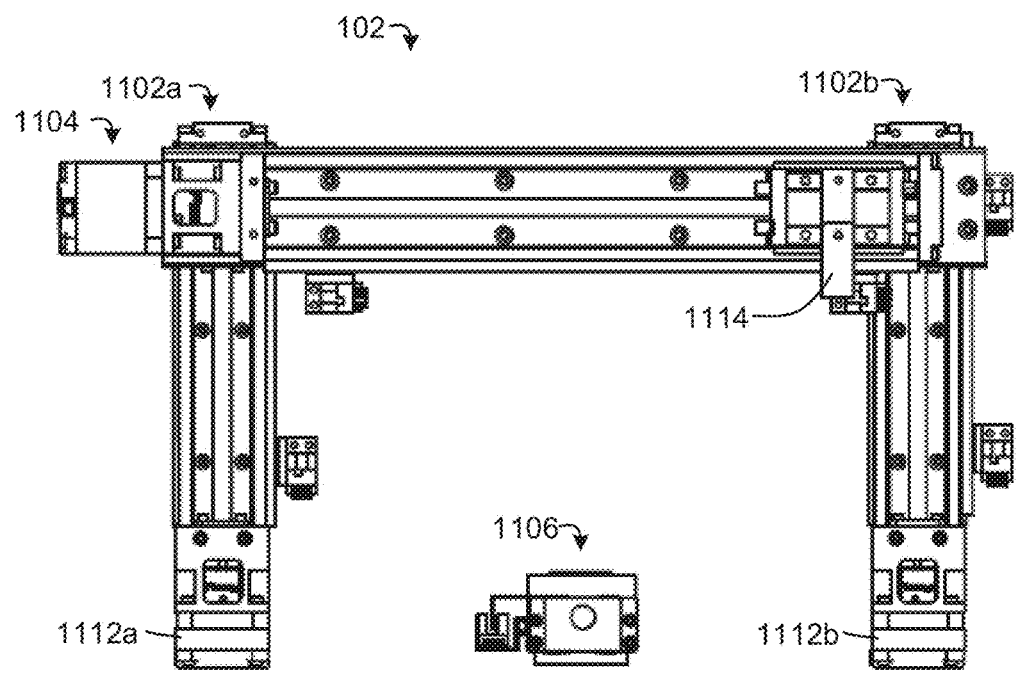
FIG. 12 is a front view of the traverse system of FIG. 11.
Figure 13:
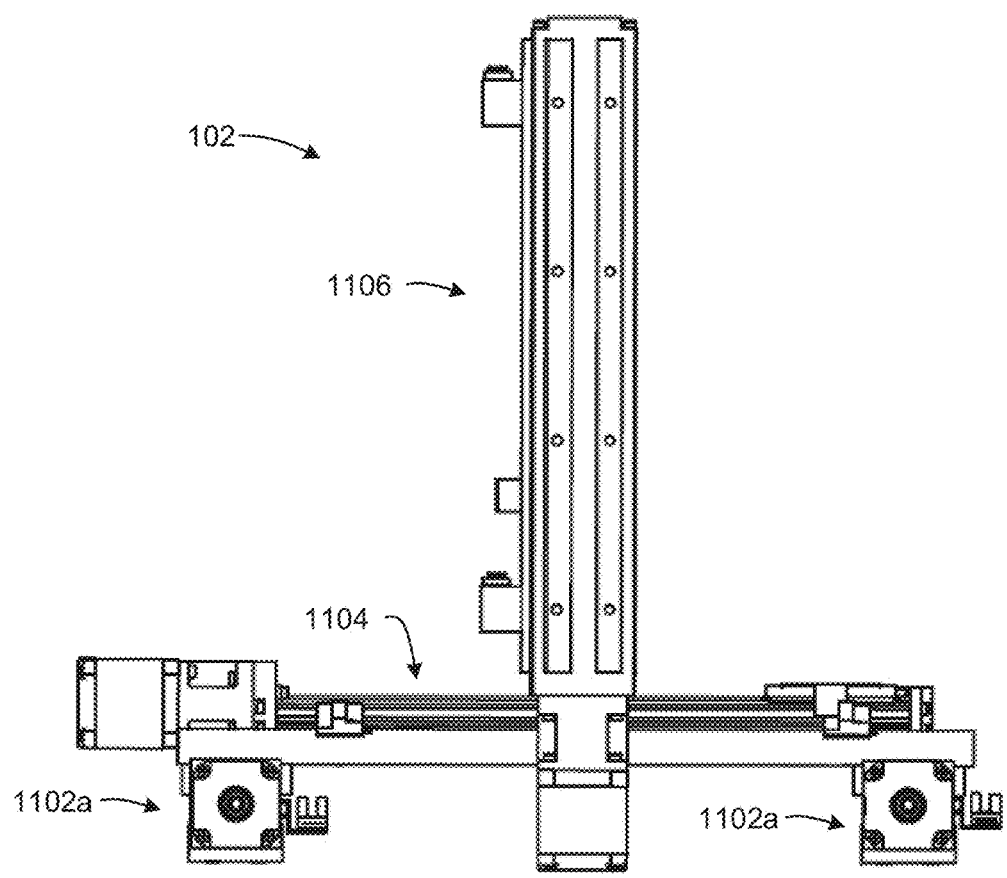
FIG. 13 is bottom view of the traverse system of FIG. 11.
Figure 14:
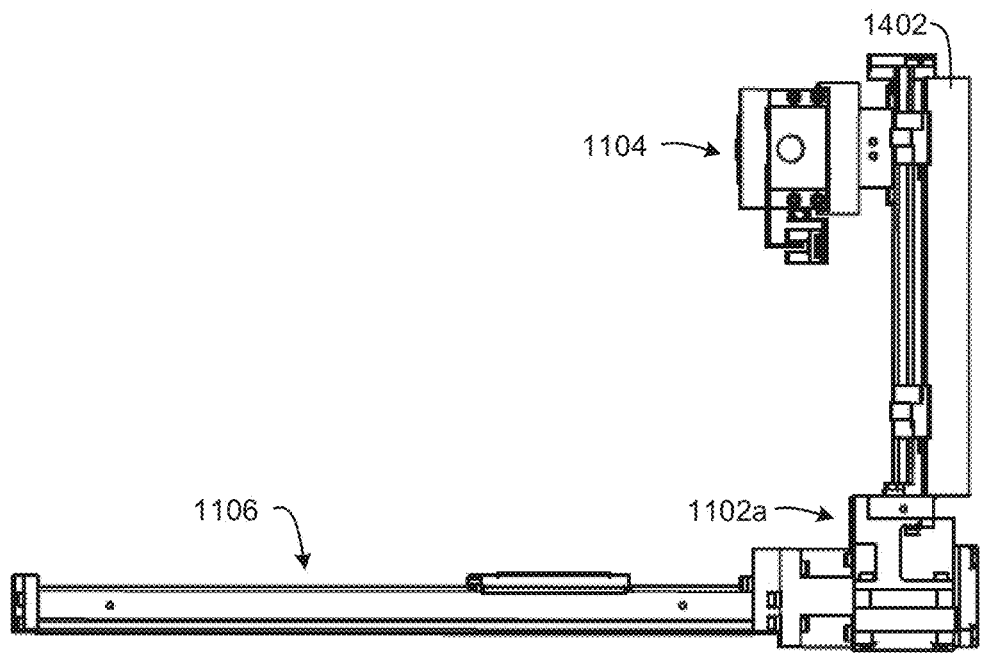
FIG. 14 is side view of the traverse system of FIG. 11.
Figure 15:
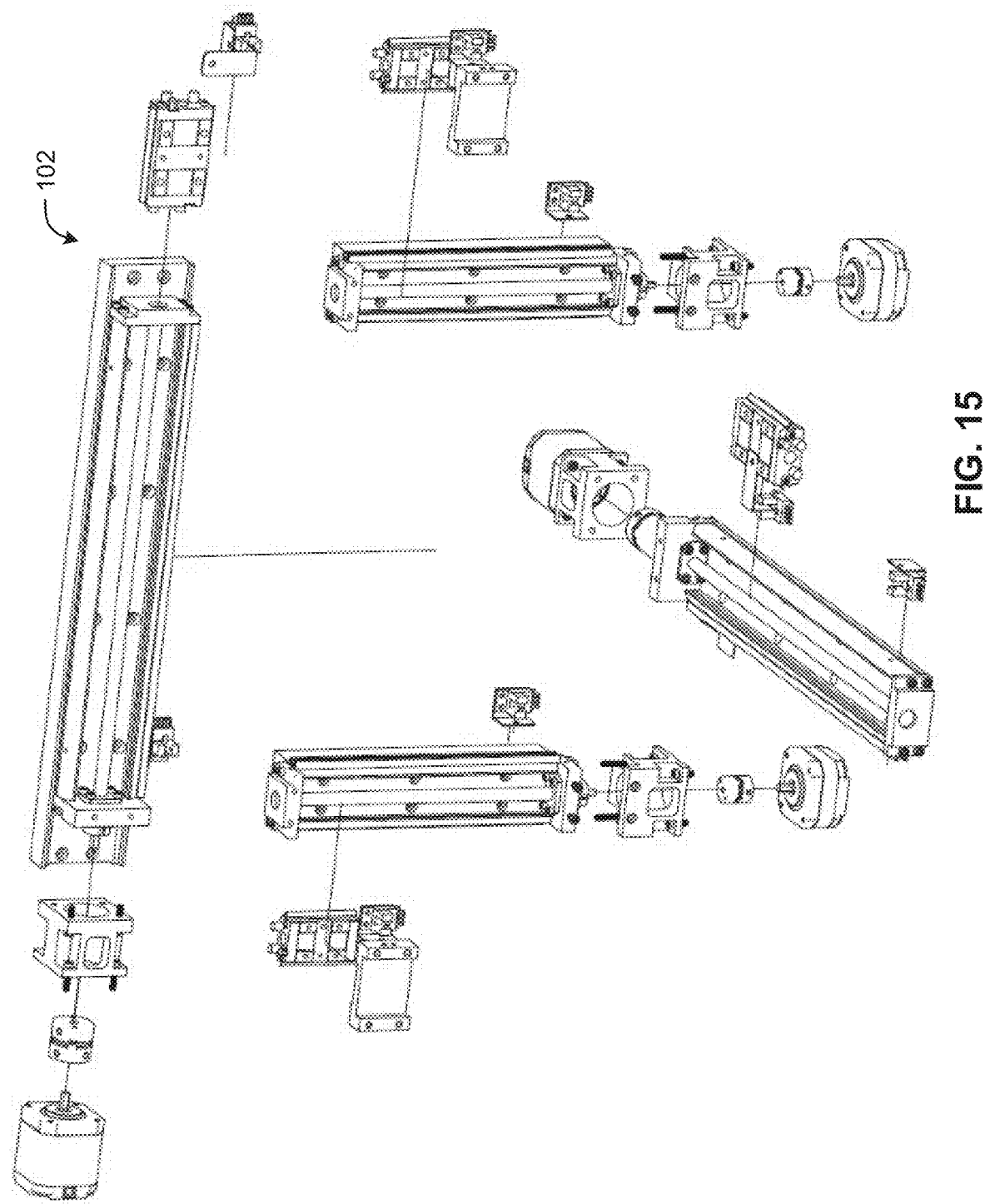
FIG. 15 is an exploded view of the traverse system of FIG. 11.

Referring now to FIGS. 8-10, various views of additive manufacturing device extruder 104, according to aspects of the present disclosure, are shown.

Extruder 104 melts filament 802 and places melted filament in order to create the desired part. Filament 802 may be plastic, metal, organic material, inorganic materials or combinations of such materials. Extruder 104 is configured to heat filament until it melts and/or is sufficiently pliable to form portions of the desire part. Filament 802 is fed into receiving tube 806. Receiving tube 806 may be coupled with tube 716. In another aspect, receiving tube 806 is omitted and tube 716 is inserted into extruder at the location of tube 806.

Filament is fed through a channel 804 in the extruder body. The extruder body may include two body halves 808 which are interconnected and contain a motor 816 driven extruder feeder 1002 which selectively feeds filament 802 into the extruder nozzle 902, where it is melted and deposited.

The temperature of extruder 104 and extruder nozzle 902 must be maintained, within acceptable limits. Extruder 104 may comprise a heat sink 810, an exhaust fan 812 positioned above heat sink 810 and an exhaust guide 810 configured to direct hot air from heat sink 810 away from extruder nozzle 902. Exhaust guide 814 may be a curved surface positioned between heatsink 810 and fan 812. In some aspects the extruder body is constructed of metal and configured to serve as a heat sink.

Extruder 104 may include a release handle 818 which enables the removal of extruder 104 without tools. Extruder 104 may be removed to facilitate repair or servicing of extruder 104, cleaning or servicing other parts of device 100, replacement of extruder 106, swapping a first extruder configured to create polymer parts for another extruder configured to produce metal objects, or the like. Release handle 818 may actuate a locking mechanism (not shown) in order to install or remove extruder 104.

Extruder 104 is one aspect of a material bonding component useful with device 100. Extruder 104 may vary in size and shape. There may be multiple material bonding components within 100. Such multiple material bonding components may bond or otherwise deposit different materials or have different characteristics (e.g., different resolutions). In some aspects, the material bonding component may be a welding device such as an electric arc welder, an energy beam welder, an oxy-fuel or gas welder, a resistance welder, or a solid state welder. In other aspects, the material bonding component may be a stereolithography device, an inkjet head, a cladding head, a concrete or other solidifying material deposition device, or any other device apparent to those skilled in the relevant art(s) after reading the description herein.

Referring now to FIGS. 11-15, various views of additive manufacturing device traverse system 102, according to various aspects of the present disclosure, are shown.

Traverse system 102 physically interfaces with and is supported by the structure of device 100 (e.g., enclosure 114). In an aspect, traverse system 102 comprises four linear actuators. Each linear actuator includes a stepper motor connected to a gear box which rotates a screw-driven linear rail. A carriage is connected for movement to the rail, enabling precise positioning of the carriage and attached components. Extruder actuator 1104 connects to extruder 104 at extruder carriage 1114 and positions extruder 104 along to x-axis. Extruder motor 1108 drives extruder actuator 1104. Extruder actuator motor 1108 may be a stepper motor connected to a gear box which rotates a screw-driven linear rail.

Traverse system 102 may include two vertically oriented y-axis actuators 1102 (labeled as y-axis actuators 1102a-b in FIG. 11) having their respective carriages (not shown) attached to opposite ends of extruder actuator 1104. Each y-axis actuator is mounted to partition 130, providing a stable base for moving extruder actuator 1104 and the attached extruder 104 up and down. Y-axis actuators 1102 are driven by stepper motors 1112 (labeled as stepper motors 1112a-b in FIG. 11).

Build platform assembly actuator 1106 extends perpendicular to extruder actuator 1104 and moves an attached build platform assembly 112 in a z-axis, providing the necessary degrees of freedom to produce desired parts. Extruder 1106 may also move toward door 128 when the part is complete in order to facilitate easy removal of the part. Platform 112 is attached to actuator 1106 via carriage 1116 and moved by stepper motor 1110. Actuator 1106 is anchored to baseplate 122.

The linear screw mechanism may position an attached carriage precisely with a high degree of repeatability. The linear screw mechanism is also rigid, holding an attached carriage in a precise position.

The carriages of each linear actuator may contain ball bearings which facilitate movement along the linear actuator.

In some aspects, traverse system 102 comprises linear actuators capable of incremental movements as small as 2.5 microns. In other aspects, resolution may be increased or decreased via utilization of screws with a different pitch size. Utilization of different motors or gears boxes may also alter incremental movement size.

Traverse system 102 may be one aspect of a material bonding component positioning system of device 100. In other aspects, the material bonding component positioning system may be a robotic arm. The robotic arm may be deployable within a spacecraft or similar enclosed area (e.g., a space station module). In other aspects, the robotic arm may be deployable outside a structure (e.g., a robotic arm attached to a space station).

In other aspects, the material bonding component positioning system may be a spacecraft (e.g., a robotic or manned capsule equipped with one or more material bonding devices), articulating components (e.g., multiple components capable of rotating and repositioning relative to one another), and the like. In some aspects, build platform assembly 112 is a rotatable platform and material bonding component positioning system causes material bonding component to move across build platform assembly 112. In some such aspects, the rotatable platform is round, having a diameter. The material bonding component positioning system moves parallel to the diameter and crosses the origin of the rotatable platform. The build platform may be raised and lowered relative to the material bonding component or the material bonding component may be raised and lowered relative to build platform.

Figure 16:
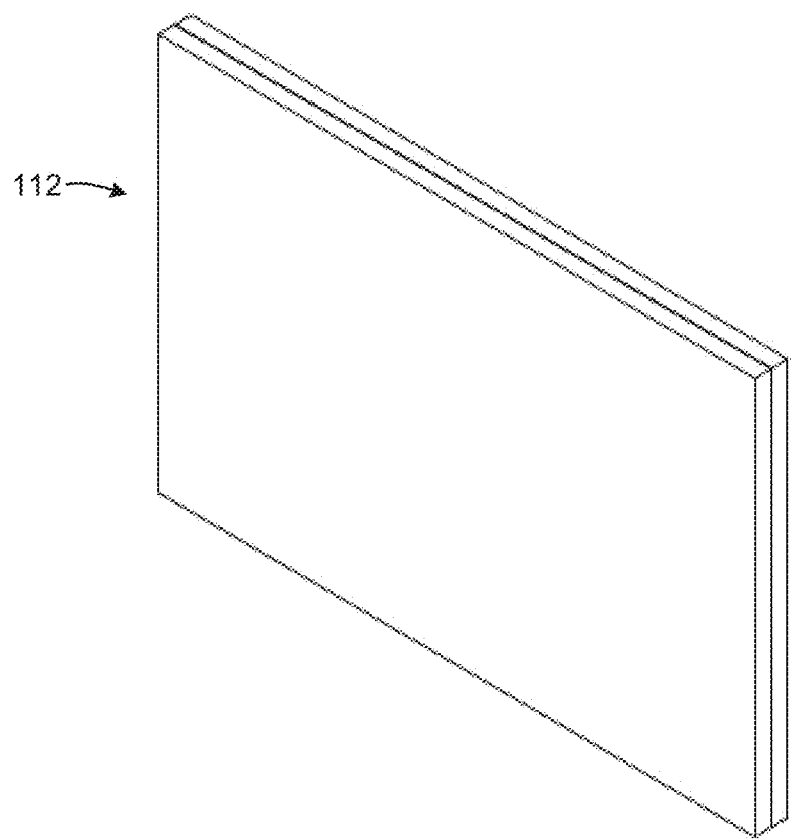
FIG. 16 is a perspective view of a build platform assembly for an additive manufacturing device, according to various aspects on the present disclosure.
Figure 17:
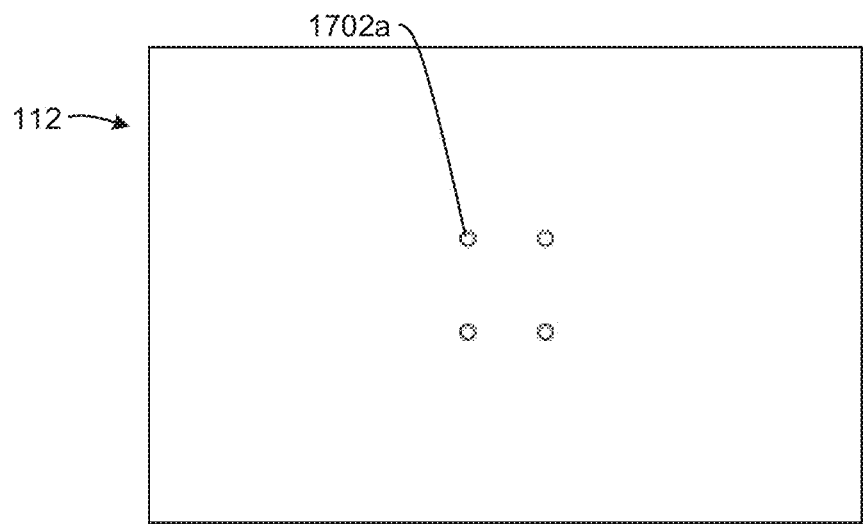
FIG. 17 is a bottom view of the build platform assembly of FIG. 16.

Referring now to FIGS. 16-17, various views of build platform assembly 112 for additive manufacturing device 100, according to various aspects on the present disclosure, are shown.

Build platform assembly 112 may be a planar rigid surface mounted to carriage 1116 via mounting points 1702 (labeled, for clarity, only as mounting point 1702a in FIG. 17). Build platform assembly 112 may include coatings or layers which facilitate removal of a completed part from the build surface after the part is completed. For producing ABS plastic parts, the top layer of build platform assembly 112 may be ABS plastic, an ABS plastic layer combined with, sprayed with, or treated with acetone, a Kapton layer (available from E. I. du Pont de Nemours and Company of Willmington, Del.), a mesh layer (e.g., a metal mesh, a polymer mesh). The build surface may be heated by internal heating elements (not shown). Such heating may be accomplished via a cartridge heater, resistive circuitry integrated or attached to build platform assembly 112, a PCB, a silicone heater mounted atop the build surface, or other means apparent to those skilled in the relevant art(s) after reading the description herein.

Build platform assembly 112 positions a part within a build volume as it is created by the material bonding component. In other aspects, build platform assembly 112 and/or the build platform surface may be different sizes, materials, thicknesses, conducting, electrically insulated, heated, cooled, perforated, etched, engraved, a single point or a relatively small construction area, have a high-friction or low-friction build layer, and the like. The build platform assembly 112 may be a conveyor belt. In some aspects, the build surface of build platform assembly 112 is not attached to device 100. It may be a portion of a spacecraft, satellite, marine vessel, or the like.

In some aspects where device 100 is deployed in a microgravity or other space environment, build platform assembly 112 is a single point, such as a ball bearing, small cube, or other reference point, positioned within a build volume. Extruder 102 or another material bonding component creates the desired part in the build volume by first depositing an initial portion and/or layer attached to the single point. The material bonding component is then iteratively repositioned by material bonding positioning system to bond additional material to the initial portions, thereby creating the desired part. The microgravity or other space environment allows the part to be created without significant platform support because feedstock is bonded to the desired part and supported before becoming misaligned and a supporting structure is not required.

In some aspects, device 100 creates the desired part in a build volume. The build volume may be defined with respect to material bonding component. The build volume may be movable as device 100 moves, or independently of device 100 moving. The build volume may vary in size, based on the configuration of device 100. In some aspects, the build volume is less than one foot on a side. In some aspects, the build volume encompasses a space station, satellite, or the like, enabling the creation of all of such structures or a portion of such structures, as well as repair, upgrading and the like. For example, where device 100 includes a robotic arm as the material bonding component positioning system, the build volume may be the addressable volume of the arm. Device 100 may also be mounted on a robotic arm, enabling repositioning on device 100 to create parts, repair objects, and the like, using traverse 102 or similar having finer control compared to the attached robotic arm.

Figure 18:
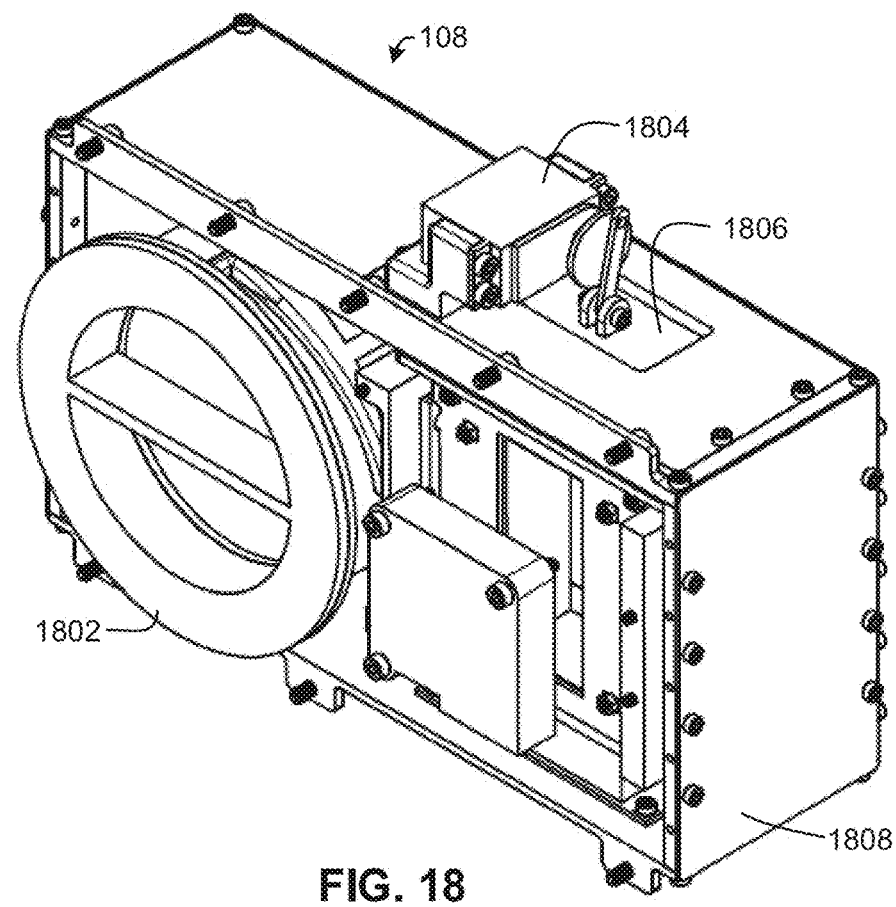
FIG. 18 is a perspective view of an environmental control unit for an additive manufacturing device operating in a controlled environment, according to various aspects of the present disclosure.
Figure 19:
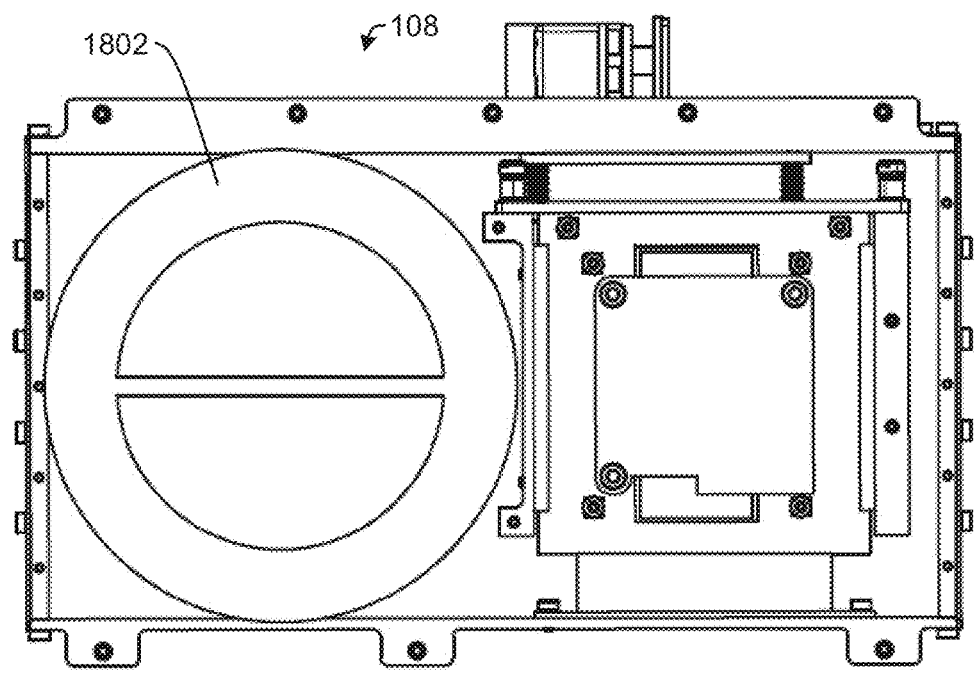
FIG. 19 is a front view of the environmental control unit of FIG. 18.
Figure 20:
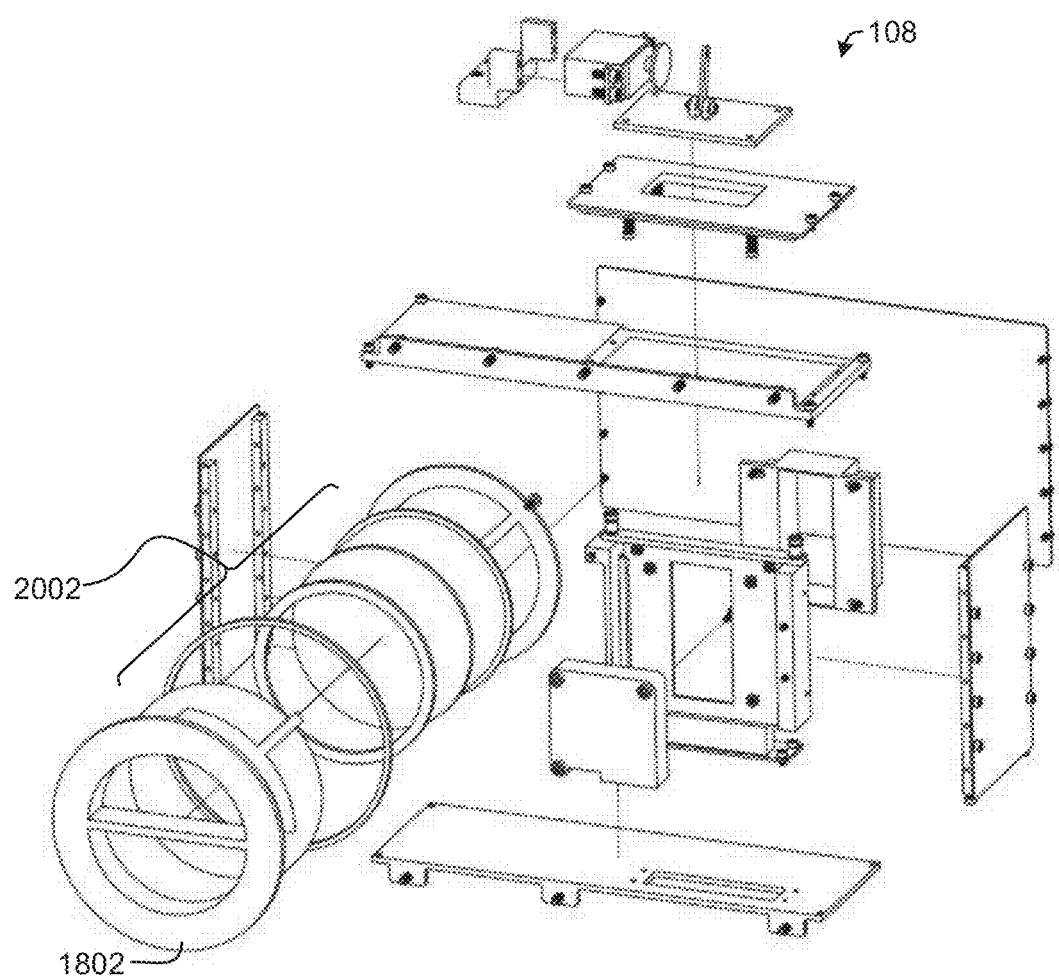
FIG. 20 is an exploded view of the environmental control unit of FIG. 18.

Referring now to FIGS. 18-20, various views of environmental control unit 108 for additive manufacturing device 100 operating in a controlled environment, according to various aspects of the present disclosure, are shown.

ECU 108 controls the internal environment of device 100. In various aspects, ECU 108 includes temperature and humidity sensors, contaminant analysis units for detecting airborne toxic gases generated during part creation, devices for detecting and/or capturing errant pieces of feedstock, air circulating fans, heating elements, cooling elements, dehumidifiers, air filters and the like. ECU 108 may be configured to provide a controlled environment for the build volume of device 100. In some aspects, ECU 108 is configured to filter and control the environment inside device 100 such that when the surrounding environment is exposed to the internal environment, it is safe for user.

ECU 108 comprises a body 1808 which houses a series of removable filter elements. The filter elements make up a filter stack 2002 which may be accessed via filter release 1802. Body 1808 may also house one or more of the elements described above. ECU 108 may also comprise a vent motor 1804 connected to a vent 1806 for controlling air flow within ECU 108.

ECU 108 at, for example filter stack 2002, may comprise charcoal filters and high efficiency particulate air (HEPA) H14 filters. One or more grates may also be included in order to capture larger particles. The charcoal filters absorb volatiles that might be present in the AMF's production atmosphere, while the HEPA filters will remove 99.999% of all particulates in the air that are 0.3 microns or larger in size. In other aspects, other filters, grates or the like may be included which may filter nanoparticles, sub-micron sized particles, and other sized or types of particles which those skilled in the relevant art(s) wish to filter or control within device 100 or environments which device 100 is deployed within.

In some aspects ECU 108 runs one or more fans at a low, constant rate during part creation in order to ensure the interior of device 100 is uniform in temperature and to ensure that created portions of part adequately cool and cure.

In other aspects, ECU 108 may include cooling units, one or more thermal control units, one or more pumps, such as a vacuum pump, sources of gases (e.g., an argon gas sources inert gas, flammable gas, other gases or gas mixtures apparent to those skilled in the relevant art(s) after reading the description herein), a fire suppression system, a humidifier, and/or a source of biological agents (e.g., viruses, bacteria, and the like). In other aspects, an ionic air filter, UV light air filter, or other filter may be utilized. Air may be recirculated or otherwise moved via a diaphragm or other fanless device apparent to those skilled in the relevant art(s) after reading the description herein. In some aspects, ECU 108 functions outside in space and include one or more sources of gas such as a canister configured to emit gas and create a local environment or atmosphere.

In various aspects, ECU 108 is configured to capture outgassing, nanoparticles, and other potentially harmful material produced during the additive manufacturing process. For example, fused deposition molding processes produce potentially harmful gases during the build process. Additionally, nanoparticles of feedstock (e.g., ABS plastic) are produced. In a microgravity or other space environment, as well as in terrestrial locations, both the harmful gases and the nanoparticles may disperse throughout device 100 or the surrounding environment in an undesirable manner. ECU 108, or multiple ECUs, may be employed to filter or otherwise remove or contain such out gassing and nanoparticles.

Figure 21:
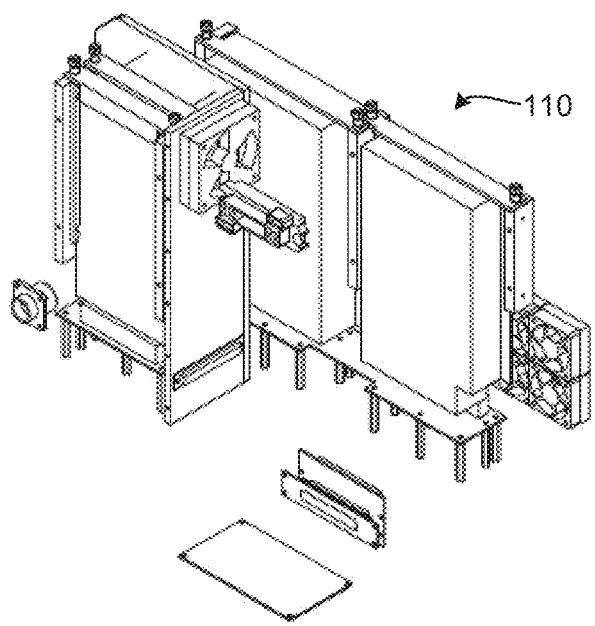
FIG. 21 is a perspective view of the power supply and electron control unit of an additive manufacturing device, according to various aspects of the present disclosure.

Referring now to FIG. 21, a perspective view of the power supply and electronic control unit 110 of additive manufacturing device 100, according to various aspects of the present disclosure, is shown.

In various aspects, electronic control unit 110 includes swappable, replaceable, upgradable, cartridge based, and/or redundant components. COTS components, such as x86 computing devices, microcontrollers and the like may be used in order to facilitate ease of use, production and cost, using COTS parts. Device 100 may operate on 24V power. In some aspects, power supplied from the location device 100 is deployed may differ. For example, a space station may provide 28V power. In such instances, device 100 may convert the provided power to 24V.

In some aspects, control electronics include multiple card slot-based boards which may be easily replaced. Each board may include control circuitry which disables board operation if board components deviate from an operational window. For example, each board may have temperature sensors. In the event an out of spec temperature is detected by an onboard sensor, all communications and functions within the board may be disabled.

Components such as capacitors and the like within electronic control unit 110 may be derated for usage in space or other remote environments. Power input circuitry may include filters for frequencies produced by the surrounding environment (e.g., communications frequency bands utilized by a space station). Power supply elements may be isolated from other portions of electronic control unit 110 in order to reduce the creation of electromagnetic interference.

In some aspects, power supply circuits are electrically isolated from a corresponding thermal control circuit. A microcontroller may be provided which monitors temperature sensors positioned throughout enclosure 114, electronic control unit 110 and the like. The thermal sensors have pre-programmed cutoffs. If one sensor is out of spec, the microcontroller will cut off the power supply via an optical circuit.

Electronic control unit 110 may include control circuitry for extruder 104. Control circuitry may include an initialization protocol configured to prevent nozzle 902 leakage. Temperature of nozzle 902 may be regulated by a proportional integral derivative (PID) controller and associated algorithms. Nozzle 902 may be heated at 60% power for 2-4 minutes during initialization, thereby limiting expansion of feedstock (e.g., abs) within nozzle 902 and avoiding leakage.

Figure 22:
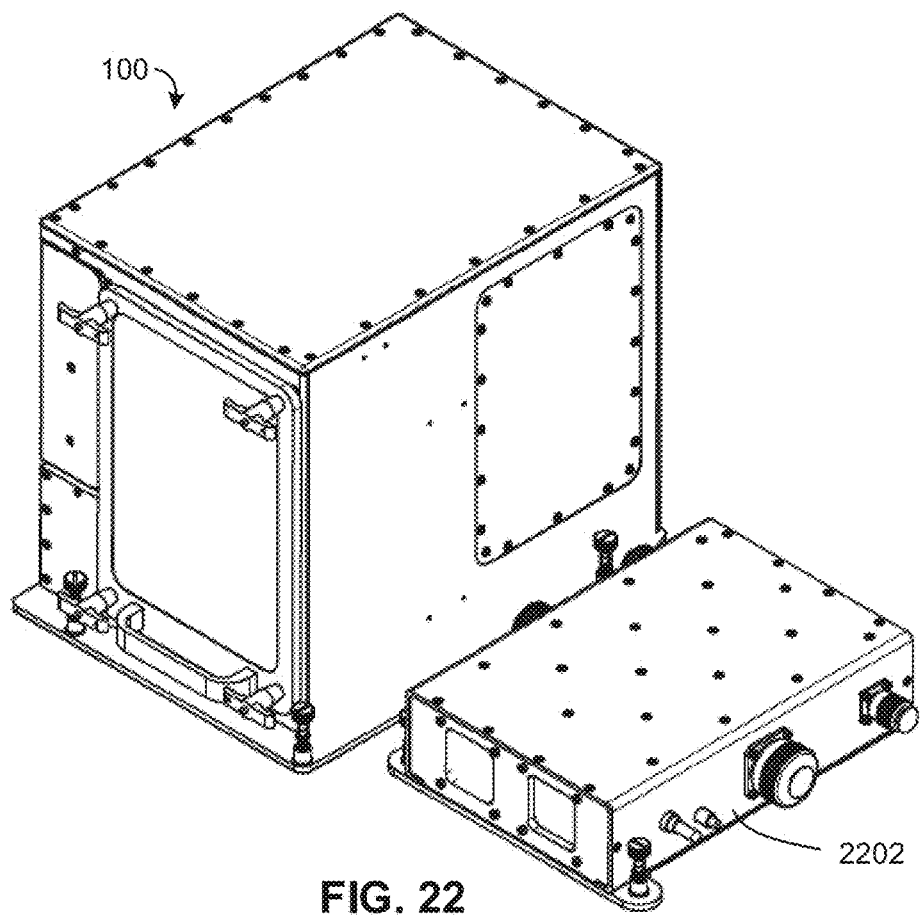
FIG. 22 is a perspective view of an additive manufacturing device having an external power supply, the additive manufacturing device operable in a variety of force and gravitational environments, including microgravity, according to various aspects of the present disclosure.
Figure 23:
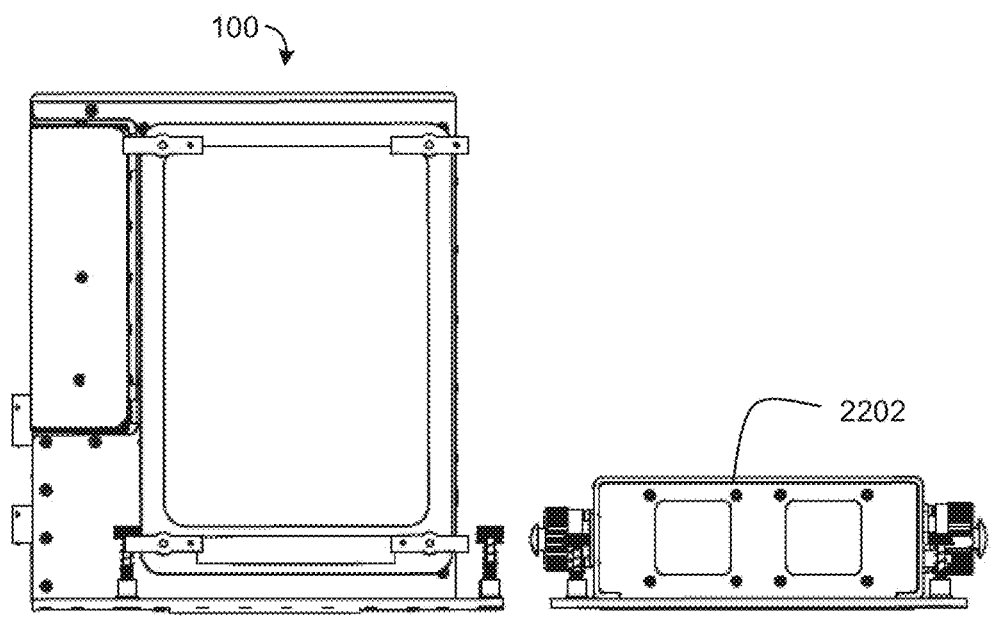
FIG. 23 is a front view of the additive manufacturing device of FIG. 22.
Figure 24:
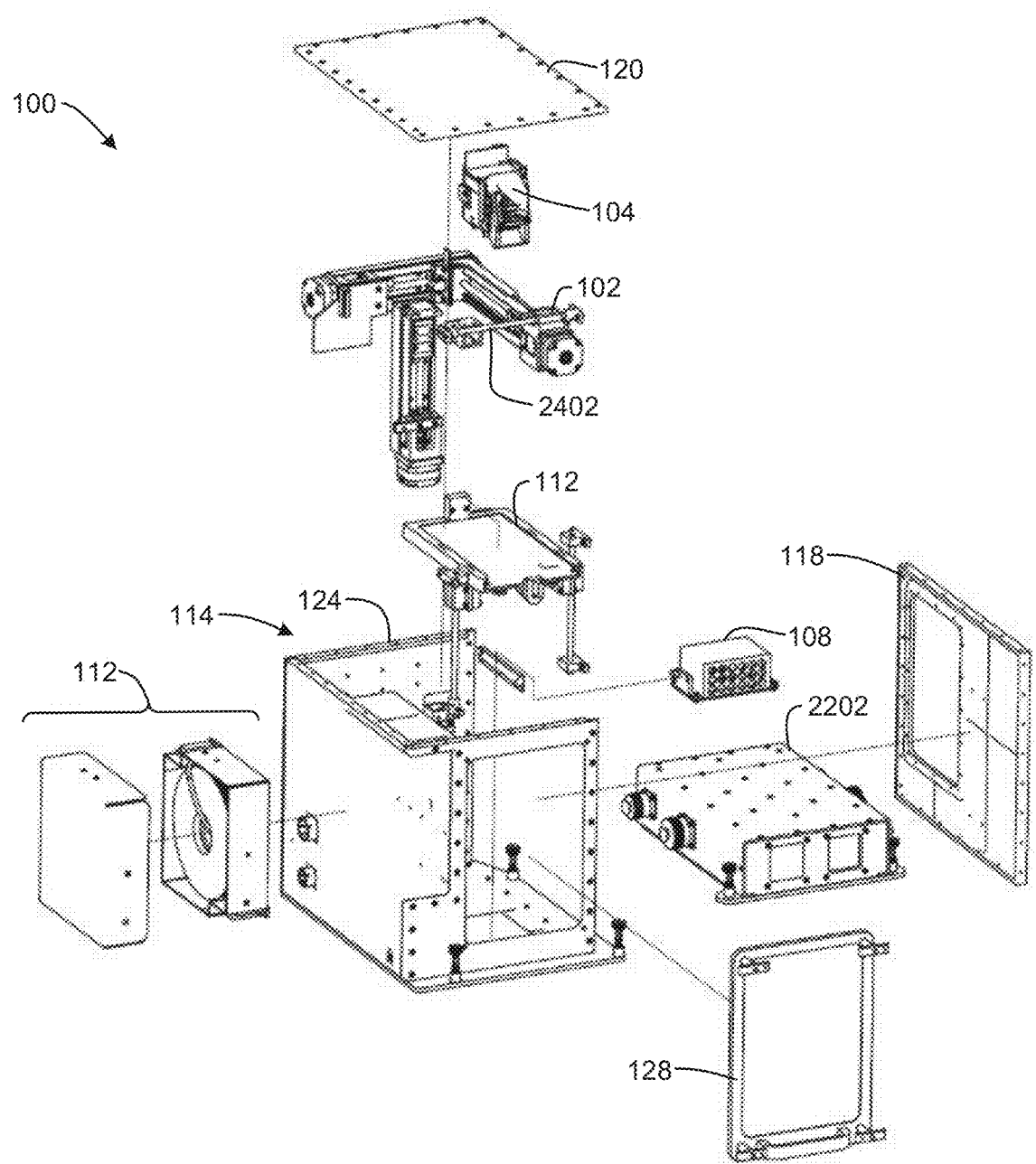
FIG. 24 is an exploded perspective view of the additive manufacturing device of FIG. 22.

Referring now to FIGS. 22-24, various views of additive manufacturing device 100 having an external power supply 2202, additive manufacturing device 100 operable in a variety of force and gravitational environments, including microgravity, according to various aspects of the present disclosure, are shown.

Power supply 2202 is separated from the remainder of device 100 in order to reduce the footprint of portions of device 100. Power supply 2202 may be positioned apart from the remainder of device 100 and electrically connected. Power supply 2202 may also contain control electronics 110. Back plate 124 may be integral with side and bottom plates of the enclosure 114, having a removably top plate 120 and side plate 118.

Door 128 may be removable and include a handle, a window and four fasteners positioned at the corners of door 128.

Figure 25:
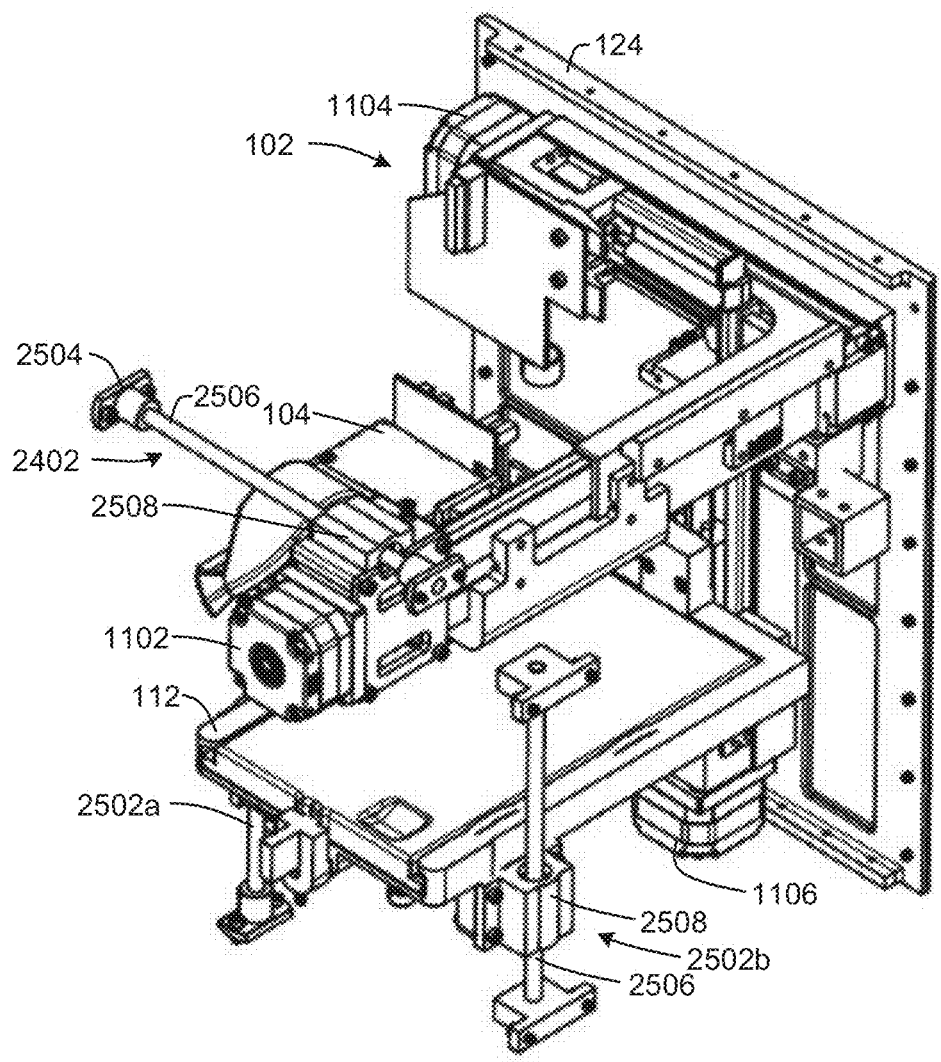
FIG. 25 is a perspective view of a traverse system, attached extruder, build table assembly, and back plate of an additive manufacturing device, according to various aspects of the present disclosure.
Figure 26:
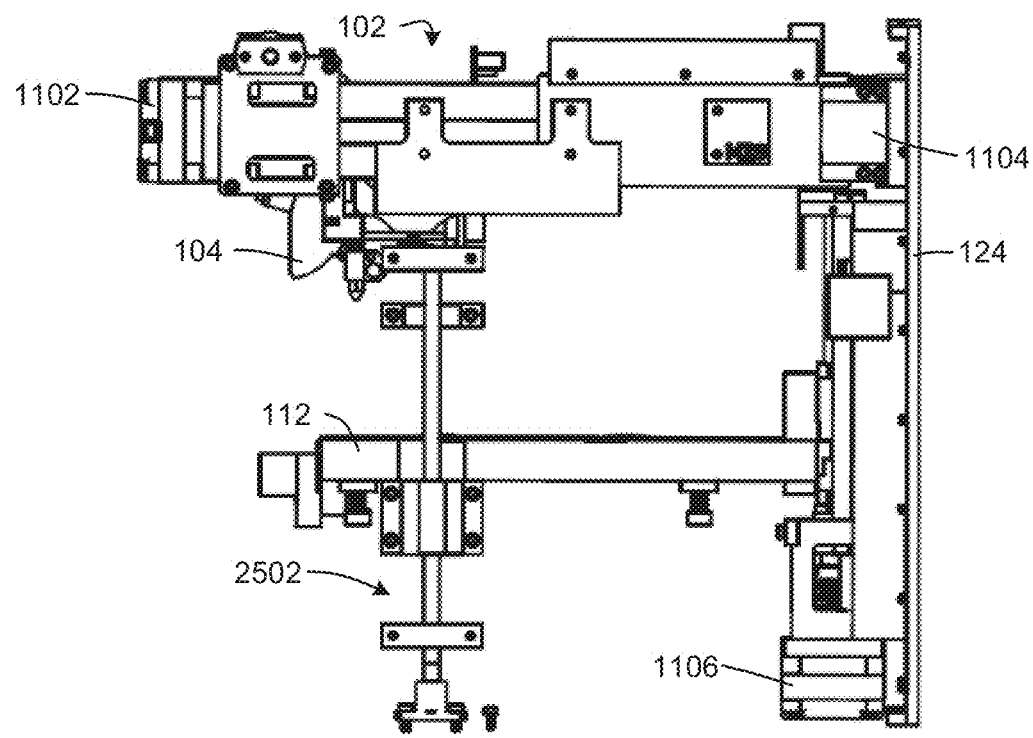
FIG. 26 is a side view of the traverse system and connected components of FIG. 25.
Figure 27:
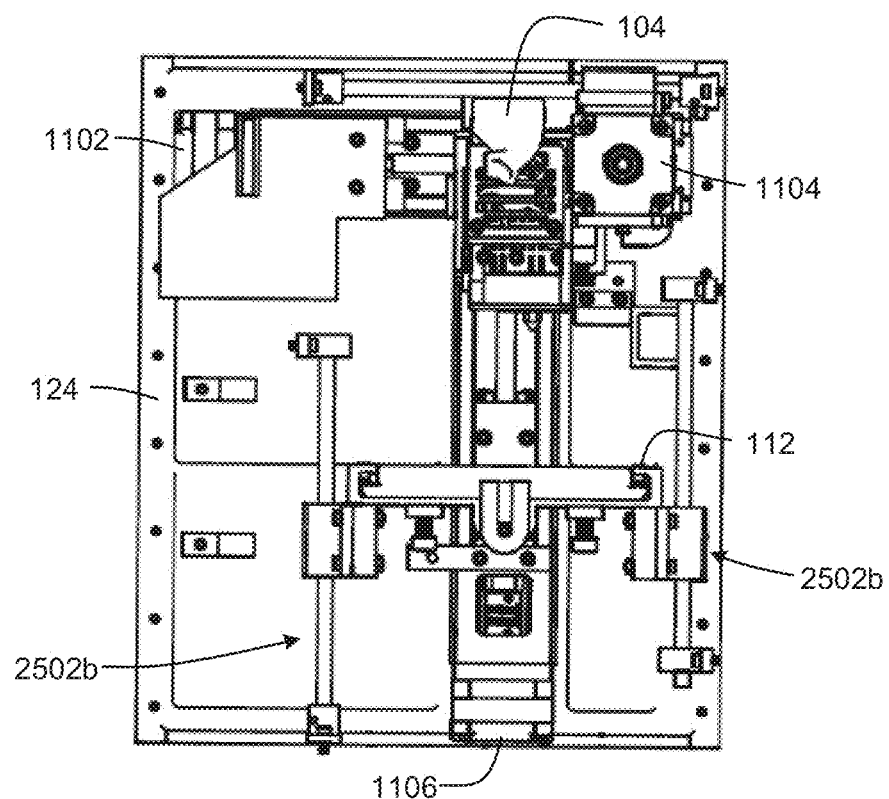
FIG. 27 is a front view of the traverse system and connected components of FIG. 25.

Referring now to FIGS. 25-27, various views of a perspective view of traverse system 102, attached extruder 104, build table assembly 112, and back plate 124 of additive manufacturing device 100, according to various aspects of the present disclosure, are shown.

Traverse system 102 may include three linear actuators. First actuator 1104 is horizontally mounted on back plate 124, moving second actuator 1102 in a y-axis. Second actuator 1102 receives extruder 104, thereby providing x- and y-axis positioning of extruder 104. Third actuator 1106 is vertically mounted on back plate 124 and connected to a rear portion of build platform assembly 112 for moving a build tray in a z-axis. A front portion of build platform assembly 112 is connected to one or more vertical stabilizers 2502 (labeled as vertical stabilizers 2502a-b in FIG. 25) for restricting lateral movement of build platform assembly 112.

In some aspects, second actuator 1102 is connected to a horizontal stabilizer 2402 at an end portion opposite first actuator 1104. Horizontal stabilizer 2402 restricts vertical movement of second actuator 1102 and includes a rail 2506 a carriage 2508 and connectors 2504 positioned at either end of horizontal stabilizer 2402 and connected to portions of enclosure. Vertical stabilizers 2502 may be similarly constructed.

Figure 28:
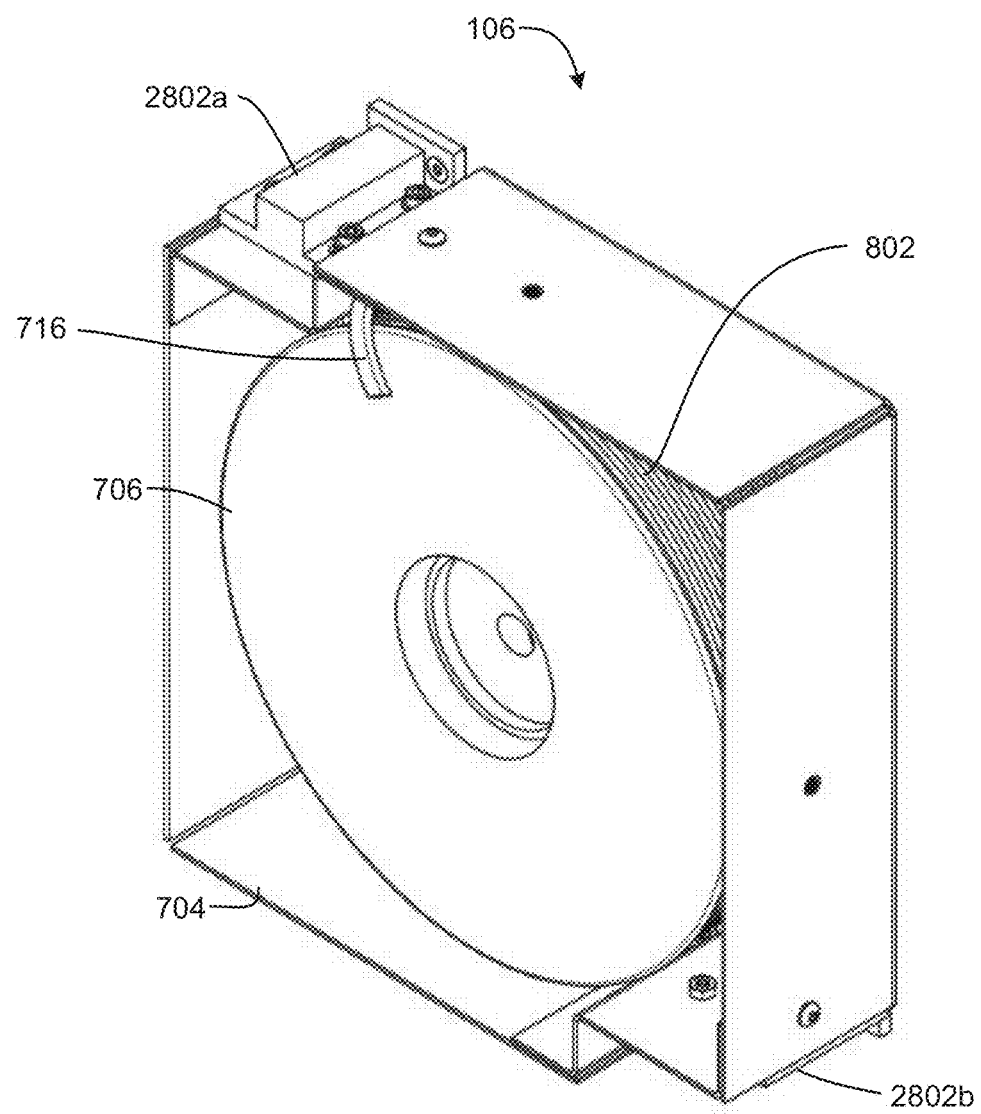
FIG. 28 is a perspective view of a feedstock cartridge for an additive manufacturing device having a cover removed, according to various aspects of the present disclosure.
Figure 29:
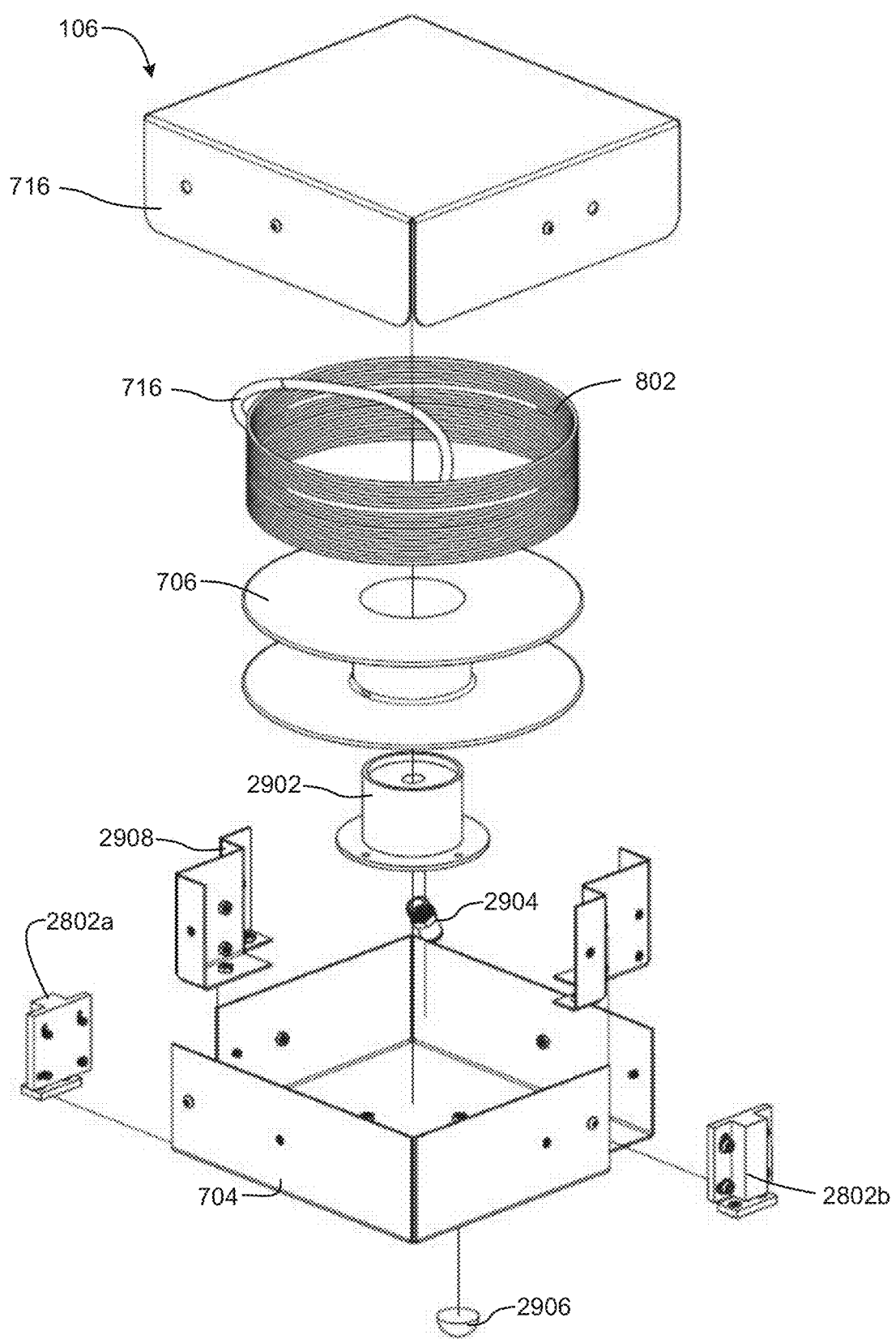
FIG. 29 is an exploded perspective view of the feedstock cartridge of FIG. 28.

Referring now to FIGS. 28-29, various views of feedstock cartridge 106 for additive manufacturing device 100, according to various aspects of the present disclosure, are shown.

Cartridge 106 may include cutaway walls 2908 which house connection mechanisms 2802 for connecting cartridge 106 with enclosure 114. Spool 706 may rotatable interface with a hub 2902 mounted on frame 704 via fastener 2904 and cap 2906.

Figure 30:
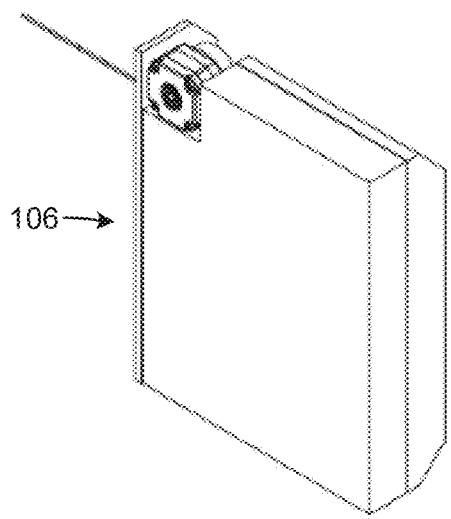
FIG. 30 is a perspective view of a feedstock cartridge for an additive manufacturing device, according to various aspects of the present disclosure.
Figure 31:
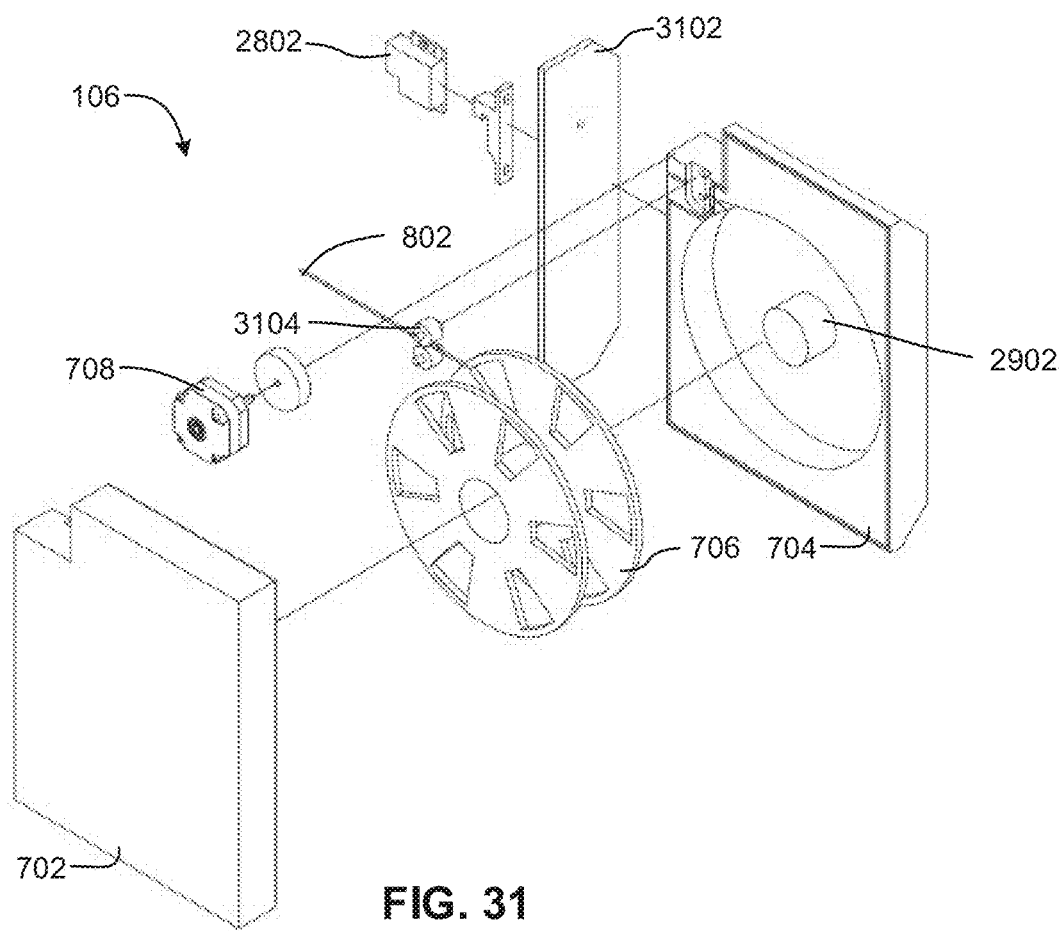
FIG. 31 is an exploded perspective view of the feedstock cartridge of FIG. 30.

Referring now to FIGS. 30-31, various views of another configuration of feedstock cartridge 106, according to various aspects of the present disclosure, are shown. Hub 2902 may be integrated into frame 704. Feeder motor 708 may be positioned outside of frame 704 and retained by cartridge side plate 3102 having an attached latch-type connection mechanism 2802 for connecting to enclosure 114. Filament may be dispensed via motor-driven rollers 3104.

Figure 32:
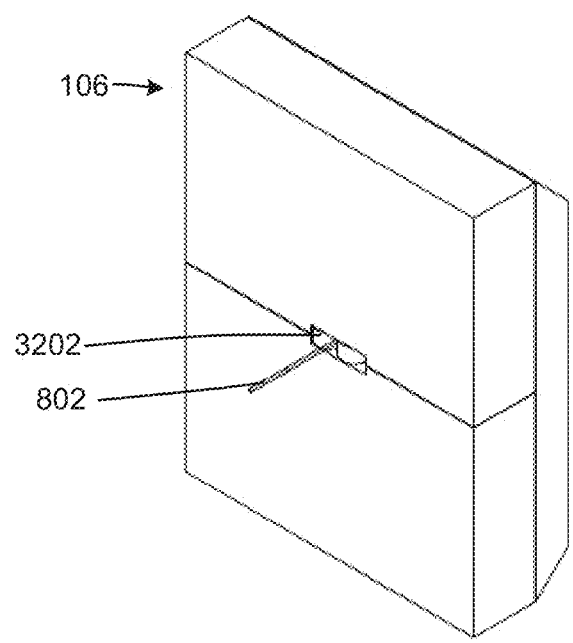
FIG. 32 is a perspective view of a feedstock cartridge for an additive manufacturing device, the feedstock cartridge dispensing filament from a center opening, according to various aspects of the present disclosure.
Figure 33:
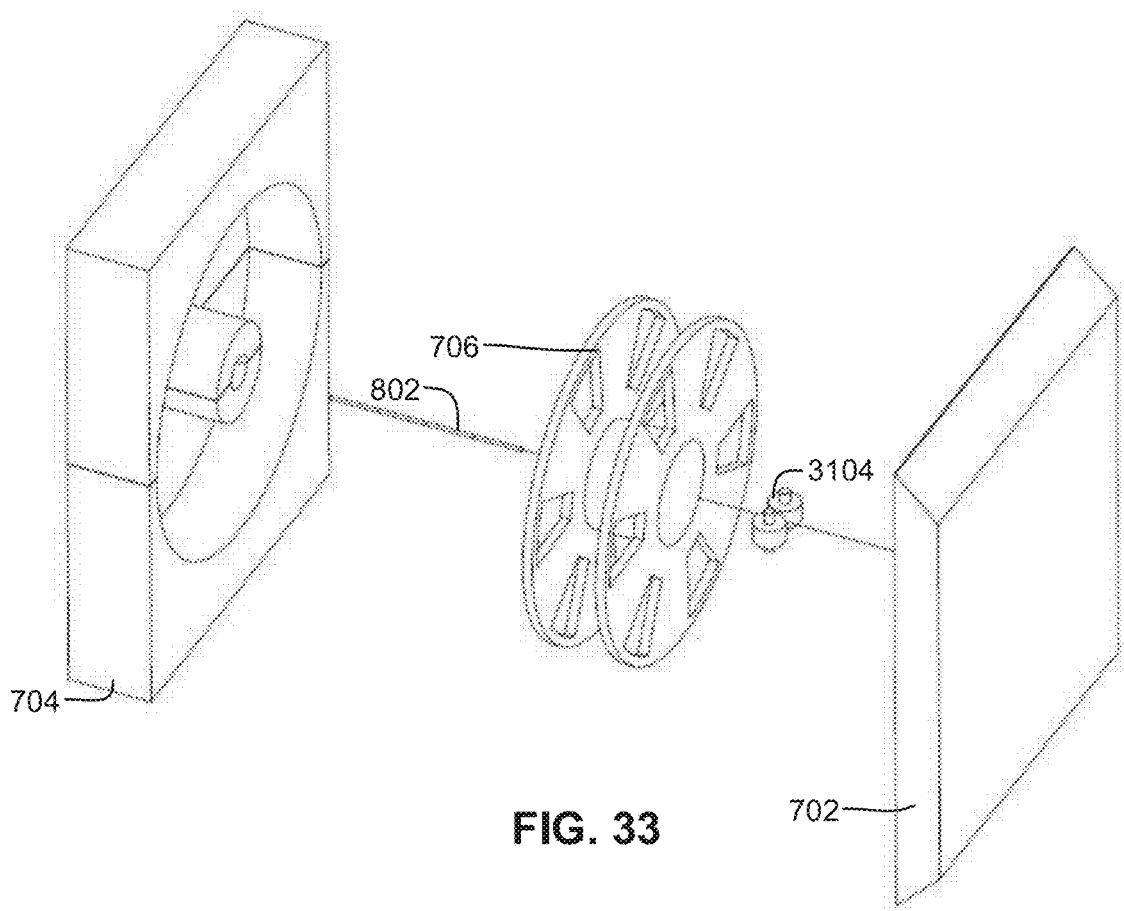
FIG. 33 is an exploded perspective view of the feedstock cartridge of FIG. 32.
Figure 34:
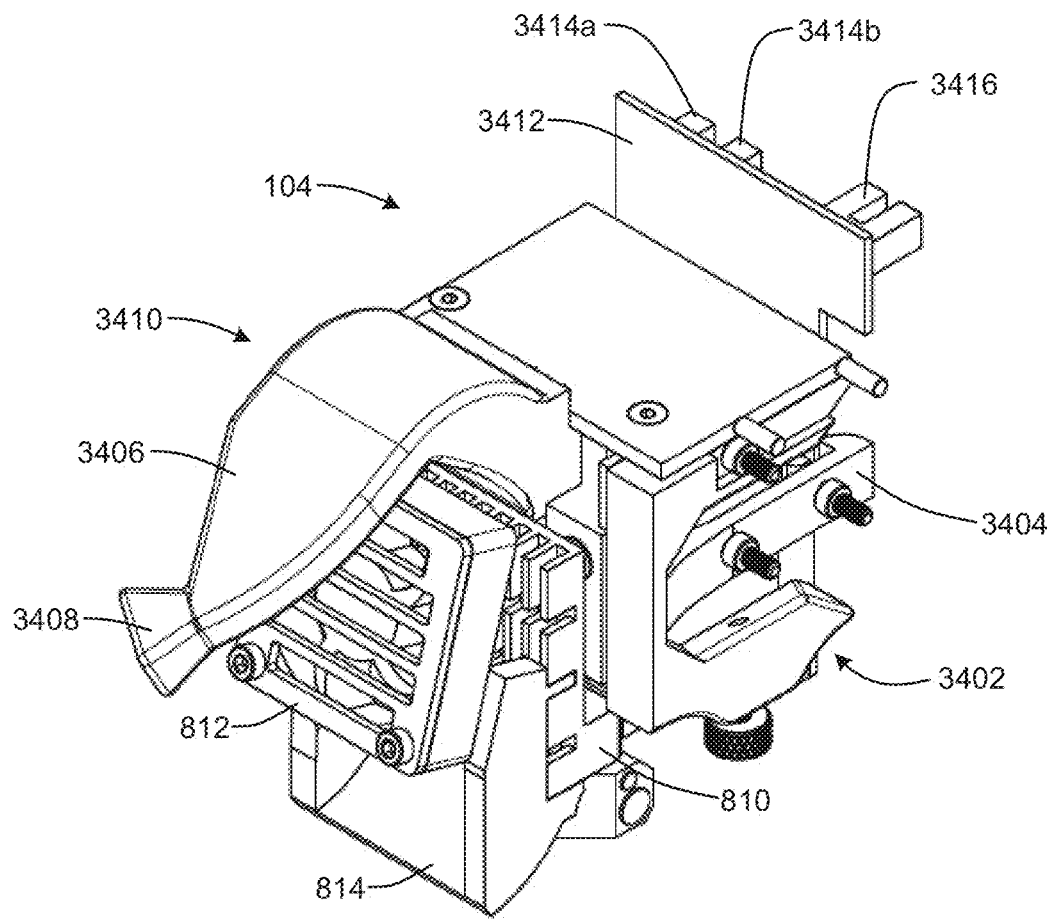
FIG. 34 is a perspective view of an additive manufacturing device extruder having quick release mechanism, according to various aspects of the present disclosure.
Figure 35:
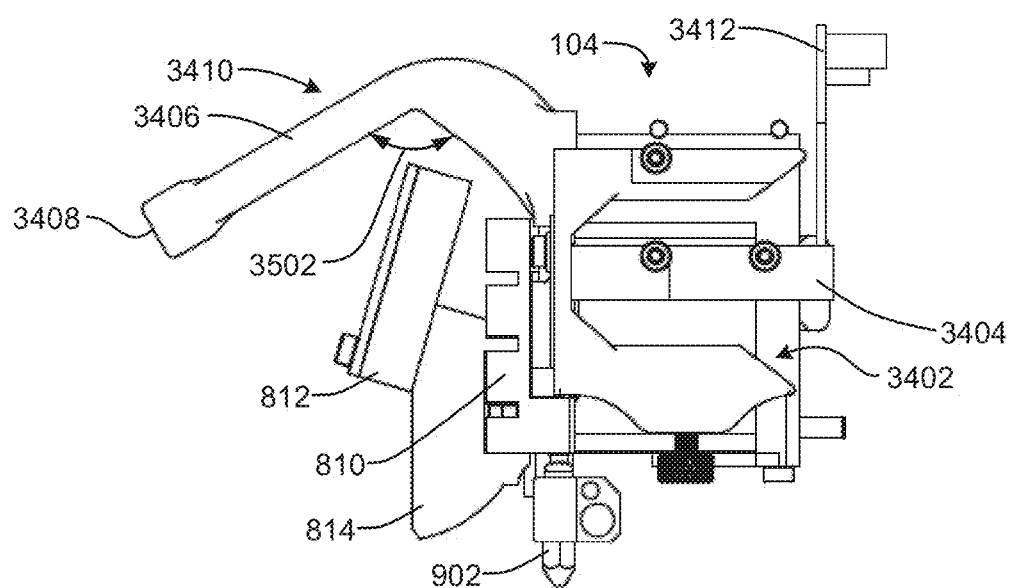
FIG. 35 is a side view of the extruder of FIG. 34.
Figure 36:
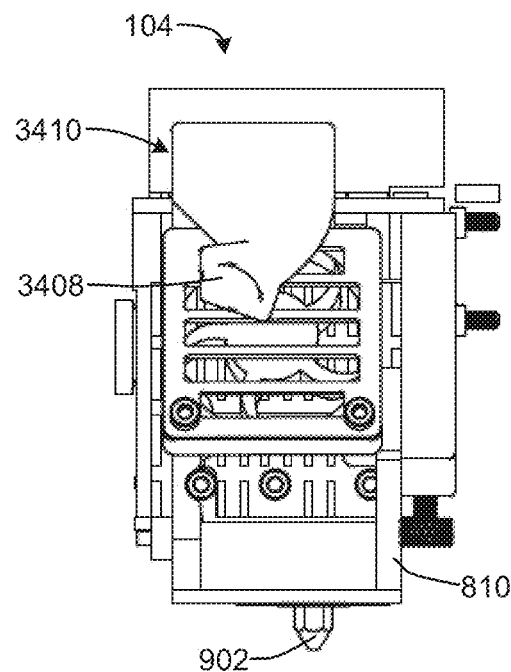
FIG. 36 is a front view of the extruder of FIG. 34.
Figure 37:
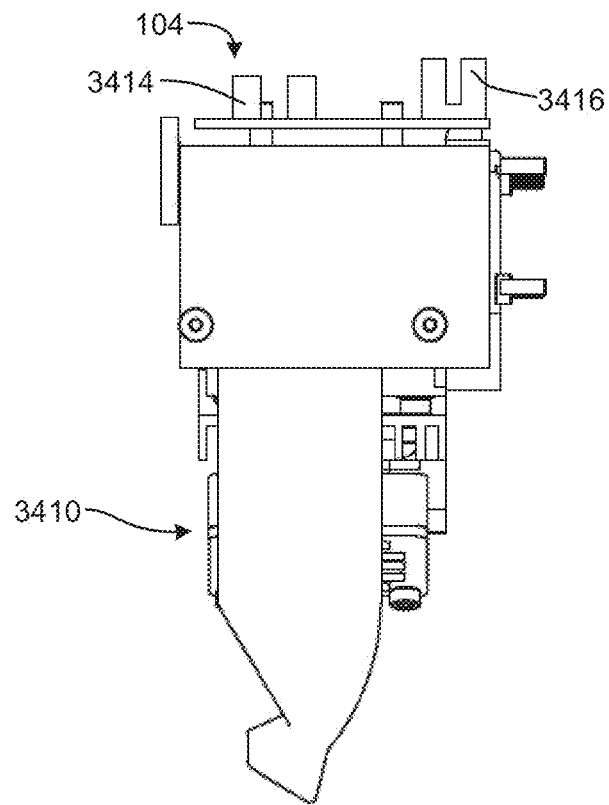
FIG. 37 is a top view of the extruder of FIG. 34.
Figure 38:
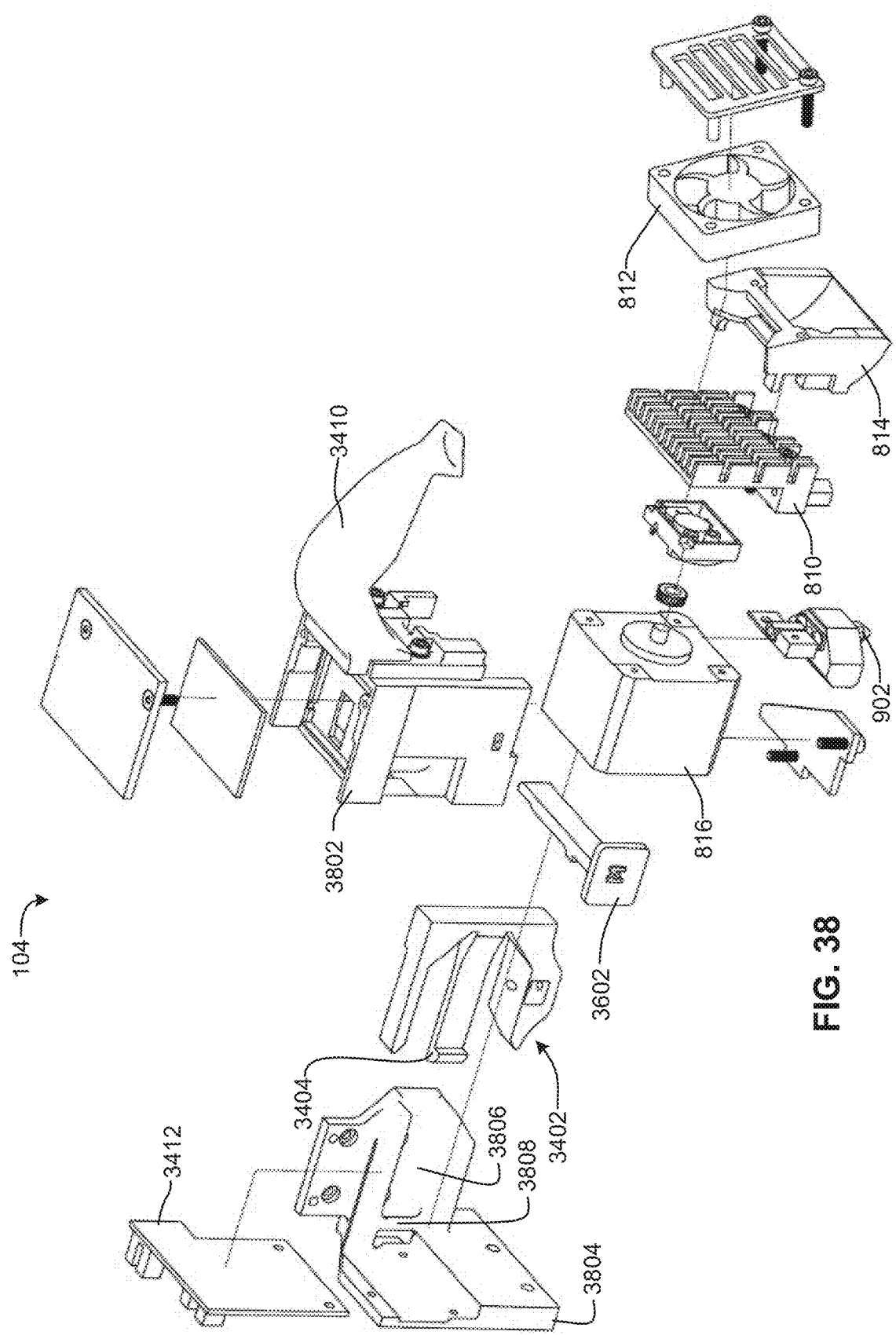
FIG. 38 is an exploded perspective view of the extruder of FIG. 34.
Figure 39:
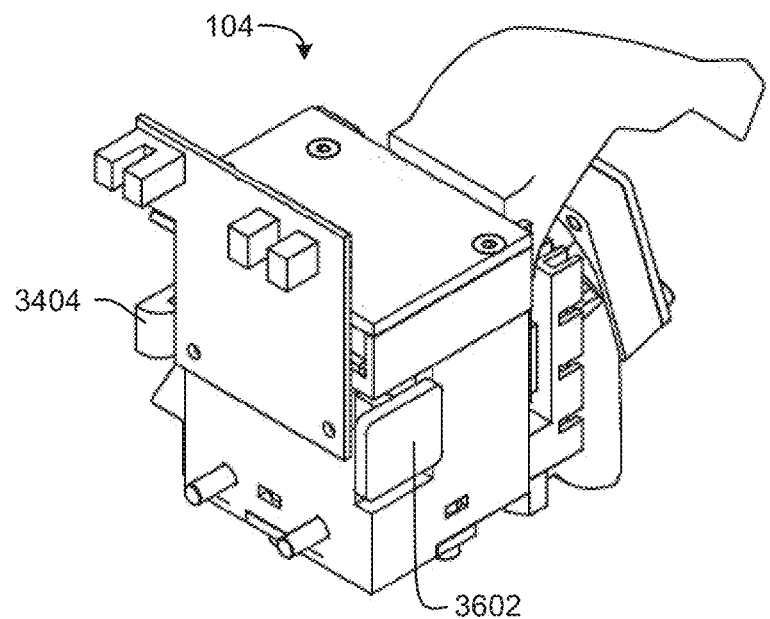
FIG. 39 is a rear perspective view of the extruder of FIG. 34.

Referring now to FIGS. 32-33, various views of feedstock cartridge 106 for an additive manufacturing device, feedstock cartridge 106 dispensing filament 802 from a center opening 3202, according to various aspects of the present disclosure, are shown.

In some aspects, dispensing filament from center opening 3202 shortens the distance filament 802 must travel to extruder 104. Dispensing from center opening 3202 or from another location may also be done to reduce bending in filament 802.

In aspects where filament is dispensed via center opening 3202, rollers may be positioned in the center of spool 706, thereby facilitating dispensing of filament 802.

Referring now to FIGS. 34-39, various views of additive manufacturing device extruder 104 having quick release mechanism 3402, according to various aspects of the present disclosure, are shown.

Extruder 104 may receive filament 802 via front mounted filament guide 3410. Filament guide 3410 may be constructed of metal, polymer or another material and receives filament 802 at a guide opening 3408. In some aspects, guide opening 3408 is an expanding opening oriented toward a feedstock source in order to receive filament with minimal bending or pinching of filament 802 during operation and repositioning of extruder 104. In some aspects, the feedstock source is positioned opposite the translation mechanism connected to extruder 104, thereby avoiding binding, tangling, or other unwanted contact. Filament guide body 3406 includes a channel and expands in width at a middle portion, providing an area for filament 802 to move laterally during the movement of extruder 104, avoiding binding. Filament guide body 3406 angles downward at a curving portion 3502, guiding filament 802 into extruder 104. In order to avoid binding or otherwise damaging filament 802, curving portion 3502 redirects filament over a curved surface. The arrangement of cartridge 106 and extruder having filament guide, as shown in FIG. 24, facilitates a larger build volume in enclosure 114 and a shorter filament 802 path.

Quick release mechanism 3402 removably attaches extruder 104 via physical and electrical connections to traverse 102 or another material bonding positioning system which includes an extruder bracket 3804 having a retaining channel 3806. Quick release 3402 includes a dovetail guide having a tongue 3404 with a catch. The catch engages a bar 3808 across channel 3806, attaching extruder 104 to translation mechanism.

Extruder 104 also includes electrical connections 3414 (labeled as extruder electrical connections 3414a-b in FIG. 34) which removably engage device 100 when extruder 104 is attached. Electrical connections 3414 connect to corresponding linkages on for example, traverse system 102, and control the operation of extruder 104. In other aspects, electrical connections 3414 connect to corresponding linkages on another portion of device 100. In yet other aspects, electrical connections 3414 are omitted and control signals are sent to extruder 104 via wireless communication. In some aspects, extruder rear plate 3412 forms a portion of quick release mechanism 3402 and includes electrical connections 3414. In this manner, quick release mechanism 3402 includes both a physical connector and an electronic connector and physical connection or removal and electrical connection or removal may be facilitated in a single motion. In some aspects, the physical connector of quick release mechanism 3402 is integral with the electrical connection 3414.

Extruder rear plate 3412 may be or include a printed circuit board having connections for extruder nozzle 902 heater, extruder nozzle 902 temperature sensor, ambient temperature sensor, fan 812, and extruder motor 816. Extruder rear plate 3412 may also include a solenoid-based height sensor which may contact the build platform assembly 112 via lowering extruder 102 until the sensor contacts the build platform assembly 112. This process may be performed during startup, recalibration or the like. The position of the solenoid may be determined via an optical sensor on extruder rear plate 3412. Extruder 102 may include a memory component which may log the hours extruder 102 has been used, extruder 102 serial number, model type, modifications made to extruder 102, conditions in which extruder 102 has operated, and the like. The memory component may be part of extruder back plate 3412. Sensor data from sensors connected to or onboard extruder back plate 3412 may send information to electronics 110 or to a third party control or data collection system. Extruder back plate 3412 may and determines the exact distance from extruder 102 to the build tray.

Extruder further includes a release 3602 horizontally oriented and located on the side of extruder 104 and engaging tongue 3404. The user may press release 3602 to unlock extruder 104 from extruder bracket 3804, allowing the extruder to slide back out of the printer. In some aspects, release 3602 extends through a portion of an extruder housing 3802.

Extruder 104 may further include a limit switch 3416 which may alert control electronics 110 to extruder 104 reaching a limit within traverse system 102.

Figure 40:
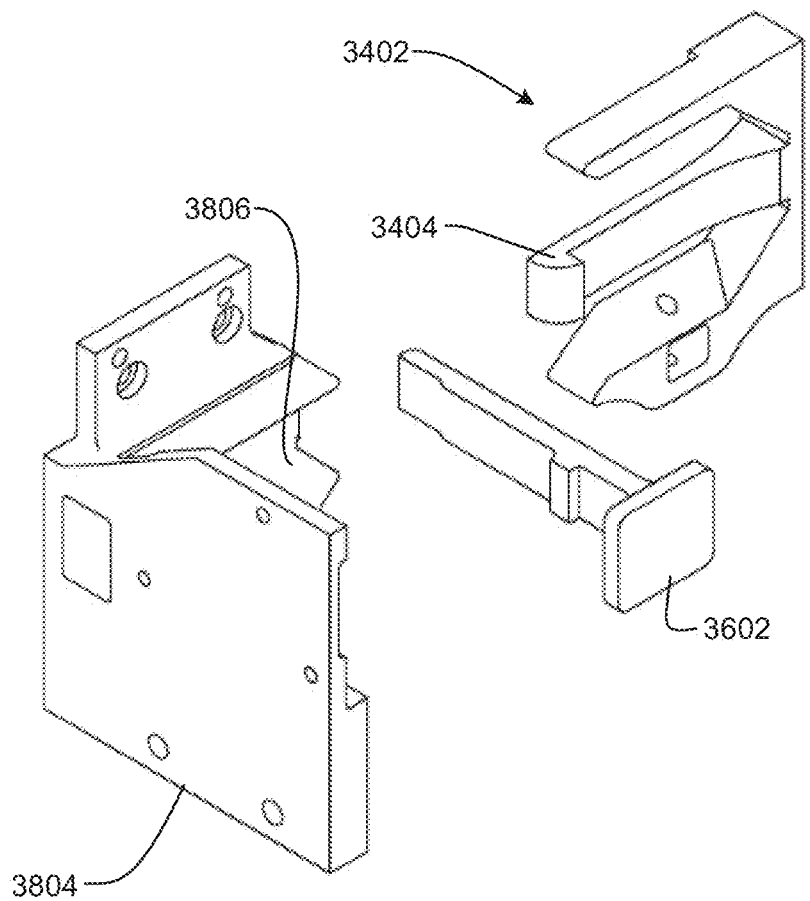
FIG. 40 is an exploded perspective view of components with make up an quick release assembly for an extruder within an additive manufacturing device, according to various aspects of the present disclosure.

Referring briefly now to FIG. 40, a rear perspective view of components which make up quick release assembly 3402 for extruder 104 within additive manufacturing device 100, according to various aspects of the present disclosure, is shown.

Figure 41A:
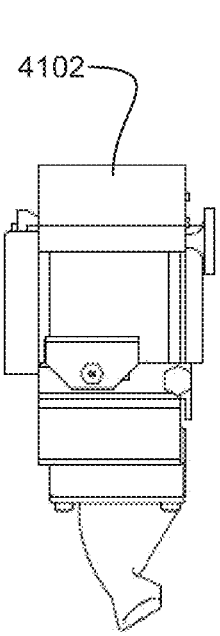
FIGS. 41A-C are bottom views of extruders having sensors configured to detect the position of a build platform or build platform assembly in an additive manufacturing device, according to various aspects of the present disclosure.
Figure 41B:
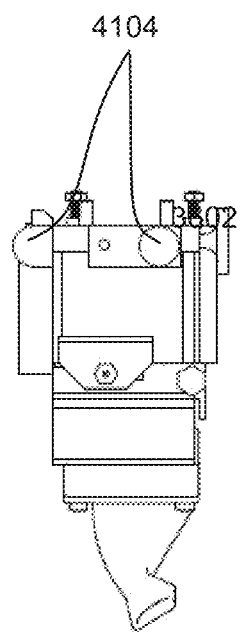
Figure 41C:
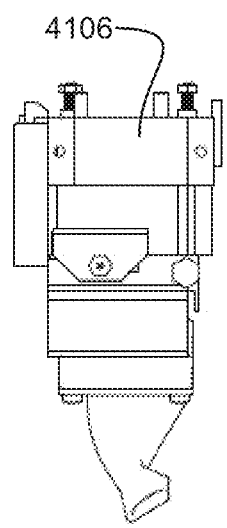

Referring now to FIGS. 41A-C, bottom views of extruders 104 having sensors configured to detect the position of a build surface or other portion of build platform assembly 112 in additive manufacturing device 100 according to various aspects of the present disclosure, are shown.

In order to actively detect and/or verify the location of the build surface or reference points related to the build surface, extruder 104 may be equipped with a laser sensor 4102, as shown in FIG. 41A, an inductive sensor 4104, a capacitive sensor 4106, or any other sensor that a person skilled in the relevant art(s) would find appropriate to mount to extruder 104 after reading the present disclosure. Sensors to determine the relative and/or absolute positions of extruder 104 and build surface or related reference points may be positioned elsewhere within device 100. Such sensors may be used to automatically adjust the position of extruder 104 via traverse 102 and/or cause build platform assembly 112 to be repositioned.

Figure 42:
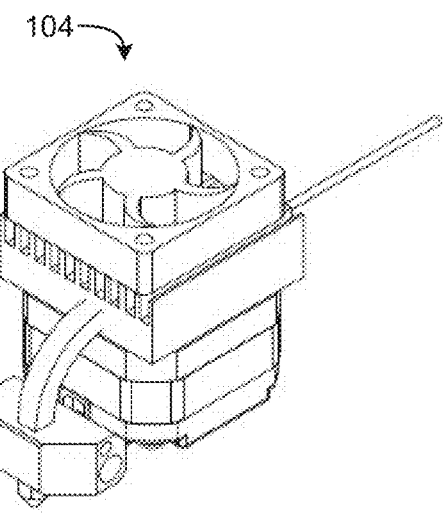
FIG. 42 is a perspective view of an additive manufacturing device extruder, according to various aspects of the present disclosure.
Figure 43:
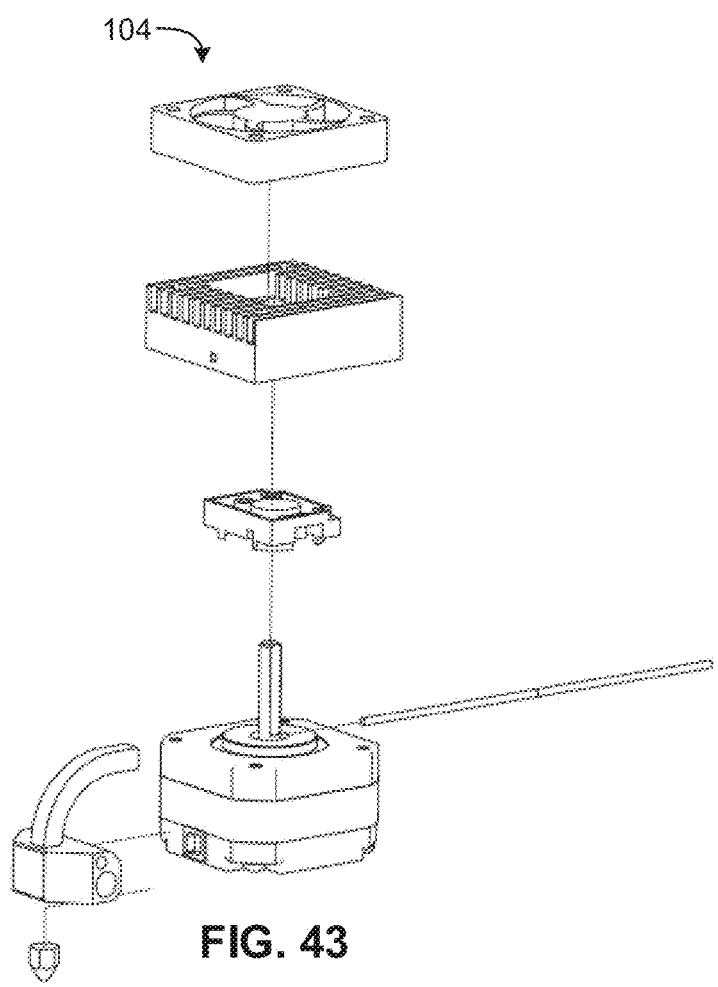
FIG. 43 is an exploded perspective view of the extruder of FIG. 42.

Referring briefly now to FIGS. 42-43, various views of additive manufacturing device extruder 104 having a low profile and receiving horizontally oriented filament 802, according to various aspects of the present disclosure, are shown.

Figure 44:
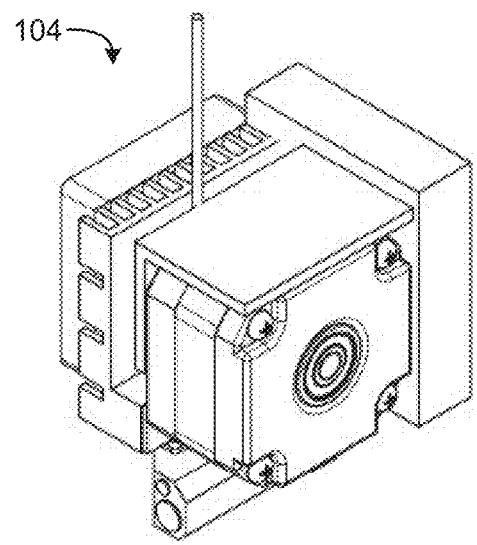
FIG. 44 is a perspective view of an additive manufacturing device extruder, according to various aspects of the present disclosure.
Figure 45:
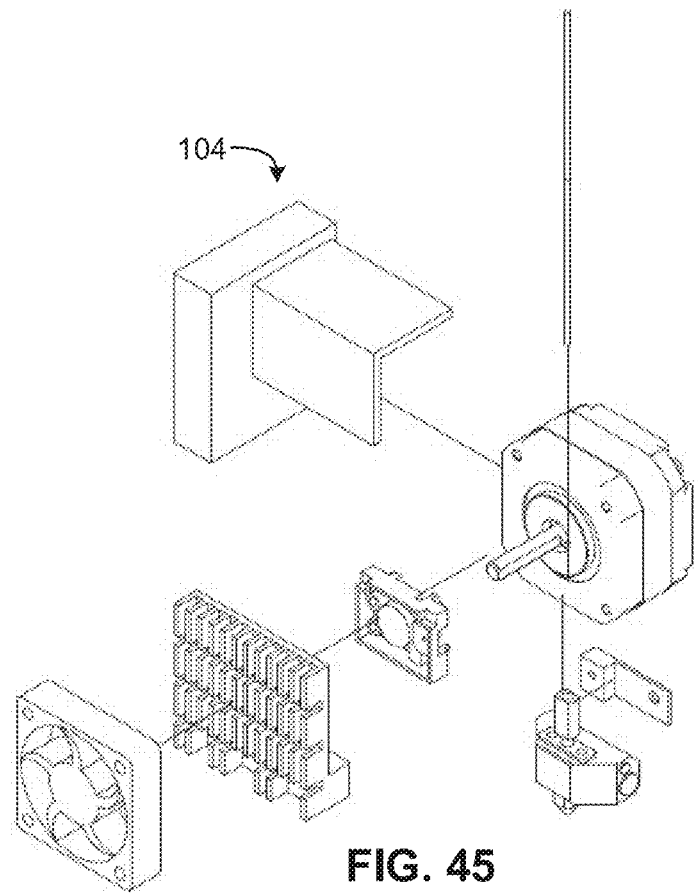
FIG. 45 is an exploded perspective view of the extruder of FIG. 44.

Referring briefly now to FIGS. 44-45, various views of additive manufacturing device extruder 104 having a low profile and receiving vertically oriented filament 802, according to various aspects of the present disclosure, are shown.

Figure 46:
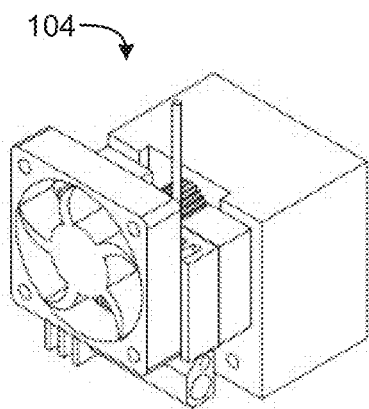
FIG. 46 is a perspective view of an additive manufacturing device extruder, according to various aspects of the present disclosure.
Figure 47:
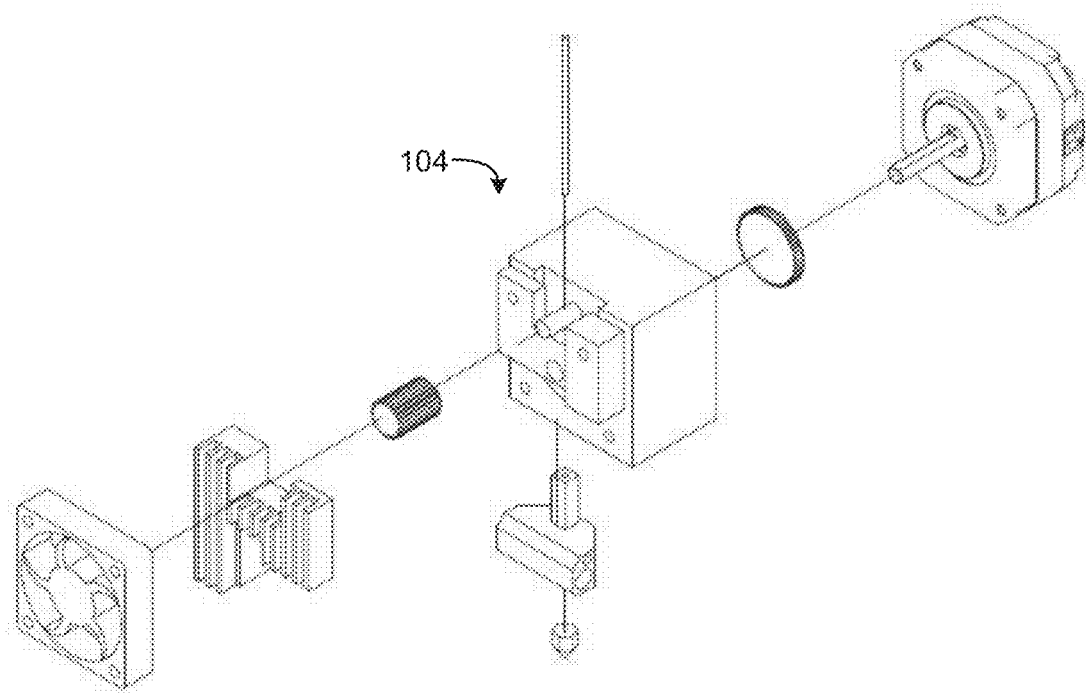
FIG. 47 is an exploded perspective view of the extruder of FIG. 46.

Referring briefly now to FIGS. 46-47, various views of additive manufacturing device extruder 104 having a low profile and receiving vertically oriented filament 802 and having extruder nozzle 902 positioned in line with the filament orientation, according to various aspects of the present disclosure, are shown.

Referring now to FIGS. 48-49, various views of an additive manufacturing device extruder, according to various aspects of the present disclosure, are shown.

Within extruder 104, filament 802 may be guided by filament retaining devices 4902 (labeled as filament retaining devices 4902a-b in FIG. 49) and selectively moved via gear 4904. Filament retaining devices 4902 serve to position and stabilize filament 802 within the extruder body.

Referring now to FIGS. 50A-C, views of filament retaining device 4902 useful for guiding and tensioning filament 802 within additive manufacturing device extruder 104, according to various aspects of the present disclosure, are shown.

Filament retaining device 4902 includes wheels 5002 rotatably connected to posts 5004. As shown in FIG. 50C, a cutaway view along outline A in FIG. 50B, post 5004 is supported by spring 5008, resisting and dampening lateral movement of filament 802 and holding filament 802 in place.

Figure 51:
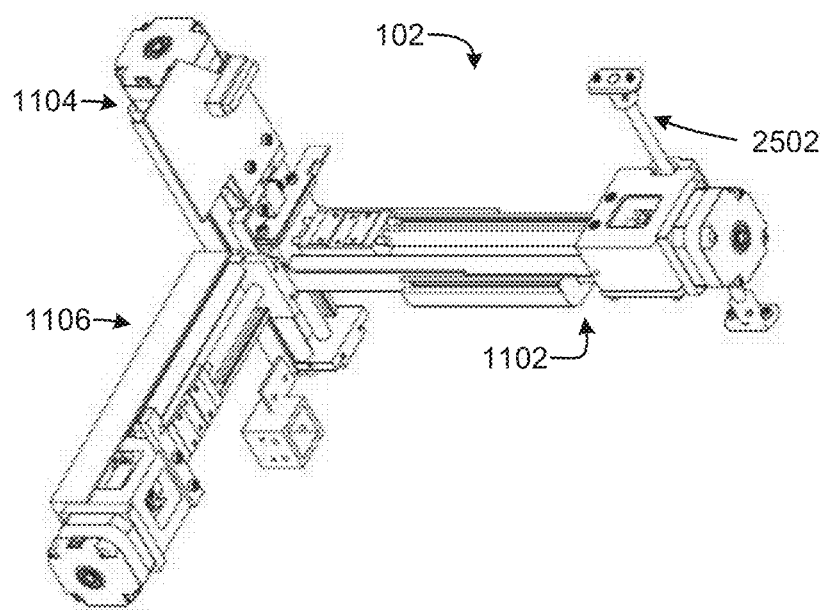
FIG. 51 is a perspective view of an additive manufacturing device traverse system, according to various aspects of the present disclosure.
Figure 52:
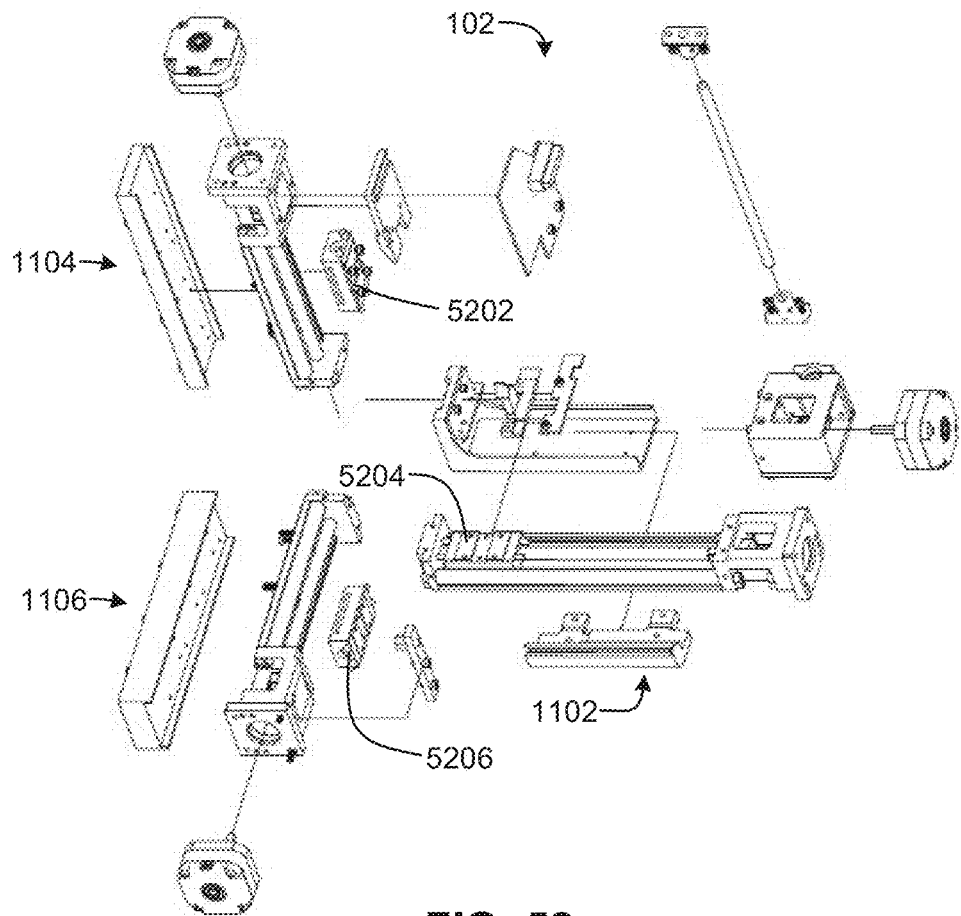
FIG. 52 is an exploded perspective view of the traverse system of FIG. 51.
Figure 53:
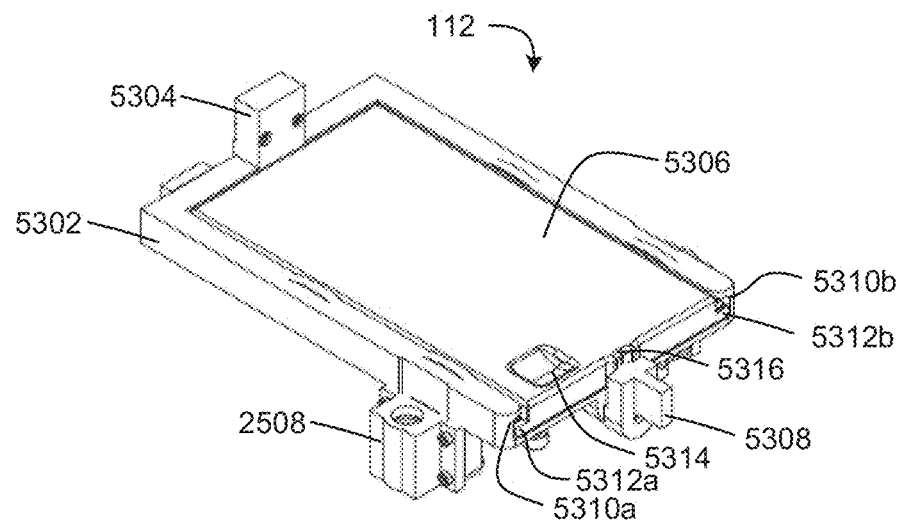
FIG. 53 is a perspective view of an additive manufacturing device build platform assembly having a removable build table, according to various aspects of the present disclosure.
Figure 54:
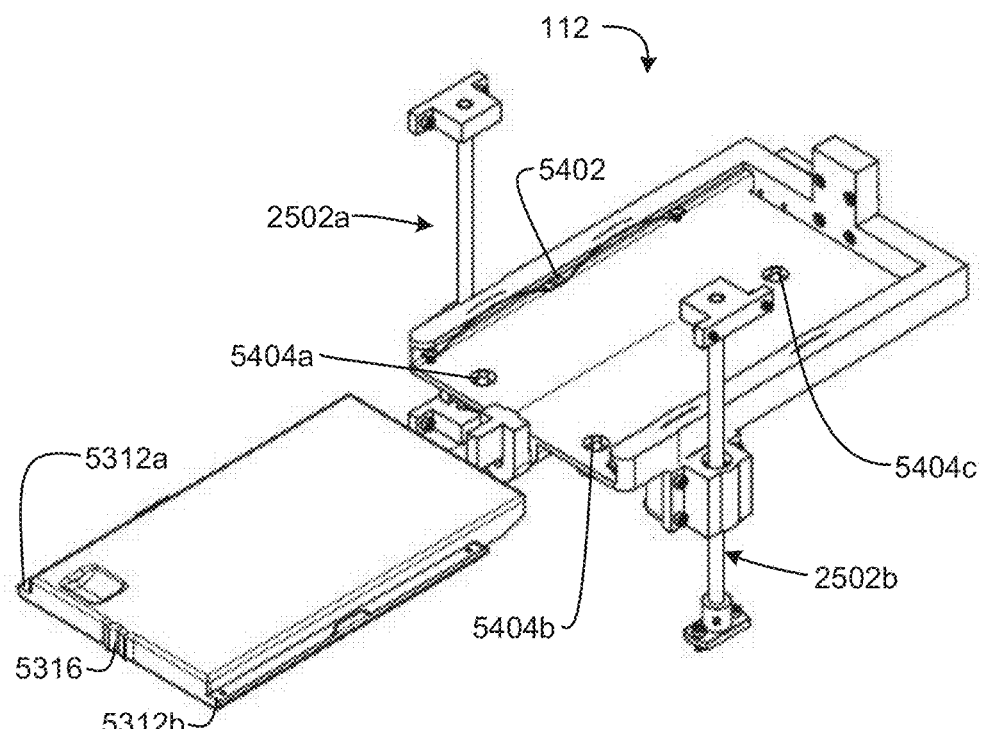
FIG. 54 is a perspective view of the build platform assembly of FIG. 53, wherein the build table is being removed.
Figure 55:
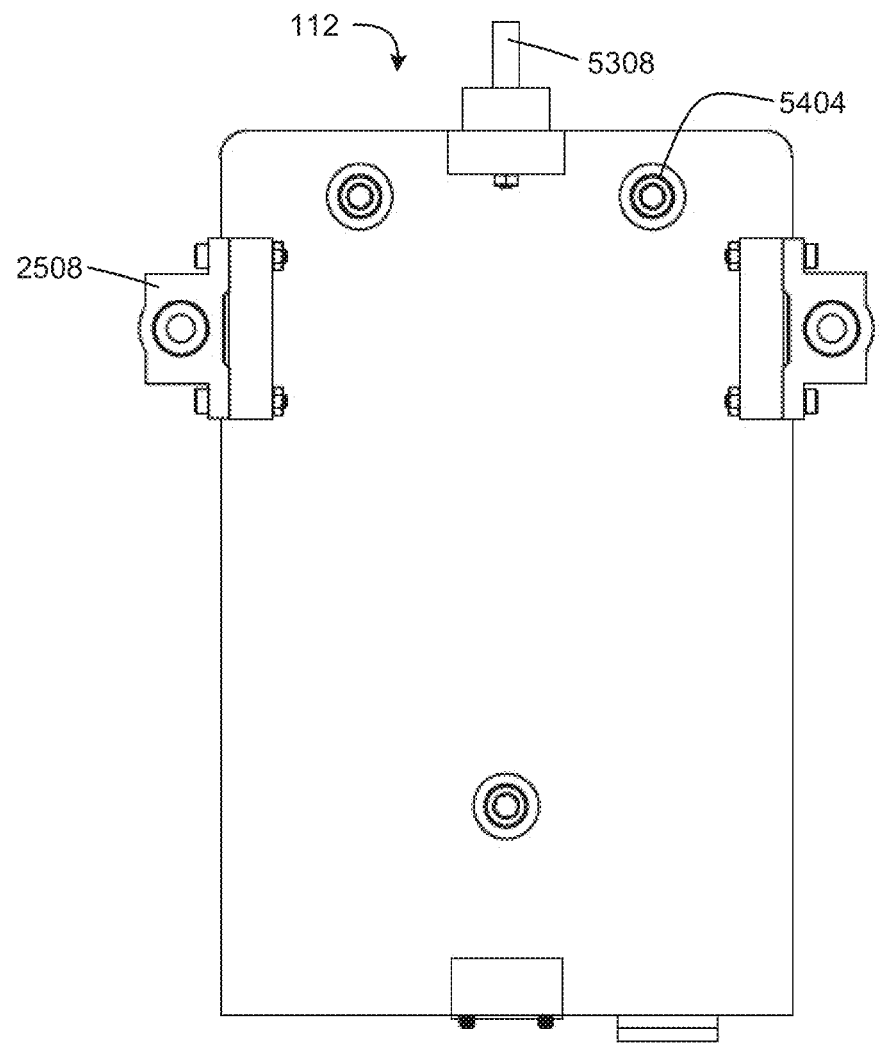
FIG. 55 is a bottom view of the build platform assembly of FIG. 53.
Figure 56:
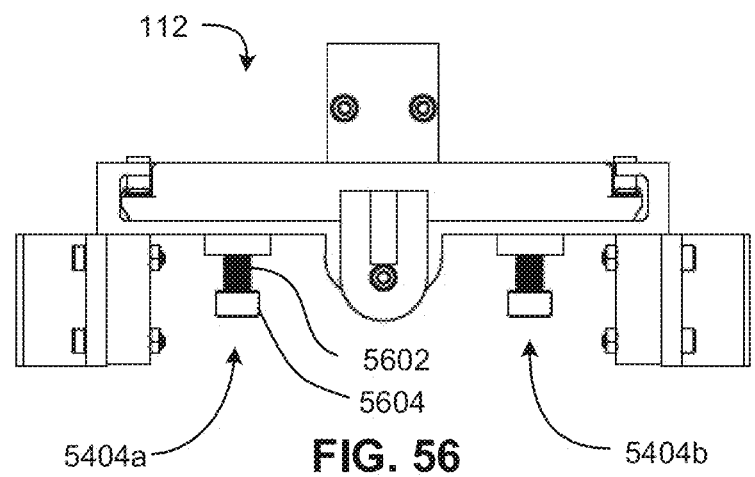
FIG. 56 is a front view of the build platform assembly of FIG. 53.

Referring now to FIGS. 51-52, various views of additive manufacturing device traverse system 102, according to various aspects of the present disclosure, are shown. Second actuator 1102 interfaces with extruder 104 at extruder assembly carriage 5204 and is moved in a y-axis via connection at traverse carriage 5202. Third actuator 1106 connects to build platform assembly 112 via platform carriage 5206.

Referring now to FIGS. 53-56, various views of additive manufacturing device build platform assembly 112 having a removable build table 5306, according to various aspects of the present disclosure.

Build platform assembly 112 may include a build platform receiver 5302. Receiver 5302 is a rigid frame having two inward facing channels 5310 (labeled as channels 5310a-b in FIG. 53) extending the length of build table along the edge of receiver 5302 frame. Receiver also includes a retaining mechanism 5308, such as a latch for retaining build table 5306 within receiver 5302.

Build table 5306 includes two flanges 5312 (labeled as flanges 5312a-b in FIG. 54) running at least a portion of the length of build table 5306. Flanges 5312 are inserted into channels 5310 when build table 530 is inserted into receiver 5302. Build table 5306 may include depression 5314 to facilitate removing and inserting build table 5306 into receiver 5302.

In some aspects, build platform assembly 112 self-levels build table 5306. Spring bars 5402 are positioned within each channel 5310 and providing a downward spring force on flanges 5312. Alignment mechanisms 5404 (labeled as alignment actuators 5404*a-c* in FIG. 54) apply an upward force based on the orientation of build table 5306, causing build table 5306 to level. In some aspects, alignment mechanism 5404 is an active device such as a piezo electric motor, ultrasonic actuator, stepper motor, shape memory actuator or the like having a post or other member attached contacting the underside of build table 5306. Such active devices apply an upward force to build tray in response to measurement of build table 5306 level status.

Alignment mechanism 5404 may be a passive device such as a spring 5602 under tension or compression and connected to a post which may be adjusted by tightening a retaining screw 5604.

Figure 57:
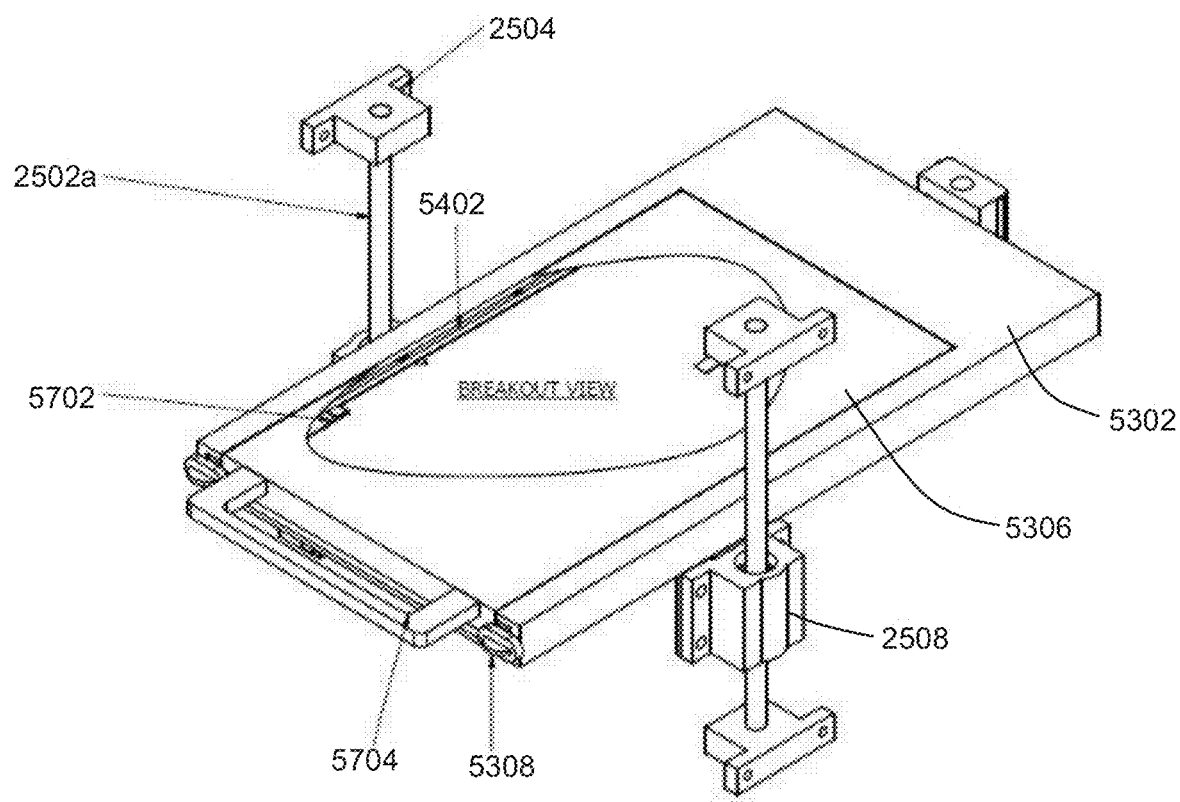
FIG. 57 is a perspective view of an additive manufacturing device build platform assembly having a partial cutaway view depicting a build table leveling device positioned in a build tray channel, according to various aspects of the present disclosure.
Figure 58:
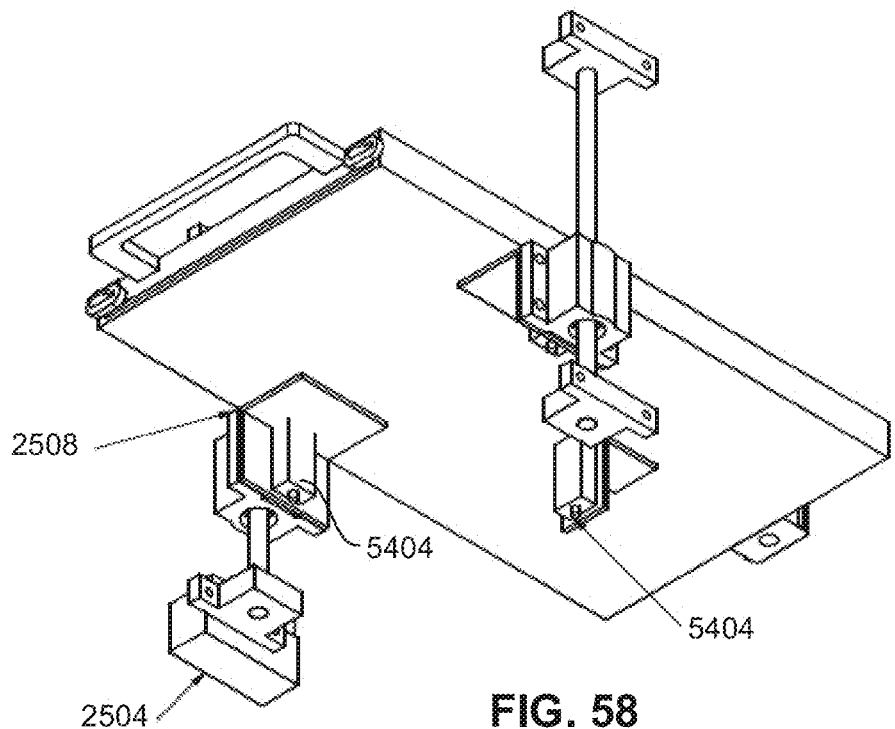
FIG. 58 is a bottom perspective view of the build platform assembly of FIG. 57.
Figure 59:
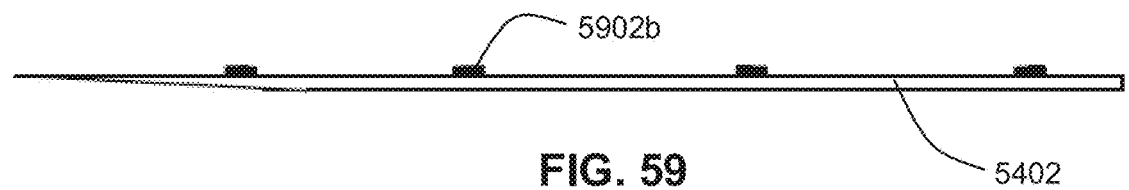
FIG. 59 is a side view of the build table leveling device positioned in a build tray of FIG. 57.

Referring now to FIGS. 57-59, various views of additive manufacturing device build platform assembly 112 having a partial cutaway view depicting spring bar 5302 positioned in build tray channel 5312, according to various aspects of the present disclosure, are shown.

Alignment mechanisms 5404 may be integrated into brackets which connect to carriage 2508. In some aspects, depression is omitted and build table 5306 includes a handle 5704. Receiver 5302 may include plate guide 5702.

Spring bar 5302 comprises an extended member having an angled front and multiple springs 5902.

Figure 60:
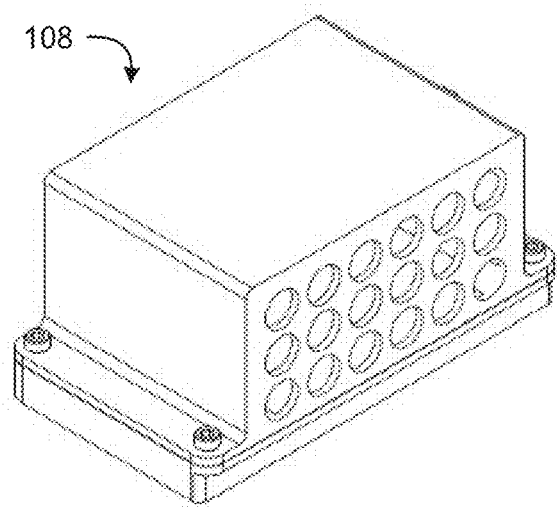
FIG. 60 is a perspective view of an environmental control unit configured to facilitate operation of an additive manufacturing device in an enclosed or controlled environment, according to various aspects of the present disclosure.
Figure 61:
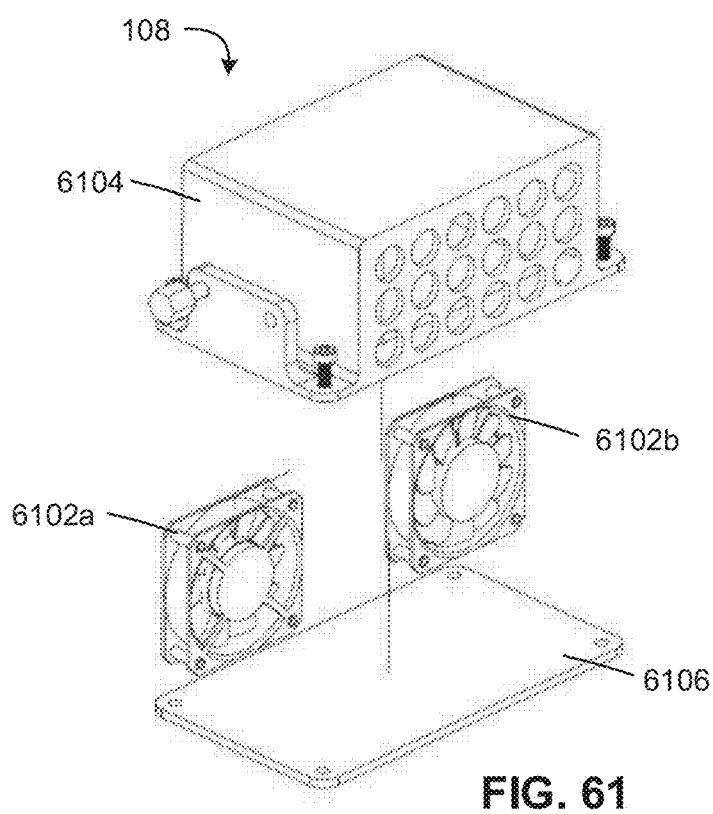
FIG. 61 is an exploded perspective view of the environmental control unit of FIG. 60.
Figure 68:
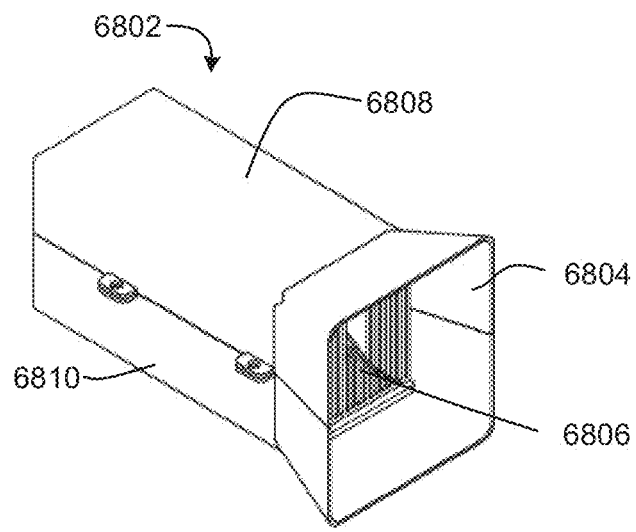
FIG. 68 is a perspective view of an air circulation and heating device for an additive manufacturing device having an enclosed volume, according to various aspects of the present disclosure.
Figure 69:
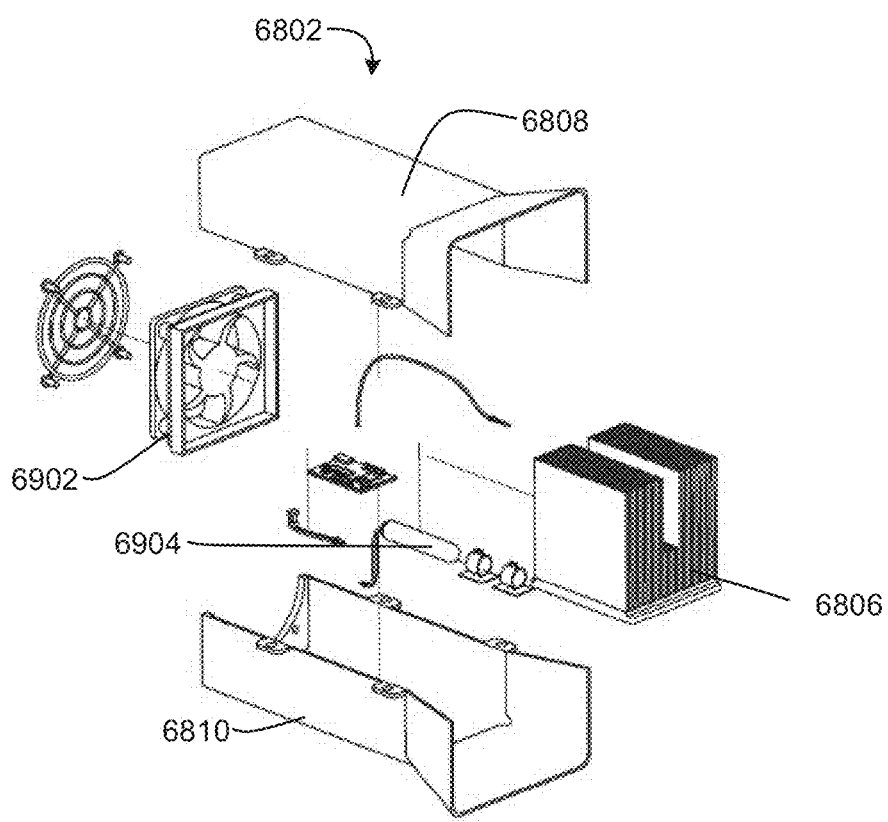
FIG. 69 is an exploded perspective view of the air circulation and heating device of FIG. 68.
Figure 70:
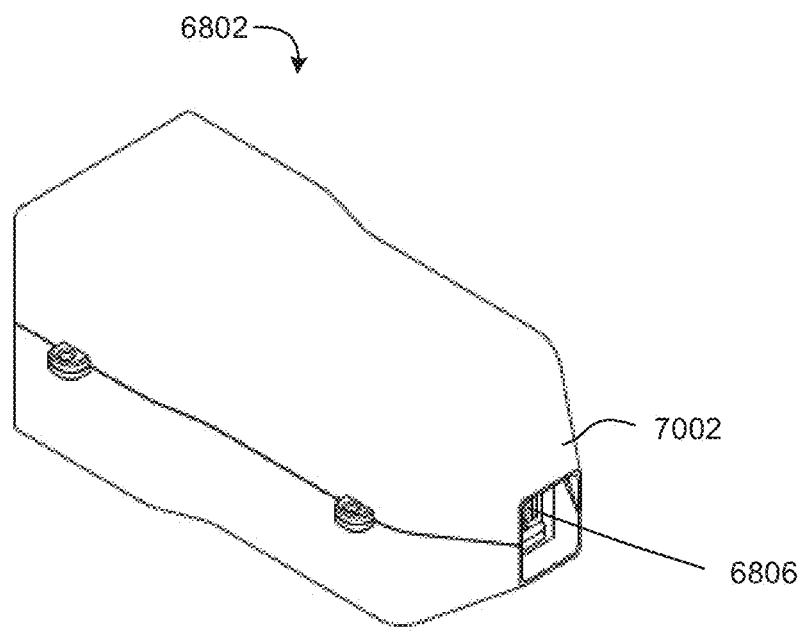
FIG. 70 is a perspective view of an air circulation and heating device having a narrowing end, according to various aspects of the present disclosure.

Referring now to FIGS. 60-61, various views of environmental control unit 108 configured to facilitate operation of additive manufacturing device 100 in an enclosed or controlled environment, according to various aspects of the present disclosure, are shown. ECU may include ECU body 6104 housing a plurality of fans (labeled as fans 6102*a-b* in FIG. 61) and connecting to an ECU base plate 6106.

Referring now to FIGS. 62-67, various views of an environmental control unit configured to facilitate operation of an additive manufacturing device in an enclosed or controlled environment, the environmental control unit having a shutter assembly, according to various aspects of the present disclosure, are shown.

ECU 108 may include a shutter assembly 6204, a removable filter assembly 6202 retained by a latch 6208, multiple fans and air inlet cover 6502. Shutter assembly 6204 includes multiple physical shutters 6304 which are connected to shutter motor 6206 via shutter linkages 6306. Filter assembly 6202 may be a user replaceable component and include a carbon filter 6702 and a HEPA filter 6704.

Referring now to FIGS. 68-71, various views and aspects of an air circulation and heating device 6802 for additive manufacturing device 100 having an enclosed volume, according to various aspects of the present disclosure, are shown.

In some aspects, air circulation and temperature control may be facilitated by or augmented by device 6802. Device 6802 includes a radiator 6806 connected to a heating element 6904 for heating air that passes through device 6802. Fan 6902 may be used to force air through device 6802. The body of device 6802 is created from a top portion 6808 and a lower portion 6810.

Figure 71:
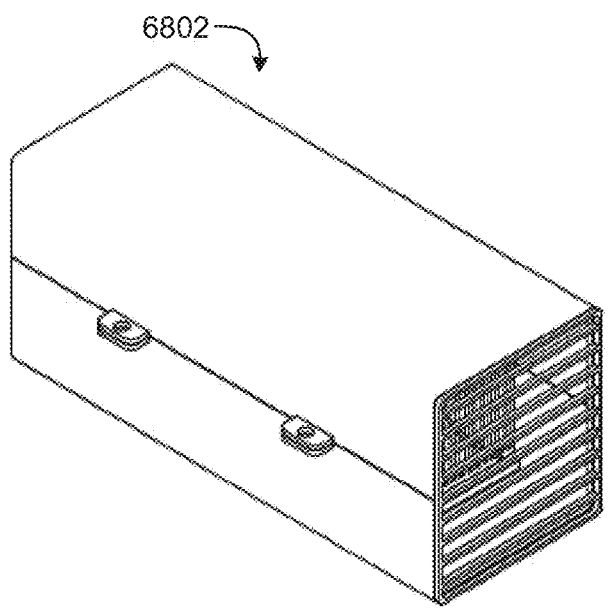
FIG. 71 is a perspective view of a rectangular air circulation and heating device, according to various aspects of the present disclosure.

End portions of device 6802 may be flared (as in FIG. 68) narrowing (as in FIG. 70) or device 6802 may be rectangular (as in FIG. 71).

Figure 72:
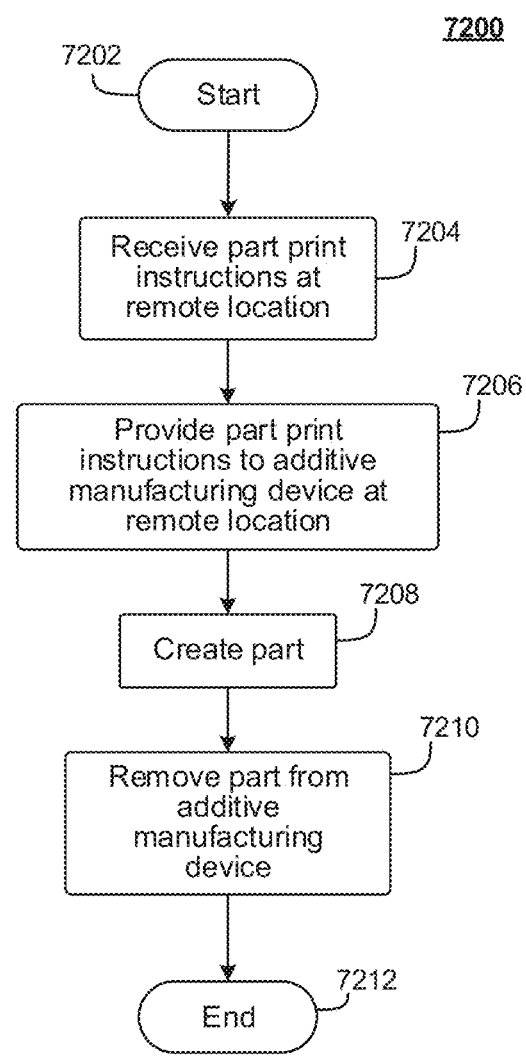
FIG. 72 is a flowchart depicting an exemplary process for producing a part via an additive manufacturing device operable in a variety of force and gravitational environments, including microgravity, according to aspects of the present disclosure.

Referring now to FIG. 72, a flowchart depicting an exemplary process 7200 for producing a part via an additive manufacturing device operable in a variety of force and gravitational environments, including microgravity, according to aspects of the present disclosure, is shown.

Process 7200 may utilize additive manufacturing device 100 positioned at a remote location such as on an orbiting space station or satellite to produce desired parts.

Process 7200 begins at step 7202 with control immediately passing to step 7204.

At step 7204, part print instructions are received at the remote location housing additive manufacturing device 100. In some aspects, part print instructions are commands to produce a part that control electronics 110 already contain print files for. In another aspect, a print file is included with part print instructions. Part print instructions may be provided from a local source or from a remote source.

At step 7206, the part print instructions received at step 7204 are input into device 100 so that device 100 may produce the part at step 7208.

At step 7210, the completed part is removed from device 100 for use at remote location.

Process 7200 then terminates at step 7212.

Referring now to FIG. 73, a block diagram illustrating an exemplary computer system 7300 useful for implementing an aspect of the present disclosure, is shown.

FIG. 73 sets forth an illustrative computer system that may be used to implement computing functionality 7300, such as control electronics 110, which in all cases represents one or more physical and tangible processing mechanisms.

Computing functionality 7300 may comprise volatile and non-volatile memory, such as RAM 7302 and ROM 7304, as well as one or more processing devices 7306 (e.g., one or more central processing units (CPUs), one or more graphical processing units (GPUs), and the like). Computing functionality 7300 also optionally comprises various media devices 7308, such as a hard disk module, an optical disk module and so forth. Computing functionality 7300 may perform various operations identified above when the processing device(s) 7306 execute(s) instructions that are maintained by memory (e.g. RAM 7302, ROM 7304, and the like).

More generally, instructions and other information may be stored on any computer readable medium 7310, including, but not limited to, static memory storage devices, magnetic storage devices and optical storage devices. The term "computer readable medium" also encompasses plural storage devices. In all cases, computer readable medium 7310 represents some form of physical and tangible entity. By way of example, and not limitation, computer readable medium 7310 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 7302, ROM 7304, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

Computing functionality 7300 may also comprise an input/output module 7312 for receiving various inputs (via input modules 7314), and for providing various outputs (via one or more output modules). One particular output module mechanism may be a presentation module 7316 and an associated GUI 7318. Computing functionality 7300 may also include one or more network interfaces 7320 for exchanging data with other devices via one or more communication conduits 7322. In some embodiments, one or more communication buses 7324 communicatively couple the above-described components together.

Communication conduit(s) 7322 may be implemented in any manner (e.g., by a local area network, a wide area network (e.g., the Internet), and the like, or any combination thereof). Communication conduit(s) 7322 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone and the like).

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects, but should be defined only in accordance with the following claims and their equivalents.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., utilizing additive manufacturing devices not mentioned herein, implementation within computing devices other than those disclosed herein, and operating in environments other than those disclosed herein). As will be appreciated by those skilled in the relevant art(s) after reading the description herein, certain features from different aspects of the systems, methods and computer program products of the present disclosure may be combined to form yet new aspects of the present disclosure.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

What is claimed is:

1. An additive manufacturing device operable in a microgravity environment to create a part, the additive manufacturing device comprising:
   a feedstock source comprising feedstock;
   a material bonding component moveable in two axes, the material bonding component configured to receive portions of the feedstock from the feedstock source, the material bonding component positioning and bonding each of the portions of the received feedstock according to part creation instructions;
   a material bonding component positioning system configured to position the material bonding component in one of the two axes according to the part creation instructions and to position the part being created according to the part creation instructions;
   a build volume, the part being created within the build volume according to the part creation instructions; and
   an environmental control unit having at least one of a temperature sensor and a humidity sensor and a contaminant analysis unit to detect errant pieces of feedstock within the build volume and at least one grate and a filter, separate from each other, to capture errant pieces of feedstock during creation of the part and wherein the environmental control unit is configured to prohibit access to the build volume until the errant pieces of feedstock have been secured by the environmental control unit.

2. The additive manufacturing device of claim 1, wherein the material bonding component bonds each of the portions of the received feedstock according to part creation instructions via causing a state change in each of the portions of the received feedstock and positioning the altered portions of the feedstock.

3. The additive manufacturing device of claim 1, the feedstock source comprising a filament, the filament being fed into the material deposition component, the material bonding component bonding each of the portions of the received feedstock according to part creation instructions via heating each of the portions of the received feedstock to a feedstock melting point and positioning the heated each of the portions of the feedstock.

4. The additive manufacturing device of claim 3, wherein the filament is a polymer filament.

5. The additive manufacturing device of claim 3, wherein the filament is a metal filament.

6. The additive manufacturing device of claim 3, the feedstock source being a feedstock cartridge removably attached to the additive manufacturing device, the feedstock cartridge containing and dispensing the filament from the filament spool, the feedstock cartridge comprising:
   a casing having a filament dispensing opening;
   a filament spool rotatably connected to an axle, the axle connected to the casing, the filament spool containing the filament;

a filament guide tube receiving the filament within the casing and guiding the filament through the filament dispensing opening to a location proximal to the material deposition component; and at least one connection mechanism configured to removably attach the feedstock source to the additive manufacturing device.

7. The additive manufacturing device of claim 6, the feedstock cartridge further comprising a feed motor, the feed motor contacting the filament and configured to dispense the filament.

8. The additive manufacturing device of claim 6, the filament dispensing opening positioned at a side panel center, the filament passing through the axle for dispensing.

9. The additive manufacturing device of claim 8, further comprising a feed motor positioned within the axle, the feed motor contacting the filament and configured to dispense the filament.

10. The additive manufacturing device of claim 6, the feedstock cartridge further comprising a filament guide tube monitor, the filament guide tube motor configured to cease feed motor operation when a filament break is detected within the filament guide tube.

11. The additive manufacturing device of claim 1, further comprising an enclosure, the enclosure having an enclosed volume containing the build volume, the enclosure comprising an access door with control electronics to control access through the access door, wherein the environmental control unit controls the control electronics of the access door to allow access through the access door once at least one errant piece of the errant pieces of feedstock has been captured by the environmental control unit at the grate.

12. The additive manufacturing device of claim 11, the enclosure comprising a feedstock source receptacle configured to receive and removably connect the feedstock source.

13. The additive manufacturing device of claim 11, wherein the enclosure is airtight.

14. The additive manufacturing device of claim 1, wherein the environmental control unit comprises control electronics to control opening of the door based on at least one of wait time and contaminant concentration level thresholds as determined by at least one of a measurement of temperature, humidity, air quality and air circulation.

15. The additive manufacturing device of claim 1, the environmental control unit positioned within the enclosed volume and comprising at least one fan.

16. The additive manufacturing device of claim 15, wherein the at least one filter is replaceable by hand from within the enclosed volume.

17. The additive manufacturing device of claim 15, the environmental control unit further comprising: an internal air temperature control device, the internal air temperature control device having at least one heating element and a radiator.

18. The additive manufacturing device of claim 15, the environmental control unit further comprising: a shutter assembly configured to regulate airflow through at least a portion of the environmental control unit.

19. The additive manufacturing device of claim 11, the enclosure further comprising a plurality of temperature sensors positioned throughout the enclosure, the plurality of temperature sensors being communicatively coupled to at least one control circuit, the at least one control circuit ceasing additive manufacturing device operation when a minimum number of the plurality of temperature sensors detects a temperature outside an operational range.

20. The additive manufacturing device of claim 19, wherein the minimum number of the plurality of temperature sensors is greater than one.

21. The additive manufacturing device of claim 1, the material deposition component being a filament extruder.

22. The additive manufacturing device of claim 21, wherein the extruder is replaceable and modular.

23. The additive manufacturing device of claim 22, the extruder comprising a release, operable by a hand for removably detaching the extruder from the material deposition positioning system.

24. The additive manufacturing device of claim 23, the release comprising:
a push button dovetail release; and
a dovetail clip having a locking tongue;
the material deposition positioning system comprising an extruder bracket configured to removably receive the dovetail clip and attach the extruder.

25. The additive manufacturing device of claim 21, the extruder further comprising at least one position sensor configured to determine an extruder position relative to another portion of the additive manufacturing device.

26. The additive manufacturing device of claim 25, wherein the at least one position sensor is mounted on a bottom portion of the extruder, is configured to determine the extruder position relative to a build surface and is one of: an inductive sensor; a capacitive sensor; and a laser sensor.

27. The additive manufacturing device of claim 21, the extruder further comprising a filament guide for receiving and guiding the filament into the extruder, the filament guide comprising:
a flared guide opening angled toward the feedstock source; and
a guide body with an integral internal channel receiving the filament from the guide opening, the guide body extending upward to a curving end portion, the curving end portion curving downward and guiding the filament into the extruder.

28. The additive manufacturing device of claim 27, wherein the filament guide is positioned at an extruder upper front portion.

29. The additive manufacturing device of claim 1, the material deposition positioning system comprising a plurality of linear actuators configured to manipulate one of: a build platform assembly and a material deposition component, each of the linear actuators comprising:
a linear actuator motor;
a screw-driven linear rail operably connected to the motor; and
a carriage connected for movement to the linear rail;
wherein each of the linear actuators is connected to a common surface of the additive manufacturing device.

30. The additive manufacturing device of claim 29, the plurality of linear actuators being:
a first vertically-oriented linear actuator connected to an additive manufacturing device backplate;
a second vertically-oriented linear actuator connected to the additive manufacturing device backplate;
a horizontally-oriented material deposition component linear actuator connected for vertical movement to a first vertically-oriented linear actuator carriage at a first end portion and to a second vertically-oriented linear actuator carriage at a second end portion, the material deposition component connected for horizontal movement to a horizontally-oriented material deposition component linear actuator carriage, the a horizontally-oriented material deposition component linear actuator connected to the additive manufacturing device backplate; and a build platform assembly linear actuator connected to and extending tangentially from the additive manufacturing device backplate, a build platform assembly connected for movement to a build platform linear actuator carriage.

31. The additive manufacturing device of claim 29, the plurality of linear actuators being:

a horizontally-oriented linear actuator connected to an additive manufacturing device backplate;

a horizontally-oriented material deposition component linear actuator connecting to a horizontally-oriented linear actuator carriage and extending tangentially from the horizontally-oriented linear actuator carriage for horizontal movement, the material deposition component connected for horizontal movement to a horizontally-oriented material deposition component linear actuator carriage; and a vertically-oriented build platform assembly linear actuator connected to the additive manufacturing device backplate, a build platform assembly connected for movement to a build platform linear actuator carriage.

32. The additive manufacturing device of claim 1, further comprising a build platform assembly positioned for movement within the build volume, the build platform assembly comprising:

a build platform; and a plurality of alignment mechanisms contacting a build platform underside, configured to level the build platform, the plurality of alignment mechanisms adjusting the orientation of the build platform during part creation.

33. The additive manufacturing device of claim 32, the build platform assembly further comprising:

a build platform receiver connected at a first end portion to the material deposition positioning system, removably receiving the build platform at a second end portion via a first build platform receiver channel and a second build platform receiver channel;

wherein the plurality of alignment mechanisms are positioned within the build platform receiver.

34. The additive manufacturing device of claim 33, each of the first build platform receiver channel and the second build platform receiver channel comprising a spring bar configured to contact and laterally stabilize the build platform.

35. The additive manufacturing device of claim 1, wherein the feedstock is one of: a polymer; a metal; an inorganic material; and an organic material.

36. The additive manufacturing device of claim 1, wherein the feedstock is a combination of at least two of: a polymer; a metal; an inorganic material; and an organic material.

37. The additive manufacturing device of claim 1, further comprising control electronics including a power supply and a thermal control circuit, the thermal control circuit and the power supply being electrically isolated.

38. The additive manufacturing device of claim 37, the control electronics being housed on at least one card having an edge connector and being removable.

39. The additive manufacturing device of claim 37, the control electronics including a PID controller configured to control the heating rate of an extruder nozzle during an initialization sequence.

40. The additive manufacturing device of claim 39, the initialization sequence providing 60% power to the extruder nozzle for the first three minutes of the initialization sequence.

41. An additive manufacturing device operable in a microgravity environment to create a part, the additive manufacturing device comprising:

an enclosure, the enclosure having an enclosed volume, the enclosure comprising an access door positioned on a front enclosure wall with control electronics to control access through the access door until the access door is released for opening by the control electronics, the enclosure configured to prevent electromagnetic interference;

an environmental control unit positioned within the enclosed volume and regulating an enclosed volume environment to prevent at least one of outgassing and contamination of the environment within the enclosure during creation of the part and control opening of the door based on contaminant concentration level thresholds as determined by at least one of a measurement of temperature, humidity, air quality and air circulation by at least one sensor in communication with the environmental control unit wherein the environmental control unit is in communication with the control electronics of the access door to prohibit access through the access door until contaminants within the microgravity environment of the enclosed volume, as determined by the at least one sensor, have been secured by the environmental control unit, wherein regulating the enclosed volume environment further comprises the at least one sensor and a contaminant analysis unit configured to detect when at least one contaminant is present, wherein the environmental control unit comprises a grate and at least one filter, separate from the grate, and wherein the contaminants comprise at least one the errant piece of feedstock which is secured at the grate and at least one toxic gas which is secured at the at least one filter within the environmental control unit;

a removable feedstock source comprising an ABS plastic filament, removably connected at a feedstock source receptacle within the enclosure;

a removable ABS plastic filament extruder component, positionable in two axes, configured to receive the feedstock from the feedstock source, the extruder heating the received feedstock to a feedstock melting point and depositing the heated feedstock according to part creation instructions, the extruder comprising a release, operable by a hand for removably detaching the extruder from the additive manufacturing device;

a build platform assembly positioned for movement within the build volume at least one of along a third axis parallel to an axis of the filament extruder component and orthogonal to the axis of the filament extruder component, the build platform assembly comprising:

a build platform; and a plurality of alignment mechanisms contacting a build platform underside, configured to level the build platform, the plurality of alignment mechanisms adjusting the orientation of the build platform during part creation; and a traverse system configured to position the extruder and the build platform according to the part creation instructions, the traverse system comprising a plurality of linear actuators configured to manipulate the build platform assembly and the extruder, each of the linear actuators comprising:
a linear actuator motor;
a screw-driven linear rail operably connected to the motor; and
a carriage connected for movement to the linear rail;
wherein the enclosure contains the extruder, the traverse system and the build platform assembly; and
wherein each of the linear actuators is connected to a common surface of the additive manufacturing device.

42. A method of additively manufacturing a part in a microgravity environment utilizing an additive manufacturing device comprising a feedstock source comprising feedstock; a material deposition component, the material deposition component configured to receive the feedstock from the feedstock source, the material deposition component heating the received feedstock to a feedstock melting point and depositing the heated feedstock according to part creation instructions; a material deposition positioning system configured to position the material deposition component in one of two axes according to the part creation instructions and to position the part according to the part creation instruction; a build volume provided within an enclosure that has a door where access through the door is controlled by controlled electronics, the part being created within the build volume according to the part creation instructions; and an environmental control unit positioned to regulate an environment within the enclosure to prevent at least one of outgas sing and contamination of the environment during creation of the part and to control opening of the door based on contaminant concentration level thresholds within the microgravity environment until contaminants are captured by the environmental control unit, as determined by at least one of a measurement by at least one sensor of temperature, humidity, air quality and air circulation, wherein regulating the enclosed volume environment further comprises the at least one sensor and a contaminant analysis unit configured to detect when at least one contaminant is present, wherein the environmental control unit comprises a grate and a least one filter, separate from the grate, and wherein the contaminants comprise at least one the errant piece of feedstock which is secured at the grate and at least one toxic gas which is secured at the at least one filter within the environmental control unit, the method comprising:
(a) receiving the part creation instructions from a remote source;
(b) providing at least a portion of the part creation instructions to the additive manufacturing device;
(c) producing a part via the material deposition component and the material deposition positioning system according to the part creation instructions;
(d) detecting when at least one contaminant is within the enclosure during part creation;
(e) capturing the at least one contaminant with at least one of the grate and the at least one filter;
(f) maintaining the produced part within the enclosure by prohibiting the door to open based on at least one of whether a run time is complete, an anticipated wait time had elapsed, and a contaminant concentration level threshold as determined by a measurement of at least one of temperature, humidity, air quality and air circulation within the enclosure; and
(g) releasing the door to allow access within the enclosure based on a contaminant concentration level threshold as determined by a measurement of at least one of temperature, humidity, air quality and air circulation within the enclosure as measured by the at least one sensor.

43. An additive manufacturing device operable in a microgravity environment to create a part, the additive manufacturing device comprising:
a feedstock source comprising feedstock;
a material bonding component, the material bonding component configured to receive portions of the feedstock from the feedstock source, the material bonding component heating each of the portions of the received feedstock to a feedstock melting point and positioning the heated each of the portions of the feedstock according to part creation instructions;
a material bonding component positioning system configured to position the material bonding component in one of two axes according to the part creation instructions and to position the part according to the part creation instructions;
a build volume, the part being created within the build volume according to the part creation instructions; and
an environmental control unit to regulate an environment at the build volume to prevent contamination of the environment by errant pieces of feedstock during creation of the part with at least one of a grate and to prohibit access to the build volume until the errant pieces of feedstock have been secured by the environmental control unit wherein the errant pieces are secured at a grate within the environmental control unit;
wherein the environmental control unit further comprises at least one sensor and a contaminant analysis unit configured to detect when at least one errant piece is present in the environment at the build volume.

* * * * *